US011395326B2

(12) United States Patent
Damnjanovic et al.

(10) Patent No.: US 11,395,326 B2
(45) Date of Patent: Jul. 19, 2022

(54) FLEXIBLE MULTIPLEXING AND FEEDBACK FOR VARIABLE TRANSMISSION TIME INTERVALS

(71) Applicant: QUALCOMM Incorporated, San Diego, CA (US)

(72) Inventors: Jelena Damnjanovic, Del Mar, CA (US); Taesang Yoo, San Diego, CA (US); Siddhartha Mallik, San Diego, CA (US); Aleksandar Damnjanovic, Del Mar, CA (US); Arumugam Chendamarai Kannan, San Diego, CA (US); Madhavan Srinivasan Vajapeyam, San Diego, CA (US); Durga Prasad Malladi, San Diego, CA (US); Yongbin Wei, La Jolla, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/245,802

(22) Filed: Jan. 11, 2019

(65) Prior Publication Data
US 2019/0174532 A1 Jun. 6, 2019

Related U.S. Application Data

(63) Continuation of application No. 14/869,152, filed on Sep. 29, 2015, now Pat. No. 10,219,292.
(Continued)

(51) Int. Cl.
*H04W 72/12* (2009.01)
*H04W 72/14* (2009.01)
(Continued)

(52) U.S. Cl.
CPC ....... *H04W 72/1294* (2013.01); *H04L 1/1812* (2013.01); *H04L 5/0044* (2013.01);
(Continued)

(58) Field of Classification Search
CPC ............. H04W 72/1294; H04W 72/14; H04W 72/1289; H04L 1/1812; H04L 5/14; H04L 5/0094; H04L 5/0055; H04L 5/0044
See application file for complete search history.

(56) References Cited

U.S. PATENT DOCUMENTS 6,016,311 A   1/2000  Gilbert et al.
9,768,942 B2  9/2017  Golitschek Edler Von Elbwart et al.
(Continued)

FOREIGN PATENT DOCUMENTS

CN   1731771 A    2/2006
CN   101828370 A  9/2010
(Continued)

OTHER PUBLICATIONS

Lang, W. et al., "LTE TDD System Level Performance Study", Information Communication, Aug. 15, 2010.
(Continued)

*Primary Examiner* — Sharmin Chowdhury
(74) *Attorney, Agent, or Firm* — Holland & Hart LLP

(57) ABSTRACT

Methods, systems, and devices for wireless communication are described. A base station may employ a multiplexing configuration based on latency and efficiency considerations. The base station may transmit a resource grant, a signal indicating the length of a downlink (DL) transmission time interval (TTI), and a signal indicating the length of a subsequent uplink (UL) TTI to one or more user equipment (UEs). The base station may dynamically select a new multiplexing configuration by, for example, setting the
(Continued)

length of an UL TTI to zero or assigning multiple UEs resources in the same DL TTI. Latency may also be reduced by employing block feedback, such as block hybrid automatic repeat request (HARQ) feedback. A UE may determine and transmit HARQ feedback for each transport block (TB) of a set of TBs, which may be based on a time duration of a downlink TTI.

34 Claims, 37 Drawing Sheets

Related U.S. Application Data

(60) Provisional application No. 62/075,624, filed on Nov. 5, 2014, provisional application No. 62/068,416, filed on Oct. 24, 2014.

(51) Int. Cl.
    *H04L 5/00*     (2006.01)
    *H04L 1/18*     (2006.01)
    *H04L 5/14*     (2006.01)

(52) U.S. Cl.
    CPC .......... *H04L 5/0055* (2013.01); *H04L 5/0094* (2013.01); *H04L 5/14* (2013.01); *H04W 72/14* (2013.01); *H04W 72/1289* (2013.01)

(56) References Cited

U.S. PATENT DOCUMENTS

| | | | |
|---|---|---|---|
| 10,219,292 B2 | 2/2019 | Damnjanovic et al. | |
| 2003/0039230 A1 | 2/2003 | Ostman et al. | |
| 2004/0185785 A1 | 9/2004 | Mir et al. | |
| 2008/0186893 A1 | 8/2008 | Kolding et al. | |
| 2010/0322229 A1 | 12/2010 | Kim et al. | |
| 2011/0206170 A1 | 8/2011 | Wilborn et al. | |
| 2012/0314592 A1* | 12/2012 | Behravan ............ | H04B 7/2656 370/252 |
| 2013/0195041 A1 | 8/2013 | Papasakellariou et al. | |
| 2014/0092785 A1* | 4/2014 | Song ................ | H04W 28/0278 370/280 |
| 2014/0269451 A1 | 9/2014 | Papasakellariou et al. | |
| 2015/0043355 A1 | 2/2015 | Kim et al. | |
| 2015/0043392 A1* | 2/2015 | Susitaival ......... | H04W 72/0446 370/280 |
| 2015/0188690 A1* | 7/2015 | Khoryaev ........... | H04L 65/1006 370/280 |
| 2016/0020891 A1* | 1/2016 | Jung .................... | H04L 5/0064 370/280 |
| 2016/0197687 A1* | 7/2016 | Song ................ | H04W 72/0446 370/252 |
| 2016/0205690 A1* | 7/2016 | Berggren ............... | H04L 5/001 370/280 |
| 2017/0026944 A1* | 1/2017 | Li ........................ | H04B 7/2656 |
| 2017/0105212 A1* | 4/2017 | Li ............................. | H04L 5/00 |

FOREIGN PATENT DOCUMENTS

| | | |
|---|---|---|
| CN | 104094655 A | 10/2014 |
| EP | 1816807 A1 | 8/2007 |
| EP | 2779513 A2 | 9/2014 |
| JP | 2010028334 A | 2/2010 |
| JP | 2011512097 A | 4/2011 |
| JP | 2016503246 A | 2/2016 |
| RU | 2533871 C2 | 11/2014 |
| WO | WO-2007046618 A1 | 4/2007 |
| WO | WO-2013151389 A1 | 10/2013 |
| WO | WO-2014112377 A1 | 7/2014 |
| WO | WO-2014147673 A1 | 9/2014 |

OTHER PUBLICATIONS

International Search Report and Written Opinion—PCT/US2015/053081—ISA/EPO—dated Dec. 8, 2015.
Panasonic: "Signalling for Flexible Subframes and Determination of their Usage", 3GPP TSG-RAN WG1 #73 R1-132137, May 11, 2013, pp. 1-5, http://www.3gpp.org/ftp/tsg_ran/WG1_RL1/TSGR1_73/Docs/R1-132137.zip.

* cited by examiner

FLEXIBLE MULTIPLEXING AND FEEDBACK FOR VARIABLE TRANSMISSION TIME INTERVALS

CROSS REFERENCES

The present Application for Patent is a Continuation of U.S. patent application Ser. No. 14/869,152 by Damnjanovic, et al., entitled "Flexible Multiplexing and Feedback For Variable Transmission Time Intervals" filed Sep. 29, 2015, which claims priority to U.S. Provisional Patent Application No. 62/068,416, entitled "Feedback for Variable Transmission Time Intervals," filed Oct. 24, 2014, and U.S. Provisional Patent Application No. 62/075,624, entitled "Flexible Multiplexing Operation for Downlink Data," filed Nov. 5, 2014, assigned to the assignee hereof, each of which is expressly incorporated by reference herein.

BACKGROUND

Field of Disclosure

The following relates generally to wireless communication, and more specifically to flexible multiplexing operation for downlink (DL) data and hybrid automatic repeat request (HARQ) feedback for variable transmission time interval (TTI), including variable TTIs for enhanced component carriers (eCC).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Some wireless systems may employ time division duplexing (TDD), in which the same frequency resources are used for UL and DL transmissions. In such systems, a multiplexing mode may be selected to serve multiple UEs. For example, a base station may choose to switch to UL after transmitting data to a single UE, after transmitting to multiple UEs one after the other, or after transmitting to multiple UEs that are allocated different frequency ranges. However, each method may result in a different tradeoffs between latency, resource efficiency, and scheduling flexibility.

Increasingly, many wireless applications benefit from reduced latency communication. Additionally, wide bandwidth carriers and spectrum sharing (e.g., unlicensed spectrum use) have introduced more flexibility, and a greater number of variables for efficient system operation, including issues related to efficient feedback to maintain low latency.

SUMMARY

Methods, systems, and apparatuses for flexible multiplexing operation for DL data are described. Within a TDD system, for example, a multiplexing configuration may be selected or identified based on latency and efficiency considerations. A base station may implement the multiplexing configuration by transmitting a combination of a resource grant, a signal indicating the length of a downlink (DL) transmission time interval (TTI), and a signal indicating the length of a subsequent uplink (UL) TTI to one or more user equipment (UEs). If the latency and efficiency considerations change, the base station may dynamically select a new multiplexing configuration by, for example, setting the length of an UL TTI to zero or assigning multiple UEs resources in the same DL TTI.

Additionally, methods, systems, and apparatuses for providing feedback for systems employing variable TTI are described. Latency for downlink feedback may be reduced by employing block feedback, including block hybrid automatic repeat request (HARQ) feedback for an eCC. A UE, for example, may receive a set of transport blocks (TBs) in a variable downlink TTI. The UE may determine HARQ feedback for each TB of the set of TBs, and the number of TBs in the set may be based on a time duration of the variable downlink TTI. The UE may transmit, in an uplink TTI following the downlink TTI, the HARQ feedback for each TB. In some cases, HARQ feedback may be bundled for two or more TBs of the set of TBs if, for instance, a maximum number of HARQ resources for the uplink TTI would otherwise be exceeded.

Uplink feedback may also improve latency. For instance, a UE may receive a grant for an uplink TB or for a retransmission of an uplink TB. The UE may determine that the grant represents an acknowledgment (ACK) when the grant is for an original transmission TB, or the UE may determine that the grant represents a negative acknowledgment (NACK) when the grant is for a retransmission of a TB.

Additionally or alternatively, uplink transmissions may be multiplexed in a way that improves latency. A base station, for example, may receive a first set of HARQ feedback for each TB of a first set of TBs, transmitted using a variable downlink TTI, from a first UE during a first uplink TTI. The base station may also concurrently receive a second set of HARQ feedback for each TB of a second set of TBs from a second UE during the first uplink TTI.

A method of wireless communication is described. The method may include identifying a downlink transmission time interval (TTI) of a time-division duplex (TDD) configured carrier, receiving an indication of a duration of the downlink TTI during the downlink TTI and receiving an indication of a duration of an uplink TTI that follows the downlink TTI. The indication of the uplink TTI duration may be received during the downlink TTI. The method may also include communicating based at least in part on the indication of the downlink TTI and the indication of the uplink TTI.

An apparatus for wireless communication is described. The apparatus may include means for identifying a downlink transmission time interval (TTI) of a time-division duplex (TDD) configured carrier, means for receiving an indication of a duration of the downlink TTI during the downlink TTI, and means for receiving an indication of a duration of an uplink TTI that follows the downlink TTI. The indication of the uplink TTI duration may be received during the downlink TTI and the means for communicating may be operable based at least in part on the indication of the downlink TTI and the indication of the uplink TTI.

A further apparatus is described. The apparatus may include a processor, memory in electronic communication with the processor, and instructions stored in the memory. The instructions may be operable to cause the apparatus to identify a downlink transmission time interval (TTI) of a time-division duplex (TDD) configured carrier, receive an indication of a duration of the downlink TTI during the downlink TTI, and receive an indication of a duration of an uplink TTI that follows the downlink TTI. The indication of the uplink TTI duration may be received during the downlink TTI. The instructions may also be operable to cause the apparatus to communicate based at least in part on the indication of the downlink TTI and the indication of the uplink TTI.

A non-transitory computer readable medium for wireless communication is described. The non-transitory computer-readable medium may include instructions executable to identify a downlink transmission time interval (TTI) of a time-division duplex (TDD) configured carrier, receive an indication of a duration of the downlink TTI during the downlink TTI, and receive an indication of a duration of an uplink TTI that follows the downlink TTI. The indication of the uplink TTI duration may be received during the downlink TTI. The instructions may also be executable to communicate based on the indication of the downlink TTI and the indication of the uplink TTI.

Some examples of the method, apparatus, or non-transitory computer-readable medium described above may further include processes, features, means, or instructions for receiving a downlink grant during the downlink TTI, where the downlink grant assigns a first set of resources during the downlink TTI.

Some examples of the method, apparatus, or non-transitory computer-readable medium described above may further include processes, features, means, or instructions for receiving an additional downlink grant that assigns a second set of resources during the downlink TTI.

In some examples of the method, apparatus, or non-transitory computer-readable medium described above, the first set of resources and the second set of resources are frequency division multiplexed (FDM) during the downlink TTI.

Some examples of the method, apparatus, or non-transitory computer-readable medium described above may further include processes, features, means, or instructions for receiving a subsequent downlink grant during a subsequent downlink TTI that follows the downlink TTI. Some examples of the method, apparatus, or non-transitory computer-readable medium described above may further include processes, features, means, or instructions for receiving an indication of a duration of a subsequent downlink TTI that follows the downlink TTI, wherein the indication of the duration of the subsequent downlink TTI is received during the subsequent downlink TTI. Some examples of the method, apparatus, or non-transitory computer-readable medium described above may further include processes, features, means, or instructions for receiving an indication of a duration of a subsequent uplink TTI that follows the subsequent downlink TTI, where the indication of the duration of the subsequent uplink TTI is received during the subsequent downlink TTI. Some examples of the method, apparatus, or non-transitory computer-readable medium described above may further include processes, features, means, or instructions for communicating based on the indication of the duration of the subsequent downlink TTI and the indication of the duration of the subsequent uplink TTI.

In some examples of the method, apparatus, or non-transitory computer-readable medium described above, the indication of the duration of the uplink TTI indicates that the duration of the uplink TTI is zero.

In some examples of the method, apparatus, or non-transitory computer-readable medium described above, the downlink TTI duration and a subsequent downlink TTI duration form a downlink burst that is time division multiplexed on resources of the TDD configured carrier.

In some examples of the method, apparatus, or non-transitory computer-readable medium described above, the communicating comprises: receiving a set of transport blocks (TBs) during the downlink TTI, where the downlink TTI comprises a variable TTI. Some examples of the method, apparatus, or non-transitory computer-readable medium described above may further include processes, features, means, or instructions for determining hybrid automatic repeat request (HARQ) feedback for each TB of the set of TBs, where a number of TBs in the set is based on the duration of the downlink TTI. Some examples of the method, apparatus, or non-transitory computer-readable medium described above may further include processes, features, means, or instructions for transmitting the HARQ feedback for at least one TB of the set of TBs during the uplink TTI.

Some examples of the method, apparatus, or non-transitory computer-readable medium described above may further include processes, features, means, or instructions for determining HARQ feedback for a number of code blocks (CBs), where each TB of the set of TBs comprises at least one CB. In some cases, a quantity of CBs in each TB may be based at least in part on a size of each TB. Some examples of the method, apparatus, or non-transitory computer-readable medium described above may further include processes, features, means, or instructions for transmitting the HARQ feedback for the number of CBs during the uplink TTI. Some examples of the method, apparatus, or non-transitory computer-readable medium described above may further include processes, features, means, or instructions for entering a low power state during the downlink TTI or the uplink TTI based at least in part on an absence of a grant of resources during the downlink TTI or the uplink TTI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
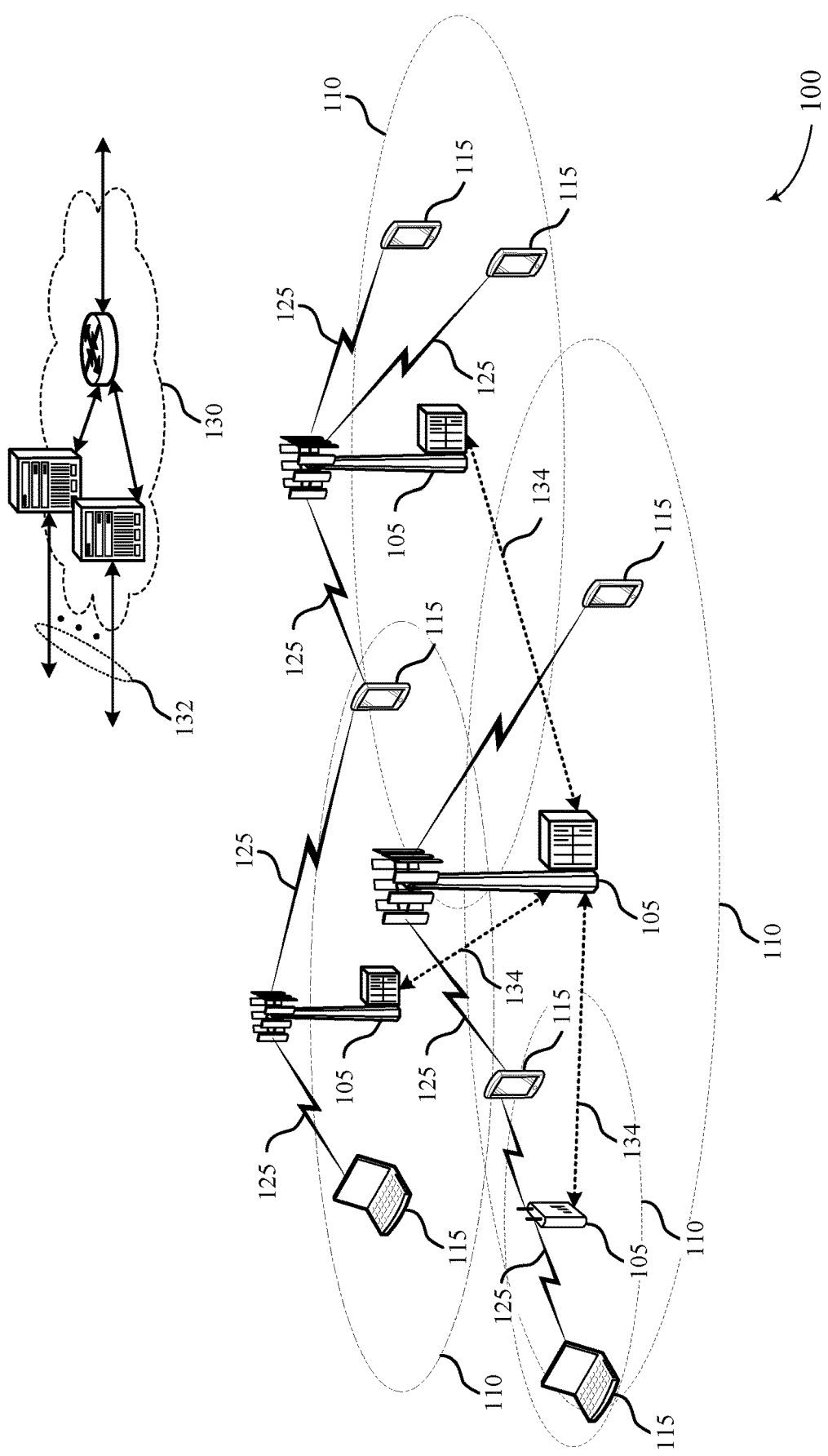
FIG. 1 illustrates an example of a wireless communications system for flexible multiplexing operation for downlink (DL) data in accordance with various aspects of the present disclosure.

A base station may multiplex downlink (DL) data for a user equipment (UE) according to one of several multiplexing schemes: time division duplex (TDD) multiplexing, time division multiplexing (TDM), and frequency division multiplexing (FDM). Each multiplexing scheme may offer certain benefits over other schemes with respect to latency, efficiency, and scheduling flexibility.

According to the particular benefits of each multiplexing scheme, one type of multiplexing may be more suitable for a certain type of transmission than another. Thus, a physical layer signaling mechanism may allow a base station to flexibly and dynamically choose one of the multiplexing modes, depending, for example, on the status of the base station. The mechanism may use two (2) layer one (L1) signals (e.g., physical DL format indicator channel (PDFICH) and physical UL format indicator channel (PUFICH)) to indicate the length of a transmit time interval (TTI) and the length of an UL burst. For example, PDFICH, which is present on the first symbol, the last symbol, or another predetermined symbol location of a DL TTI, may convey the DL TTI length, and PUFICH, which is present on either the first of last symbol of a DL TTI, may convey the burst length of an UL. The mechanism may be used in conjunction with any of the three multiplexing schemes described above.

For example, in the case of TDD multiplexing, a first PDFICH on a first DL TTI may indicate the length of the first DL TTI and a first PUFICH on the first DL TTI may indicate the length of a first UL burst. Similarly, a second PDFICH on a second (e.g., subsequent) DL TTI may indicate the length of the second DL TTI, while a second PUFICH on the second DL TTI may indicate the length of a second UL burst.

In the case of TDM, a first PDFICH on a first DL TTI may indicate the length of the first DL TTI. If the first DL TTI is immediately followed by a second DL TTI, the value (e.g., payload) of the first PUFICH may be set to zero, thus signaling that the DL transmission is to continue and that a UE may read the next symbol (e.g., TTI) for the second PDFICH. The second PDFICH on the second DL TTI may indicate the length of the second DL TTI. The second DL TTI may include a second PUFICH which may indicate the length of a subsequent UL burst.

In the case of FDM, a single PDFICH and PUFICH may be used to signal a multiplexing format. For instance, a DL TTI may include PDFICH which may indicate the length of the DL TTI. Due to the frequency-division nature of FDM, an FDM DL TTI may be shared by data assigned to two different UEs. Thus, a physical DL control channel (PDCCH) may indicate the frequency regions assigned to each UE. The DL TTI may also include PUFICH, which may be used to indicate the length of an UL burst subsequent to the DL TTI.

Additionally or alternatively, techniques are described for feedback, including hybrid automatic repeat request (HARQ) feedback, for downlink variable length transmission time intervals (TTI). A user equipment (UE) may receive a number of transport blocks (TBs) in consecutive downlink TTIs. The UE may determine HARQ feedback for each of the TBs, and it may transmit the feedback for each TB in a subsequent uplink TTI. The UE may thus transmit a block of feedback with acknowledgments (ACK) or negative ACK (NACK) for each TB received during several downlink TTIs in a single uplink TTI. In some examples, several UEs may concurrently transmit feedback during a common uplink TTI. Communications between the UE and a base station may thus decrease latency, as compared with a fixed HARQ timeline, because the HARQ timing may be dynamically adjusted to follow dynamically adjusted downlink bursts.

Additionally, in some examples, uplink HARQ feedback (e.g., feedback for uplink transmissions) may be entirely avoided. A UE my, for example, determine whether an uplink transmission was successfully received based on a subsequent grant. This may further decrease latency because the base station may provide feedback without the necessity of an additional ACK or NACK transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies. Each base station 105 may multiplex DL data for UEs according to one of several multiplexing schemes, which may be selected based on the particular latency requirements of each UE.

In some examples, at least a portion of the wireless communications system 100 may be configured to operate using variable length (i.e., variable) TTIs, in which downlink and uplink TTIs may be dynamically adjusted to provide flexibility to dynamically adapt to particular traffic needs at a particular moment. UEs 115 may determine feedback for TBs received during variable downlink TTIs, and the UEs 115 may transmit the determined feedback during a subsequent TTI. The feedback transmission may be scheduled by a grant received during a downlink TTI, or the feedback may be sent in a first uplink TTI following a downlink TTI, irrespective of a grant. Feedback from several UEs 115 may be multiplexed in a common uplink TTI and received by a base station 105. Additionally or alternatively, a base station 105 may indicated feedback to a UE 115 with a grant, and without the necessity of an ACK or NACK transmission.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or DL transmissions, from a base station 105 to a UE 115. The DL transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc.

The communication links 125 may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2). A UE 115 may, for example, identify a TDD configuration of carrier, and the UE 115 may receive different multiplexing format signals indicative of different multiplexing configurations of various TTIs of the TDD carrier.

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both FDD and TDD component carriers. The terms "carrier" and "cell" may be used in the context of carrier aggregation, and they may also refer to a wireless communications system 100 with a single carrier (or a single set of paired UL/DL carriers). For example, the term "serving cell" may refer to either a primary cell or secondary cell in a carrier aggregation context, or to the single cell serving a UE 115 in a non-carrier aggregation context.

Carriers may transmit bidirectional communications using FDD (e.g., using paired spectrum resources) or TDD operation (e.g., using unpaired spectrum resources). Different carriers, or cells, may be configured with different frame structures (e.g., FDD or TDD), and each TTI of the carrier may utilize one of several different multiplexing configurations. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

Time intervals in LTE and similar systems may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

Data in wireless communications system 100 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

UL transport channels may include random access channel (RACH) for access and UL shared channel (UL-SCH) for data. DL physical channels may include physical broadcast channel (PBCH) for broadcast information, physical control format indicator channel (PCFICH) for control format information, physical DL control channel (PDCCH) for control and scheduling information, physical HARQ indicator channel (PHICH) for HARQ status messages, physical DL shared channel (PDSCH) for user data and physical multicast channel (PMCH) for multicast data. UL physical channels may include physical random access channel (PRACH) for access messages, physical UL control channel (PUCCH) for control data, and physical UL shared channel (PUSCH) for user data.

According the present disclosure, additional channels may be used to indicate the length of DL and UL TTIs to achieve different multiplexing configurations. For example, a physical DL format indicator channel (PDFICH) may indicate the length of a DL TTI and a physical UL format indicator channel (PUFICH) may indicate the length of an UL TTI. PDFICH and PUFICH may be used in conjunction with a resource grant (e.g., in PDCCH) to configure a selected multiplexing format.

PDCCH may carry DL control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information.

PDCCH can carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space.

The search space can be partitioned into two regions: a common CCE region or search space and a UE-specific (dedicated) CCE region or search space. The common CCE region may be monitored by all UEs served by a base station 105 and may include information such as paging information, system information, random access procedures, multiplexing format information, and the like. The UE-specific search space may include user-specific control information. A UE 115 may attempt to decode DCI by performing a process known as a blind decode, during which search spaces are randomly decoded until the DCI is detected. During a blind decode, the user equipment may attempt descramble all potential DCI messages using its C-RNTI, and perform a CRC check to determine whether the attempt was successful.

According to the present disclosure, a base station 105 in a TDD system, for instance, may identify a multiplexing configuration based on latency and efficiency considerations of UEs 115 within the system 100. The base station 105 may then implement the multiplexing configuration by transmitting a combination of one or more PDCCH messages, a PDFICH indicating the length of a DL TTI, and a PUFICH indicating the length of a subsequent UL TTI to one or more UEs 115. If the latency and efficiency considerations change, the base station 105 may dynamically select a new multiplexing configuration by, for example, setting the length of an UL TTI to zero using PUFICH or assigning multiple UEs 115 resources in the same DL TTI via PDCCH.

The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss).

In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some examples, and as described below, an enhanced component carrier (eCC) may be configured—e.g., as an SCell. An eCC may utilize variable TTIs, which may be dynamically adjusted according to traffic conditions.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers.

In some examples, one cell may utilize licensed spectrum, while another cell may utilize unlicensed spectrum. An eCC may be configured for unlicensed spectrum, for instance. Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Figure 2:
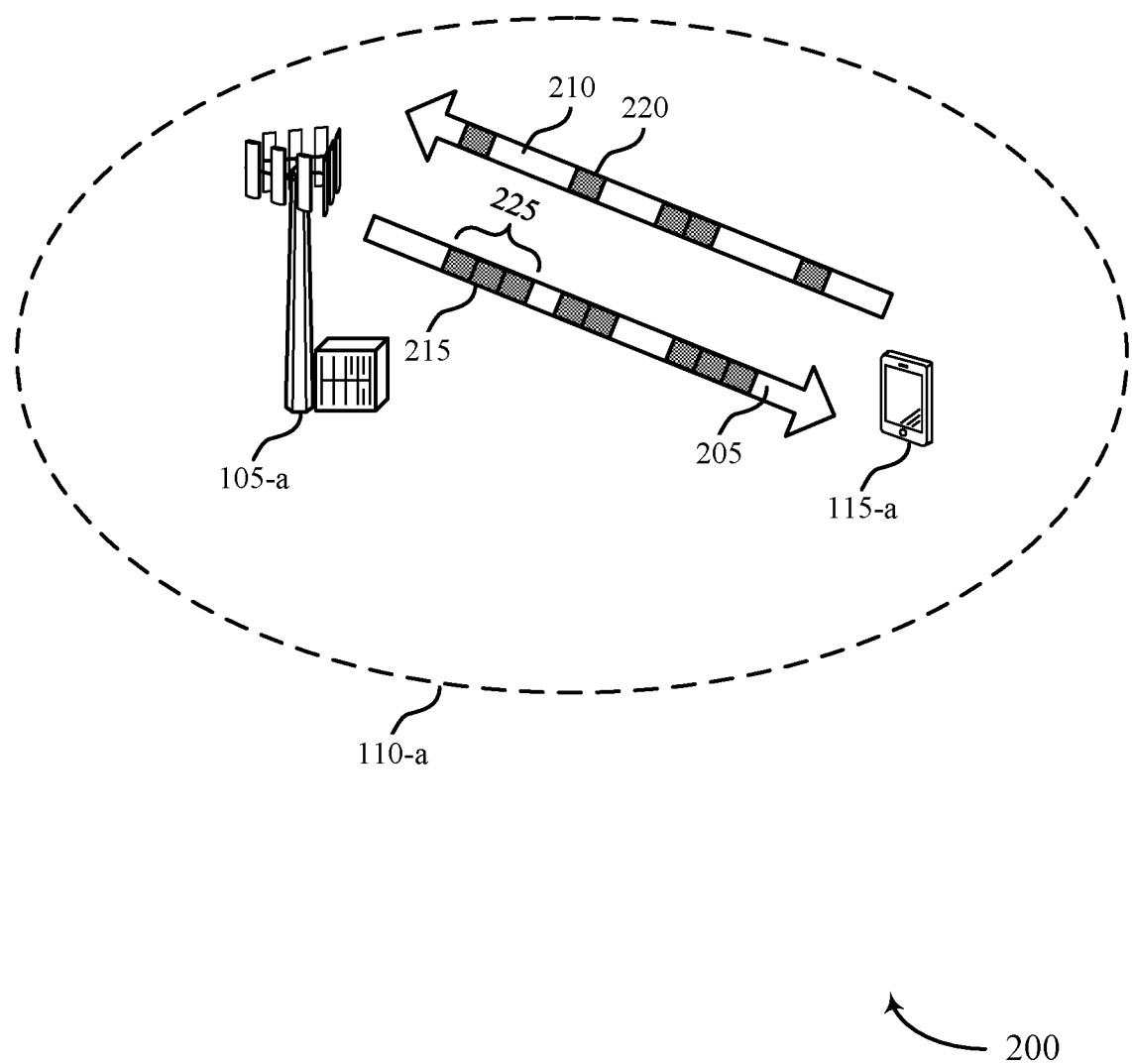
FIG. 2 illustrates an example of a wireless communications system for flexible multiplexing operation for DL data in accordance with various aspects of the present disclosure.

FIG. 2 illustrates an example of a wireless communications system 200 for flexible multiplexing operation for DL data in TDD systems in accordance with various aspects of the present disclosure. Wireless communications system 200 may include UE 115-*a*, which may be an example of a UE 115 described above with reference to FIG. 1. Wireless communications system 200 may also include a base station 105-*a*, which may be an example of a base station 105 described above with reference to FIG. 1. Base station 105-*a* may communicate with any UE 115 within its coverage area 110-*a* (e.g., via downlink 205 and uplink 210, which may utilize the same frequency range), as generally described above with respect to FIG. 1.

Wireless communications system 200 may use TDD for both uplink 210 and downlink 205 (e.g., frequency resources may be allocated between uplink 210 and downlink 205 in a time-division manner). For example, base station 105-*a* may send data on downlink 205 during a TTI 215 in which UE 115-*a* is not allocated UL frequency resources. Similarly, UE 115-*a* may transmit data on uplink 210 during TTI 220 in which base station 105-*a* has not allocated any frequency resources for DL transmissions. Base station 105-*a* may flexibly and dynamically choose multiplexing modes for individual TTIs on downlink 205, according to the type of traffic, and signal the chosen multiplexing mode to UE 115-*a* via control channels.

For instance, base station 105-*a* may determine a multiplexing configuration (e.g., frequency division multiplexing) for TTI 215 within DL burst 225. Additionally, base station 105-*a* may signal the multiplexing format of TTI 215 (e.g., the length of TTI) to UE 115-*a* via a multiplexing format signal on a DL control channel (e.g., via PDFICH) which may be conveyed during TTI 215. In some cases, base station 105-*a* may signal the length of an uplink (UL) period subsequent to TTI 215 via a multiplexing format signal on an UL control channel (e.g., PUFICH). Thus, base station 105-*a* may convey multiplexing configuration information to UE 115-*a* via a DL control channel and an UL control channel.

Base station 105-*a* may identify a multiplexing configuration based on latency and efficiency considerations. Base station 105-*a* may then implement the multiplexing configuration by transmitting a combination of one or more PDCCH messages, a PDFICH indicating the length of a DL TTI, and a PUFICH indicating the length of a subsequent UL TTI to UE 115-*a*. If the latency and efficiency considerations change, base station 105-*a* may dynamically select a new multiplexing configuration by, for example, setting the length of an UL TTI to zero using PUFICH or assigning multiple UEs 115 resources in the same DL TTI via PDCCH.

Figure 3A:
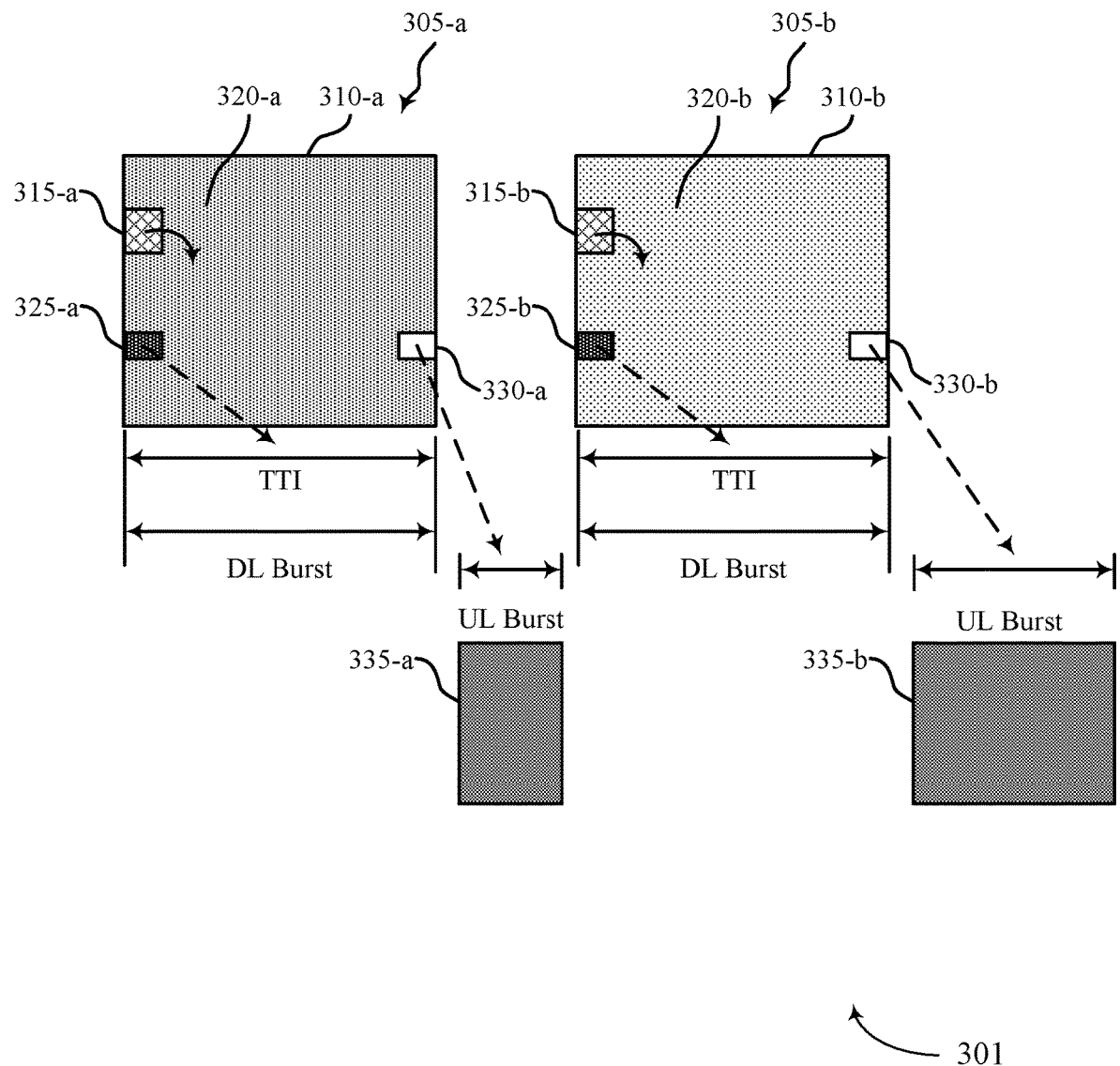
FIG. 3A illustrates an example of a TDD UL/DL burst configuration for flexible multiplexing operation for DL data in accordance with various aspects of the present disclosure.

FIG. 3A illustrates an example of a TDD UL/DL burst configuration 301 for flexible multiplexing operation for DL data in TDD systems in accordance with various aspects of the present disclosure. TDD UL/DL burst configuration 301 may illustrate aspects of a multiplexing format used in conjunction with a TDD system as described above with reference to FIGS. 1-2.

DL burst 305-a may represent allocated resources for a single TTI 310-a directed to an individual UE 115. DL burst 305-a may include one or more control channels such as PDCCH 315-a, which may indicate data resource assignments (e.g., DL grant) to a first UE 115 (FIGS. 1 and 2), and PDSCH 320-a, which may convey data assigned to the first UE 115. Additionally, DL burst 305-a may include PDFICH 325-a, and PUFICH 330-a. In some examples, PDFICH 325-a may indicate the length of TTI 310-a to a UE 115 and PUFICH 330-a may indicate the length of UL burst 335-a. Upon reception of PUFICH 330-a, the UE 115 may switch a radio from a DL configuration to an UL configuration and transmit an UL message on during UL burst 335-a. Subsequently, based on the length of UL burst 335-a indicated in PUFICH 330-a, the UE 115 may switch the radio from an UL configuration to a DL configuration and to receive DL burst 305-b. DL burst 305-b may represent allocated resources for TTI 310-b and may include PDCCH 315-b, which may indicate data resource assignments to a second UE 115, and PDSCH 320-b, which may convey data for the second UE 115. Additionally, DL burst 305-b may include PDFICH 325-b and PUFICH 330-b, which may indicate the length of DL TTI 310-b and the length of UL burst 335-b, respectively. The first and the second UE may be the same UE or different UEs.

Thus, in a TDD multiplexing scheme, a base station may serve a single UE at each DL burst. While a TDD scheme may enjoy low latency delivery with immediate ACK/NACK, as well as scheduler flexibility similar to TDM, the efficiency of a TDD scheme may, in some cases, suffer due to frequent DL and uplink (UL) switching.

Figure 3B:
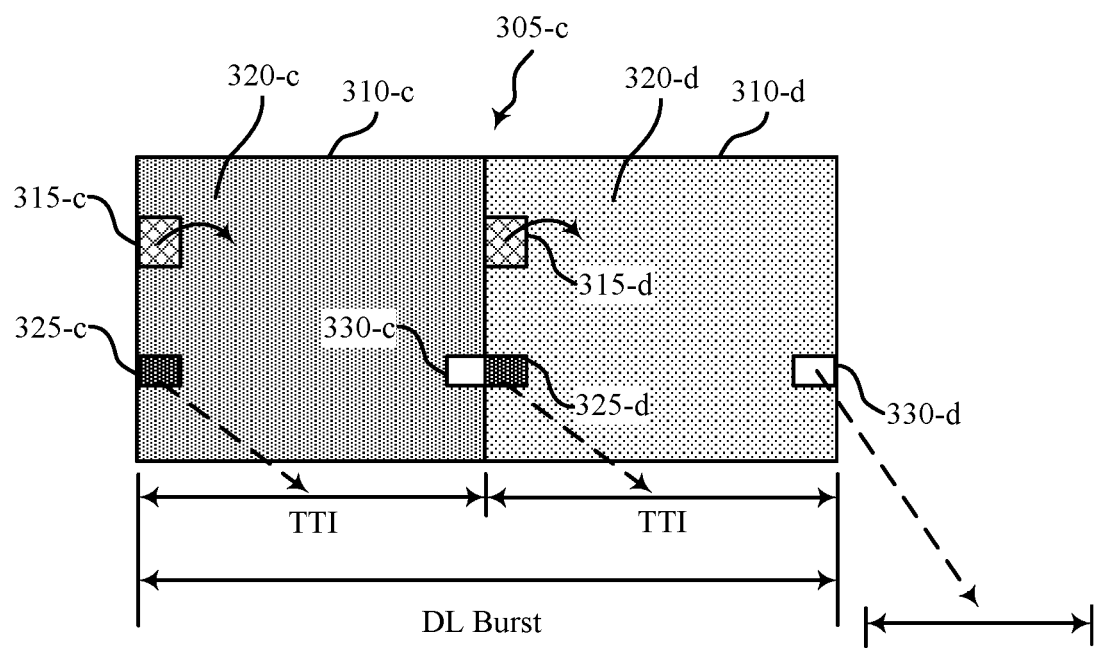
FIG. 3B illustrates an example of a time division multiplexing (TDM) UL/DL burst configuration for flexible multiplexing operation for DL data in accordance with various aspects of the present disclosure.

FIG. 3B illustrates an example of TDM UL/DL burst configuration 302 for flexible multiplexing operation for DL data in TDD systems in accordance with various aspects of the present disclosure. TDM UL/DL burst configuration 302 may illustrate aspects of a multiplexing format used in conjunction with a TDD system as described above with reference to FIGS. 1-2.

DL burst 305-c may represent allocated resources for two TTIs, TTI 310-c and TTI 310-d. During TTI 310-c, PDCCH 315-c may indicate data resource assignments for a first UE 115 and convey data for a first UE 115 (e.g., on PDSCH 320-c). Additionally, TTI 310-c may include PDFICH 325-c which may indicate the length of TTI 310-c. To signal that TTI 310-c is contiguous to TTI 310-d, PUFICH 330-c may indicate an UL TTI length of zero. In other words, PUFICH 330-c may indicate to a UE 115 that it may immediately proceed to read TTI 310-d and receive PDFICH 325-d. PDFICH 325-d may indicate the length of DL TTI 310-d, and PUFICH 330-d may indicate the length of UL burst 335-c. DL TTI 310-d may also include PDCCH 315-d and PDSCH 320-d, which may include a data resource assignment and data for the second UE 115, respectively. The first and the second UE may be the same UE or different UEs.

Thus, a TDM scheme may enable a base station to serve multiple UEs at each DL burst in a time-division manner. Additionally, a TDM scheme may provide for low latency in data delivery, as well as scheduler flexibility (e.g., a base station may start transmitting a first data irrespective of the availability of a second data). However, in a TDM scheme an ACK/NACK for a first data may be delayed until a second data is finished. Thus, a TDM scheme may, in some instances, incur some ACK/NACK delay which may increase latency.

Figure 3C:
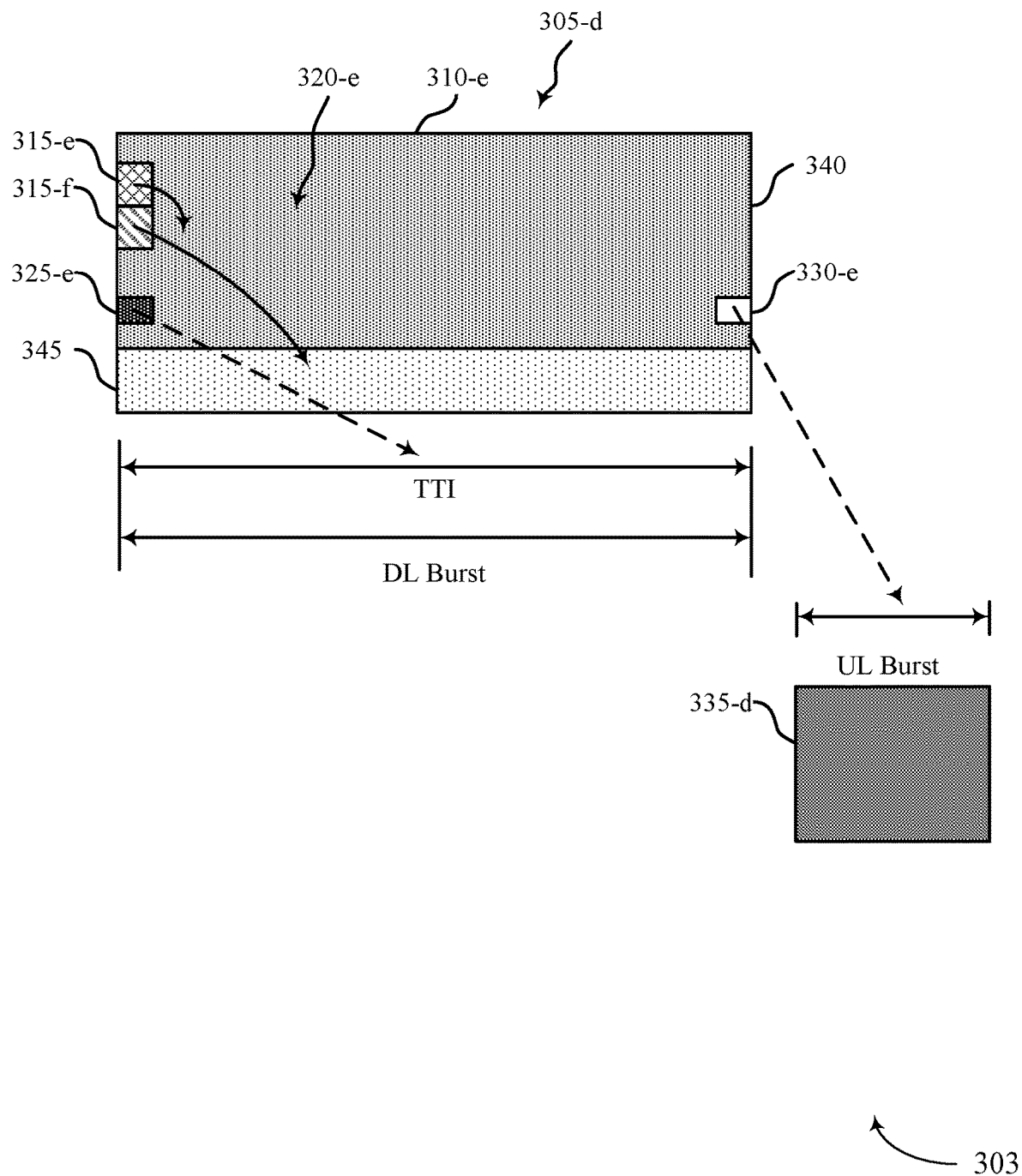
FIG. 3C illustrates an example of a frequency division multiplexing (FDM) UL/DL burst configuration for flexible multiplexing operation for DL data in accordance with various aspects of the present disclosure.

FIG. 3C illustrates an example of FDM UL/DL burst configuration 303 for flexible multiplexing operation for DL data in TDD systems in accordance with various aspects of the present disclosure. FDM UL/DL burst configuration 303 may illustrate aspects of a multiplexing format used in conjunction with a TDD system as described above with reference to FIGS. 1 and 2.

DL burst 305-d may represent allocated resources for TTI 310-e, and may be configured to convey data for two UEs 115. For instance, data for a first UE 115 may be conveyed by PDSCH 320-e using frequency region 340 and data for a second UE 115 may be conveyed by PDSCH 320-e using frequency region 345. To indicate which data resources (e.g., frequency regions) are assigned to the first UE 115 and the second UE 115, TTI 310-e may include PDCCH 315-e and PDCCH 315-f, respectively. TTI 310-e may also include PDFICH 325-e, which may indicate the length of DL TTI 310-e, and PUFICH 330-e, which may indicate the length of UL burst 335-d.

Thus, an FDM scheme may allow a base station to serve multiple UEs at each DL burst in a frequency-division manner, but may experience large latency (e.g., a first data may finish at the same time as a second data). However, FDM may, in some instances, be more efficient than TDD and TDM for several reasons, including lower RS overhead, ease of frequency selective scheduling, and closed-loop spatial multiplexing.

Figure 4:
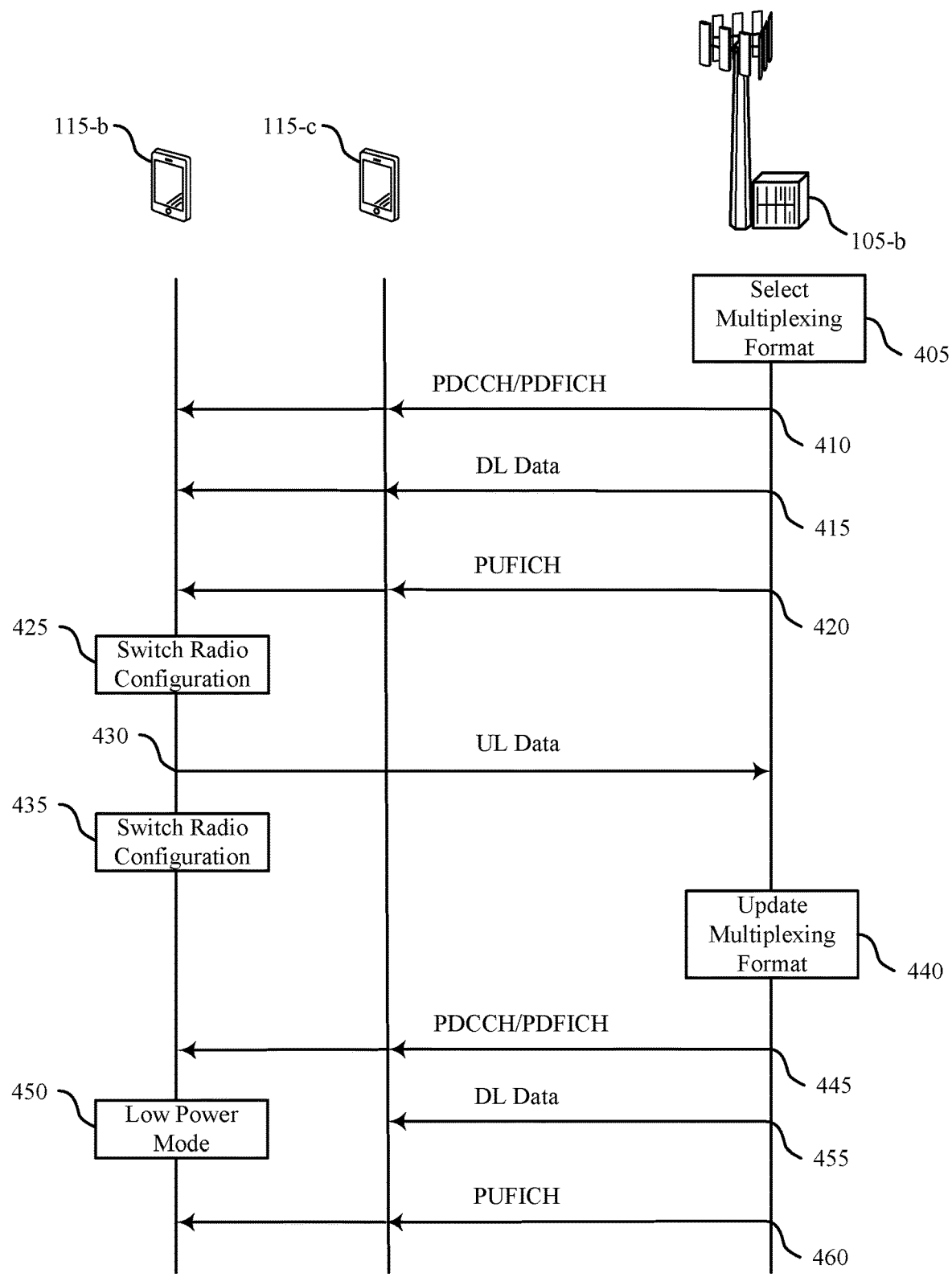
FIG. 4 illustrates an example of a process flow for flexible multiplexing operation for DL data in accordance with various aspects of the present disclosure.

FIG. 4 illustrates an example of a process flow 400 for flexible multiplexing operation for DL data in accordance with various aspects of the present disclosure. While much of the discussion of process flow 400 is in the context of a TDD system, those skilled in the art will recognize the applicability of the described techniques to other systems, including FDD systems. Process flow 400 may include UE 115-b and UE 115-c, which may be examples of UEs 115 described above with reference to FIG. 1. Process flow 400 may also include a base station 105-b, which may be an example of a base station 105 described above with reference to FIG. 1. Additionally, process flow 400 may be an example of a bi-directional communication scheme between any base station 105 and UE 115, such as described with reference to FIGS. 1-3C.

At step 405, base station 105-b may identify one or more parameters that may be used to determine an appropriate multiplexing configuration. For example, base station 105-b may identify a target latency for an upcoming data transmission to UE 115-b. The latency target identification may be based on a traffic type, an amount of data for transmission, a number of UEs 115 supported by base station 105-b, or on other factors. Alternatively, base station 105-b may identify a different target parameter based on efficiency or scheduling flexibility considerations. Base station 105-b may then select a multiplexing scheme (e.g., basic TDD, TDM, or FDM) based on the identified parameters. In some examples, base station 105-b may select a multiplexing scheme based on a combination of target parameters. Base station 105-b may then multiplex a DL TTI using the chosen multiplexing scheme. In some cases, UE 115-b and base station 105-b may identify the communication link as a TDD communication link, and the multiplexing scheme may be based on the underlying TDD structure.

At step 410, base station 105-b may transmit (and UEs 115-b and 115-c may receive) a downlink grant and a multiplexing format signal on (e.g., via PDCCH and PDFICH). In some examples, PDFICH may be a broadcast signal and may convey the length of the corresponding DL TTI. In other examples, a channel other than PDFICH may be used to convey the same information. Thus, UE 115-a may receive a first multiplexing format signal (e.g., PDFICH) from a serving cell of the carrier, the first multiplexing format signal indicating a first multiplexing configuration of a first TTI.

At step 415, base station 105-b may transmit DL data for UE 115-b or 115-c to receive. The DL data may be conveyed on PDSCH, for example, and may be decoded by UE 115-b or 115-c using resource assignment information conveyed on the control channel (e.g., PDCCH). Thus, UE 115-a may receive a first data transmission from the serving cell based on the first multiplexing configuration during the first TTI. In some cases, UE 115-a may receive data using a portion of the frequency tones of the TDD carrier and UE 115-c may receive data using another portion of the frequency tones of the carrier (e.g., if base station 105-b selected an FDM configuration and sends a DL grant to both UEs 115).

At step 420, base station 105-b may transmit (and UEs 115-b and 115-c may receive) a subsequent multiplexing format signal on an UL control channel (e.g., PDFICH). PDFICH may be a broadcast signal and may indicate the length of a subsequent UL burst. Thus, UE 115-b may receive a second multiplexing format signal from the serving cell indicating a second multiplexing configuration of a second TTI (e.g., the UL TTI), the second multiplexing configuration may be different from the first multiplexing configuration. In some examples, the PDFICH may be referred to as a third multiplexing format signal, such as when the first TTI and the second TTI represent DL TTIs and the third TTI is an UL TTI between the first TTI and the second TTI. That is, a subsequent PDFICH may be referred to as the second multiplexing format signal.

In some cases the PDFICH may indicate the absence of an UL TTI. For example, the PDFICH may indicate an UL TTI of size zero (e.g., if base station 105-b selected a TDM configuration). Then UE 115-b may not switch the radio configuration. Rather, UE 115-b may immediately receive the next DL transmissions (e.g., PDFICH, PDCCH, or PDSCH).

At step 425, UE 115-b may switch a radio from a DL configuration to an UL configuration based on PDFICH (e.g., during a special subframe switching period). At step 430, UE 115-b may transmit UL data to base station 105-b during the indicated length of the UL burst. Subsequently, at step 435, UE 115-b may switch the radio from an UL configuration to a DL configuration. In some examples, the switch may be based on PDFICH.

In examples when UE 115-c does not receive any UL grant during the first TTI, UE 115-c may enter a the low power mode during the period indicated by PDFICH. During this period, UE 115-c may remain in the DL configuration without switching its radio to UL and then back to DL (i.e., because UE 115-c may not transmit anything).

At step 440, base station 105-b may select a different multiplexing configuration as described above with reference to FIGS. 3A, 3B, and 3C. At step 445, base station 105-b may transmit one or more DL grants and a multiplexing format signal according to the updated multiplexing configuration. For example, in the case when the first PDFICH is referred to as the third multiplexing format signal, the second multiplexing format signal may be a second PDFICH for the second DL burst.

When base station 105-b selects a TDD or TDM configuration, the second DL TTI may be directed toward a different UE 115 as described above with reference to FIGS. 3A and 3B. At step 450, or during any DL or UL TTIs where the resources are allocated to different UEs 115 (i.e., when no PDCCH is directed toward UE 115-b), UE 115-b may enter a low power state for a time period based on the multiplexing format signals (e.g., PDFICH for a DL TTI or PDFICH for an UL TTI). At step 455, UE 115-c may receive DL data based on receiving a DL grant via PDCCH at step 445.

At step 460, UEs 115-b and 115-c may receive a fourth multiplexing format signal (i.e., the second PUFICH) indicating a length of a fourth TTI, wherein the fourth TTI is an UL TTI following the second TTI.

Figure 5:
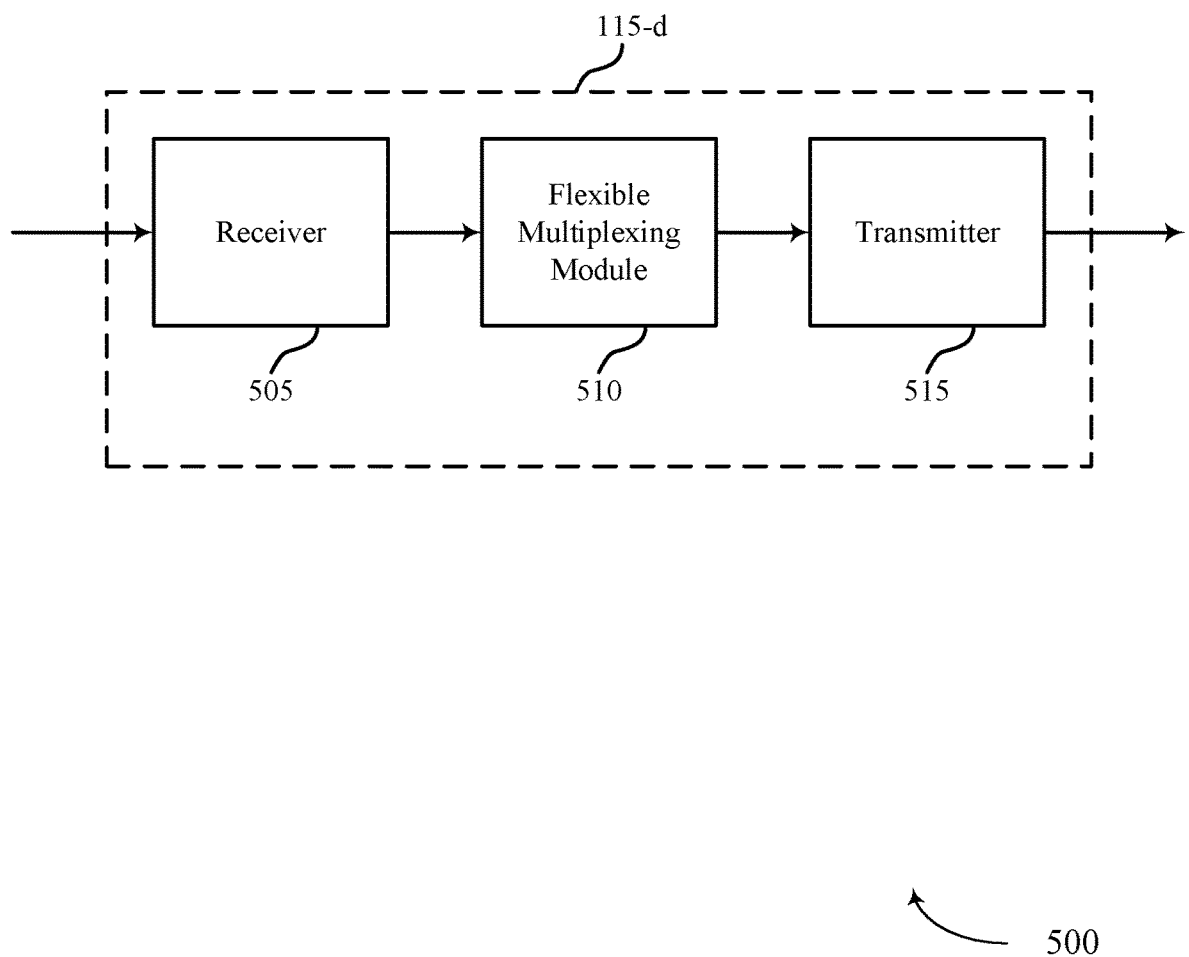
FIG. 5 shows a block diagram of a user equipment (UE) configured for flexible multiplexing operation for DL data in accordance with various aspects of the present disclosure.

FIG. 5 shows a block diagram 500 of a UE 115-d configured for flexible multiplexing operation for DL data in accordance with various aspects of the present disclosure. UE 115-d may be an example of aspects of a UE 115 described with reference to FIGS. 1-4. UE 115-d may include a receiver 505, a flexible multiplexing module 510, or a transmitter 515. UE 115-d may also include a processor. Each of these components may be in communication with one another.

The receiver 505 may receive information such as packets, user data, or control information associated with various information channels (e.g., control channels, data channels, and information related to flexible multiplexing operation for DL data in TDD systems, etc.). Information may be passed on to the flexible multiplexing module 510, and to other components of UE 115-d. In some examples, the receiver 505 may receive a first multiplexing format signal and a first data transmission from the serving cell based on the first multiplexing configuration during the first TTI. The receiver 505 may, in some examples, receive a second multiplexing format signal from the serving cell based at least in part on the first TTI length and the third TTI length.

Additionally or alternatively, the receiver 505 may receive a second data transmission from the serving cell based on the second multiplexing configuration and the second DL grant. The receiver 505 may receive an indication of a duration of a downlink TTI, such as during the downlink TTI. The receiver 505 may receive an indication of a duration of an uplink TTI that follows the downlink TTI. The indication of the uplink TTI duration may be received during the downlink TTI. The receiver 505 may also represent examples of aspects of a transceiver 835 described with reference to FIG. 8.

The flexible multiplexing module 510 may identify a TDD configuration of a carrier, receive a first multiplexing format signal from a serving cell of the carrier, the first multiplexing format signal indicating a first multiplexing configuration of a first TTI. In some cases, the flexible multiplexing module 510 may identify a downlink TTI of a TDD configured carrier, receive an indication of a duration of the downlink TTI, such as during the downlink TTI, receive an indication of a duration of an uplink TTI that follows the downlink TTI, and communicate based at least in part on the indication of the downlink TTI and the indication of the uplink TTI. The indication of the uplink TTI duration may be received during the downlink TTI. It may also, in conjunction with the receiver 505, receive a first data transmission from the serving cell based on the first multiplexing configuration during the first TTI, and it may receive a second multiplexing format signal from the serving cell indicating a second multiplexing configuration of a second TTI, the second multiplexing configuration different from the first multiplexing configuration. The flexible multiplexing module 510 may be an aspect of a processor, such as the processor 805 described with reference to FIG. 8.

The transmitter 515 may transmit signals received from other components of UE 115-d. In some embodiments, the transmitter 515 may be collocated with the receiver 505 in a transceiver module. The transmitter 515 may include a single antenna, or it may include a plurality of antennas. In some examples, the transmitter 515 may transmit a message to the serving cell during the third TTI. In some examples, the transmitter 515 may transmit a message to the serving cell during the fourth TTI. The transmitter 515 may also transmit a first data transmission on the TDD carrier to a first UE during the first TTI based on the first multiplexing configuration. The transmitter 515 may illustrate aspects of a transceiver 835 described with reference to FIG. 8.

Figure 6:
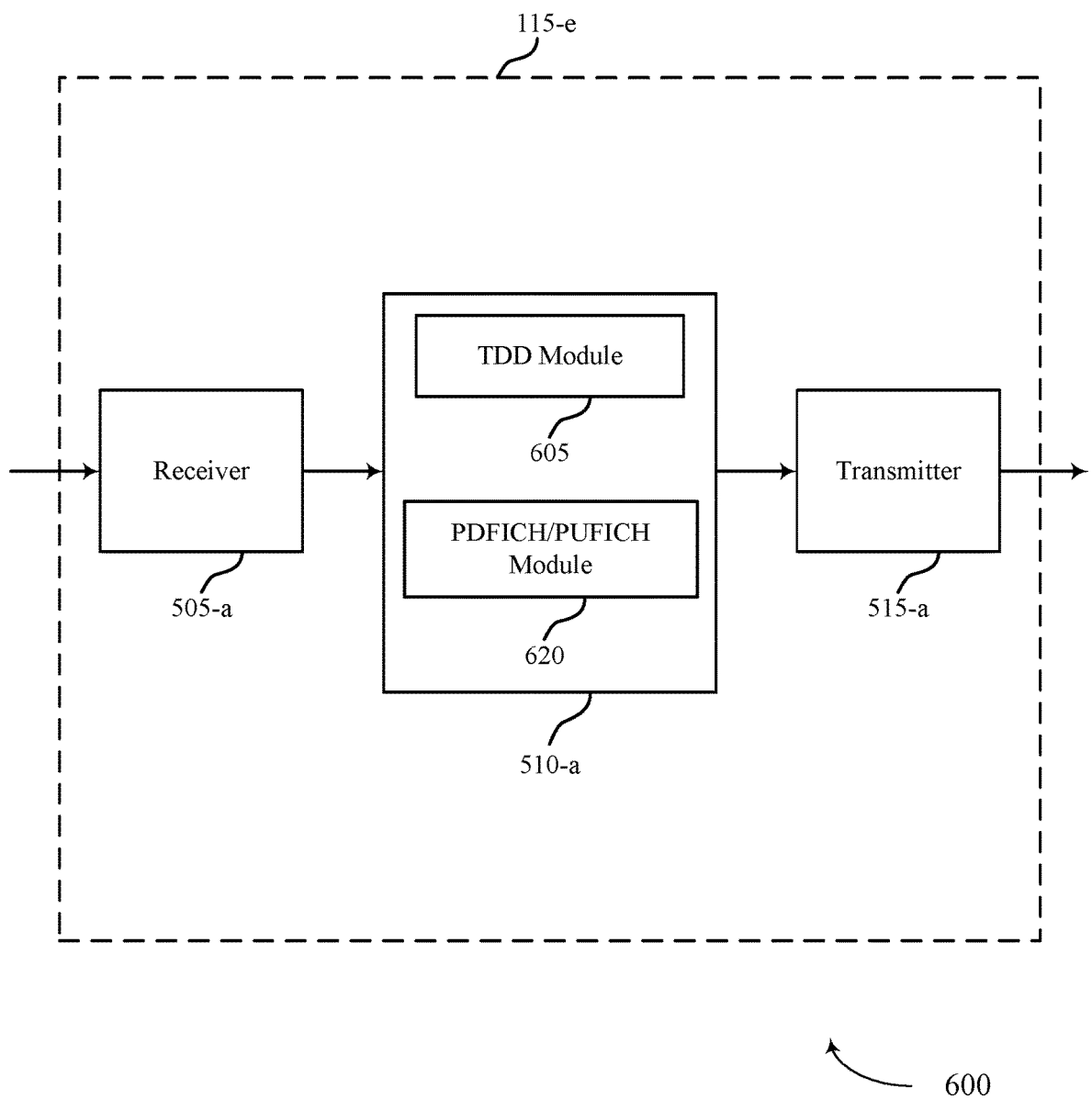
FIG. 6 shows a block diagram of a UE configured for flexible multiplexing operation for DL data in accordance with various aspects of the present disclosure.

FIG. 6 shows a block diagram 600 of a UE 115-e for flexible multiplexing operation for DL data in accordance with various aspects of the present disclosure. UE 115-e may be an example of aspects of a UE 115 described with reference to FIGS. 1-5. UE 115-e may include a receiver 505-a, a flexible multiplexing module 510-a, or a transmitter 515-a. UE 115-e may also include a processor. The flexible multiplexing module 510-a may illustrate aspects of a processor, such as the processor 805 described with reference to FIG. 8. Each of these components may be in communication with one another. The flexible multiplexing module 510-a may also include a TDD module 605 and a PDFICH/PUFICH module 620. Each of these components may illustrate aspects of a processor, such as the processor 805 described with reference to FIG. 8.

The receiver 505-a may receive information which may be passed on to flexible multiplexing module 510-a, and to other components of UE 115-e. The receiver 505-a may illustrate aspects of a transceiver 835 described with reference to FIG. 8. The flexible multiplexing module 510-a may perform the operations described above with reference to FIG. 5. The transmitter 515-a may transmit signals received from other components of UE 115-e. The transmitter 515-a may illustrate aspects of a transceiver 835 described with reference to FIG. 8.

The TDD module 605 may identify a TDD configuration of a carrier as described above with reference to FIGS. 2-4. Additionally or alternatively, the TDD module 605 may identify a downlink TTI of a TDD configured carrier. The TDD module 605 may further coordinate communications based at least in part on the indication of the downlink TTI and the indication of the uplink TTI.

Additionally or alternatively, the TDD module 605 may receive a set of TBs during the downlink TTI. The downlink TTI may include a variable TTI. The TDD module 605 may determine HARQ feedback for each TB of the set of TBs. A number of TBs in the set may be based at least in part on the duration of the downlink TTI. The TDD module 605, such as with the transmitter 515-a, may transmit the HARQ feedback for at least one TB of the set of TBs during the uplink TTI. In some examples, each TB may include a number of CBs, which may be based on the size of the TB. The TDD module 605 may thus determine HARQ feedback for the a number of CBs. The TDD module 605-a, in combination with transmitter 515-a, for example, may thus transmit HARQ feedback for one or several CBs during the uplink TTI.

The PDFICH/PUFICH module 620, in combination with receiver 505-a, for example, may receive a first multiplexing format signal from a serving cell of the carrier, the first multiplexing format signal indicating a first multiplexing configuration of a first TTI as described above with reference to FIGS. 2-4. For example, the PDFICH/PUFICH module 620 may be configured to receive a PDFICH and identify a first multiplexing configuration based on the PDFICH. In some cases, the first multiplexing configuration is further based on a DL grant. The PDFICH/PUFICH module 620 may receive or identify an indication of a duration of the downlink TTI, which may be during the downlink TTI. The PDFICH/PUFICH module 620 may receive or identify an indication of a duration of an uplink TTI that follows the downlink TTI. The indication of the uplink TTI duration may be received during the downlink TTI. In some cases, the indication of the duration of the uplink TTI may indicate that the duration of the uplink TTI is zero. The downlink TTI duration and a subsequent downlink TTI duration may form a downlink burst that is time division multiplexed on resources of the TDD configured carrier.

The PDFICH/PUFICH module 620 may, in combination with receiver 505-a, for example, receive a second multiplexing format signal from the serving cell indicating a second multiplexing configuration of a second TTI, and the second multiplexing configuration may be different from the first multiplexing configuration as described above with reference to FIGS. 2-4. The first multiplexing configuration may include a first TTI length for the first TTI and the second multiplexing configuration may include a second TTI length for the second TTI. For example, in one embodiment the PDFICH/PUFICH module 620 may be configured to receive a PUFICH and identify a TTI length of an UL TTI. In another embodiment, the PDFICH/PUFICH module 620 may be configured to receive a second PDFICH and identify a second multiplexing configuration for a DL TTI that is different from the first multiplexing configuration. The first multiplexing configuration and the second multiplexing configuration may each correspond to a multiplexing category selected from a multiplexing category group consisting of a TDD category, a TDM category, and an FDD category.

In some examples, separate PDFICH and PUFICH modules may be employed, and each may perform various functions of the PDFICH/PUFICH module 620 illustrated in FIG. 6. Separate PDFICH or PUFICH modules may, for instance, perform some or all of the functions described above with reference to the PDFICH/PUFICH module 620. PDFICH/PUFICH module 620 may thus include a PDFICH module to identify or receive PDFICH as described herein, and a PUFICH module may identify or receive PUFICH as described herein.

Figure 7:
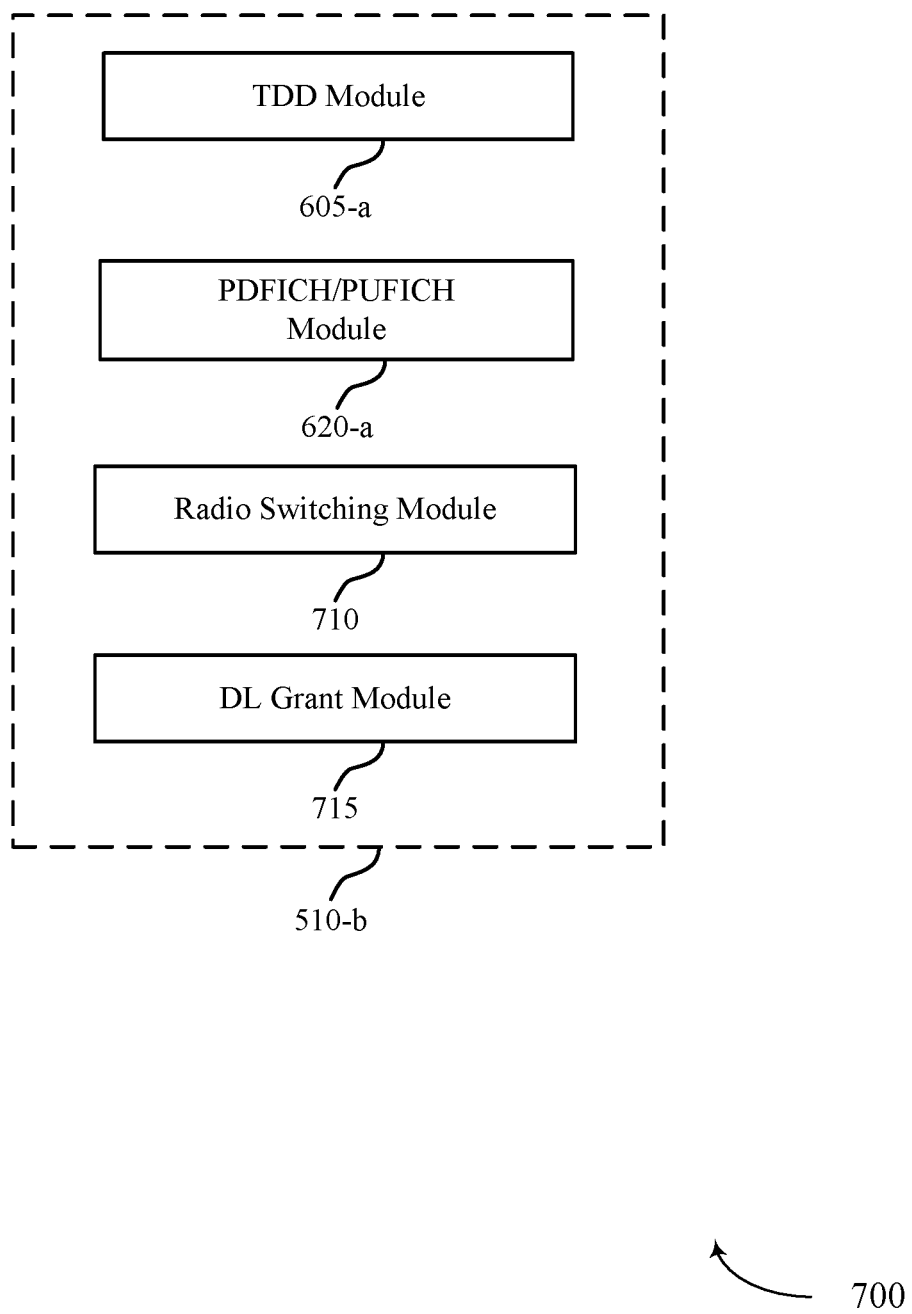
FIG. 7 shows a block diagram of a flexible multiplexing module configured for flexible multiplexing operation for DL data in accordance with various aspects of the present disclosure.

FIG. 7 shows a block diagram 700 of a flexible multiplexing module 510-b for flexible multiplexing operation for DL data in accordance with various aspects of the present disclosure. The flexible multiplexing module 510-b may be an example of aspects of a flexible multiplexing module 510 described with reference to FIGS. 5-6. The flexible multiplexing module 510-b may illustrate aspects of a processor, such as the processor 805 described with reference to FIG. 8. The flexible multiplexing module 510-b may include a TDD module 605-a and a PDFICH/PUFICH module 620-a. In some examples, the flexible multiplexing module 510-b includes a PDFICH/PUFICH module 620-a. Each of these modules may perform the functions described above with reference to FIG. 6. The flexible multiplexing module 510-b may also include a radio switching module 710 and a DL grant module 715. Each of these components may illustrate aspects of a processor, such as the processor 805 described with reference to FIG. 8.

The PDFICH/PUFICH module 620-a may, in conjunction with other modules of a UE 115 (e.g., UE 115-e of FIG. 6)

receive a third multiplexing format signal from the serving cell indicating a third TTI length of a third TTI, where the first TTI and the second TTI are DL TTIs and the third TTI is an UL TTI between the first TTI and the second TTI, as described above with reference to FIGS. 2-4. Thus, the PDFICH/PUFICH module 620-*a* may receive a PUFICH and identify a length of an UL TTI. In some examples, the third multiplexing format signal indicates an absence of the UL TTI such that the second TTI may be contiguous to the first TTI. The PDFICH/PUFICH module 620-*a* may also receive, in conjunction with other modules, a fourth multiplexing format signal (e.g., a second PUFICH) indicating a length of a fourth TTI, where the fourth TTI is an UL TTI following the second TTI. In some examples, the PDFICH/PUFICH module 620-*a* is a submodule of PDFICH/PUFICH module 620-*a*. Alternatively, PDFICH/PUFICH module 620-*a* may perform all of the functions described with reference to the PDFICH/PUFICH module 620-*a*.

The radio switching module 710 may switch a radio from a DL configuration to an UL configuration based on the first multiplexing format signal and the third multiplexing format signal as described above with reference to FIGS. 2-4. The radio switching module 710 may also switch the radio from the UL configuration to the DL configuration based at least in part on the third multiplexing format signal. The radio switching module 710 may, in some examples, switch a radio from a DL configuration to an UL configuration based on the second multiplexing format signal and the fourth multiplexing format signal. The radio switching module 710 may also switch the radio from the UL configuration to the DL configuration based at least in part on the fourth multiplexing format signal.

The DL grant module 715 may decode a first DL grant from the serving cell during (or immediately after) the first TTI, where receiving the first transmission is based at least in part on the first DL grant as described above with reference to FIGS. 2-4. The DL grant module 715 may also decode a second DL grant from the serving cell during (or immediately after) the second TTI, wherein the second TTI is a DL TTI. Additionally or alternatively, the DL grant module 715 may receive a downlink grant during the downlink TTI, the downlink grant may assign a first set of resources during the downlink TTI. The DL grant module 715 may receive an additional downlink grant which may assign a second set of resources during the downlink TTI.

In some cases, the first set of resources and the second set of resources may be frequency division multiplexed during the downlink TTI. The DL grant module 715 may receive an indication of a duration of a subsequent downlink TTI that follows the downlink TTI, wherein the indication of the subsequent TTI duration is received during the subsequent downlink TTI. The DL grant module 715 may receive an indication of a duration of a subsequent uplink TTI that follows the subsequent downlink TTI. The indication of the subsequent uplink TTI duration may be received during the subsequent downlink TTI. The DL grant module 715 may facilitate communications based at least in part on the indication of the subsequent downlink TTI duration or the indication of the subsequent uplink TTI duration.

The components of UE 115-*d*, UE 115-*e*, or flexible multiplexing module 510-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

While much of the discussion of the UEs 115-*d* and 115-*e* is in the context of a TDD system, those skilled in the art will recognize the applicability of the described techniques to other systems, including FDD systems.

Figure 8:
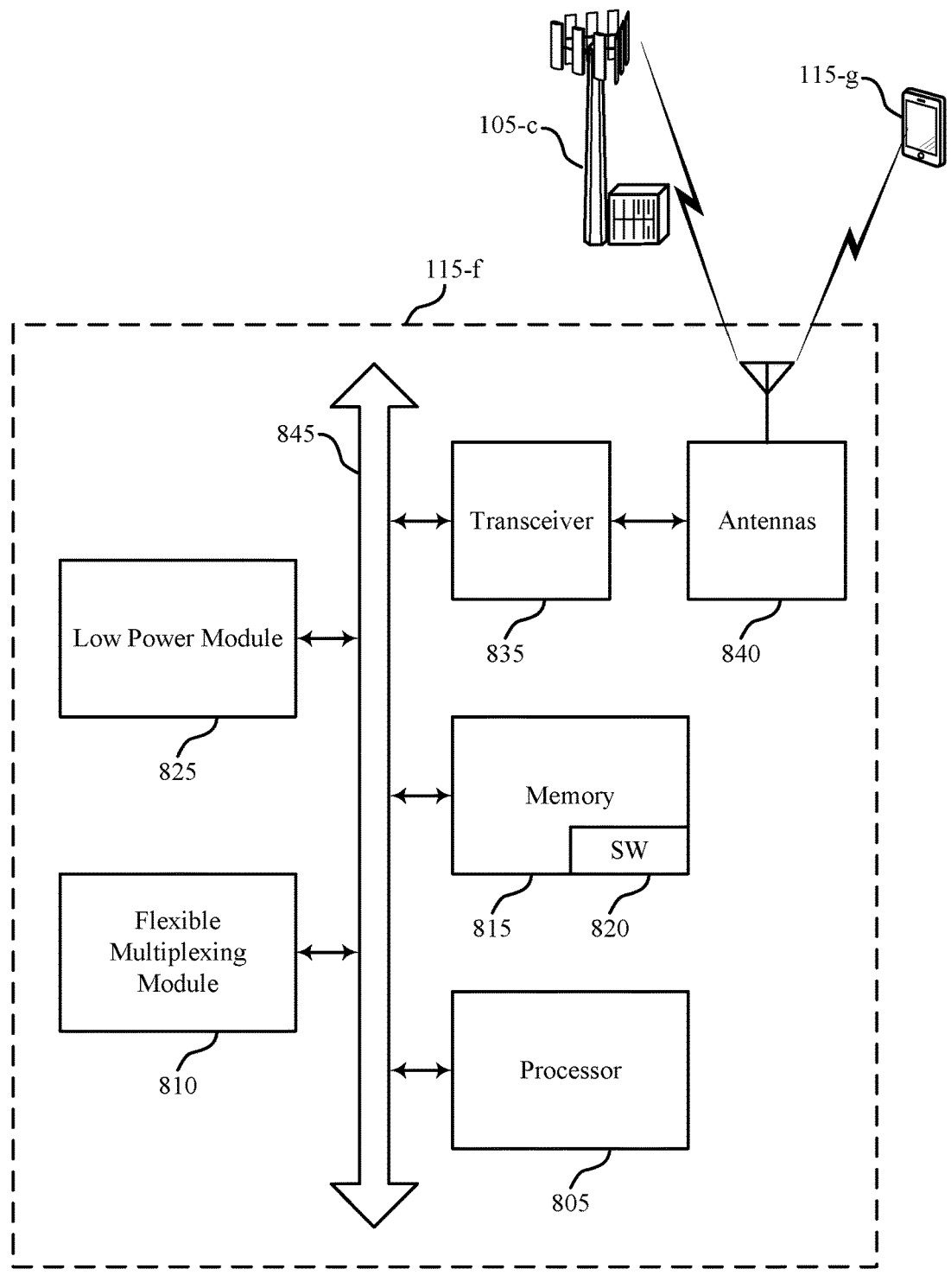
FIG. 8 illustrates a block diagram of a system including a UE configured for flexible multiplexing operation for DL data in accordance with various aspects of the present disclosure.

FIG. 8 shows a diagram of a system 800 including a UE 115 configured for flexible multiplexing operation for DL data in accordance with various aspects of the present disclosure. System 800 may include UE 115-*f*, which may be an example of a UE 115 described above with reference to FIGS. 1-7. UE 115-*f* may include a flexible multiplexing module 810, which may be an example of a flexible multiplexing module 510 described with reference to FIGS. 5-7. UE 115-*f* may also include a low power module 825. UE 115-*f* may also include components for bi-directional voice and data communications including components for transmitting communications and components for receiving communications. For example, UE 115-*f* may communicate bi-directionally with UE 115-*g* or base station 105-*c*.

The low power module 825 may configure components of UE 115-*f* for low power operation, (e.g., based on identifying an absence of a DL grant for the UE during the first TTI as described above with reference to FIGS. 2-4). For example, the low power module 825 may cause the UE 115-*f* to enter a low power state during the third TTI based on the third multiplexing format signal (e.g., PUFICH) and the absence of the UL grant. The low power module 825 may also identify an absence of a DL grant for the UE during the second TTI and cause UE 115-*f* to enter a low power state during the second TTI based on the second multiplexing format signal (e.g., PDFICH) or the absence of the DL grant.

UE 115-*f* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*f* may include a single antenna 840, UE 115-*f* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., flexible multiplexing operation for DL data in TDD systems, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
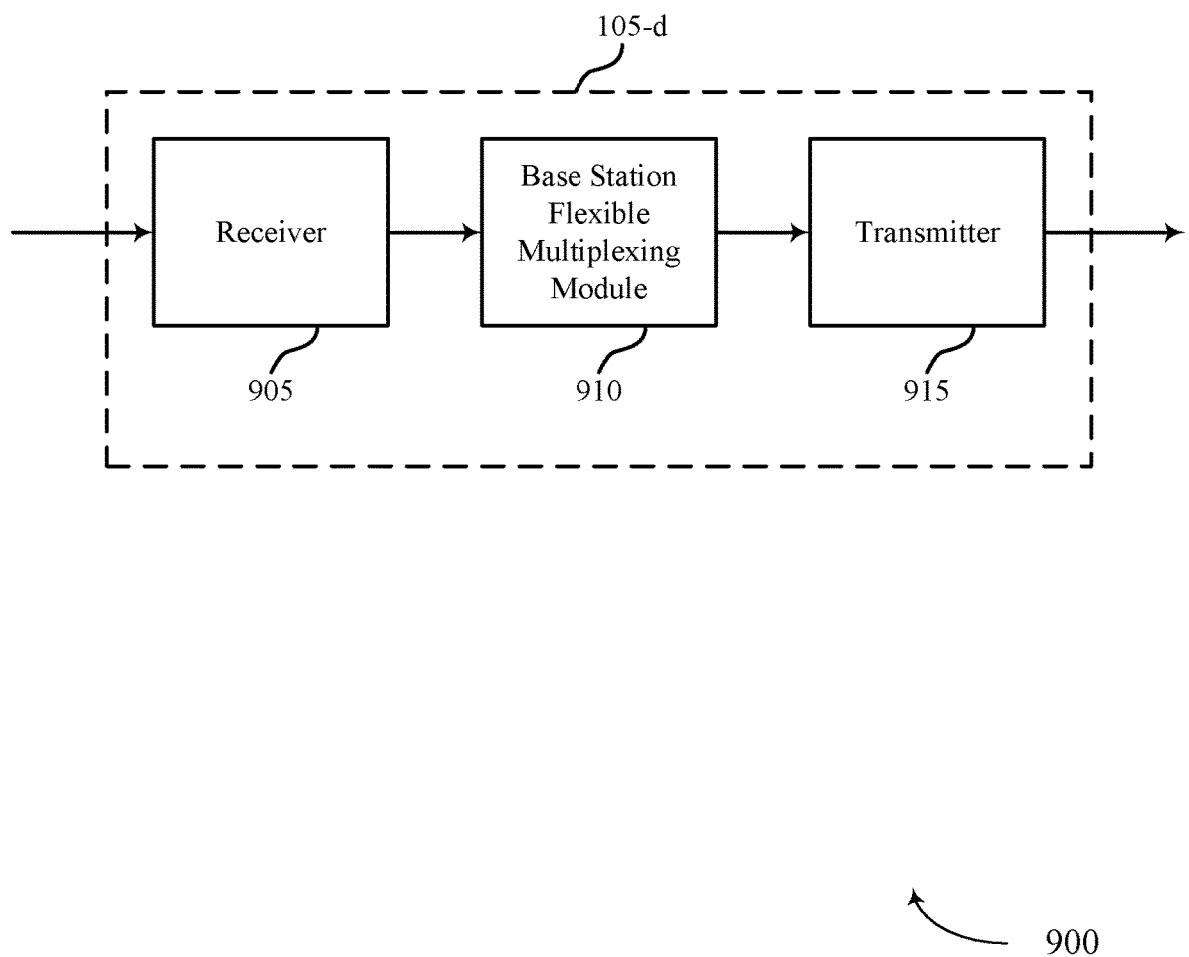
FIG. 9 shows a block diagram of a base station configured for flexible multiplexing operation for DL data in accordance with various aspects of the present disclosure.

FIG. 9 shows a block diagram 900 of a base station 105-d configured for flexible multiplexing operation for DL data in accordance with various aspects of the present disclosure. Base station 105-d may be an example of aspects of a base station 105 described with reference to FIGS. 1-8. Base station 105-d may include a receiver 905, a base station flexible multiplexing module 910, or a transmitter 915. Base station 105-d may also include a processor. Each of these components may be in communication with one another.

The receiver 905 may receive information such as packets, user data, or control information associated with various information channels (e.g., control channels, data channels, and information related to flexible multiplexing operation for DL data in TDD systems, etc.). Information may be passed on to the base station flexible multiplexing module 910, and to other components of base station 105-d. The receiver 905 may illustrate aspects of a transceiver 1235 described with reference to FIG. 12.

The base station flexible multiplexing module 910 may configure a TDD carrier. In some examples, the base station flexible multiplexing module 910 may also select a multiplexing configuration, and, in conjunction with the transmitter 915, transmit a first multiplexing format signal on the TDD carrier, the first multiplexing format signal indicating a first multiplexing configuration of a first TTI, transmit a first data transmission on the TDD carrier to a first UE during the first TTI based on the first multiplexing configuration, and transmit a second multiplexing format signal on the TDD carrier, the second multiplexing format signal indicating a second multiplexing configuration of a second TTI. The second multiplexing configuration may be different from the first multiplexing configuration, as described above with reference to FIGS. 2-4.

Additionally or alternatively, the base station flexible multiplexing module 910, such as along with the transmitter 915, may transmit an indication of a duration of a downlink TTI, such as during the downlink TTI, transmit an indication of a duration of an uplink TTI that follows the downlink TTI, and facilitate communications based at least in part on the indication of the downlink TTI and the indication of the uplink TTI. The indication of the uplink TTI duration may be transmitted during the downlink TTI. The base station flexible multiplexing module 910 may be an aspect of a processor, such as the processor 1205 described with reference to FIG. 12.

The transmitter 915 may transmit signals received from other components of base station 105-d. In some embodiments, the transmitter 915 may be collocated with the receiver 905 in a transceiver module. The transmitter 915 may include a single antenna, or it may include a plurality of antennas. In some examples, the transmitter 915 may transmit a first data transmission on the TDD carrier to a first UE during the first TTI based on the first multiplexing configuration. In some examples, the transmitter 915 may transmit a second data transmission to a second UE during the second TTI based on the second multiplexing configuration and the second DL grant. The transmitter 915 may also transmit a second data transmission to the second UE during the first TTI using the second set of frequency tones, wherein the first data transmission utilizes the first set of frequency tones. The transmitter 915 may illustrate aspects of a transceiver 1235 described with reference to FIG. 12.

Figure 10:
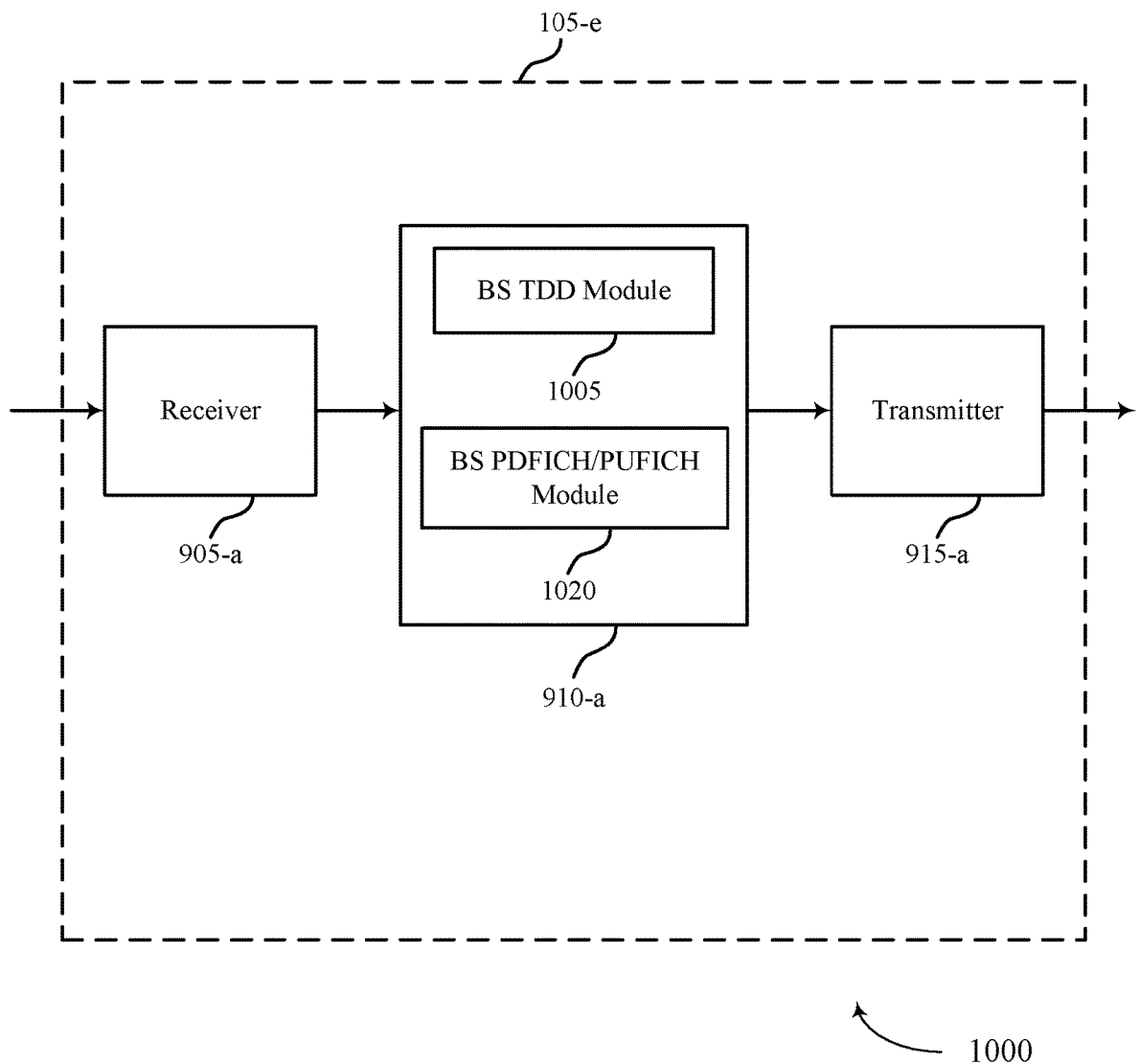
FIG. 10 shows a block diagram of a base station flexible multiplexing module configured for flexible multiplexing operation for DL data in accordance with various aspects of the present disclosure.

FIG. 10 shows a block diagram 1000 of a base station 105-e for flexible multiplexing operation for DL data in accordance with various aspects of the present disclosure. Base Station 105-e may be an example of aspects of a base station 105 described with reference to FIGS. 1-9. Base Station 105-e may include a receiver 905-a, a base station flexible multiplexing module 910-a, or a transmitter 915-a. Base Station 105-e may also include a processor. Each of these components may be in communication with one another. The base station flexible multiplexing module 910-a may also include a BS TDD module 1005 and a BS PDFICH/PUFICH module 1020. Each of these components may illustrate aspects of a processor, such as the processor 1205 described with reference to FIG. 12.

The receiver 905-a may receive information which may be passed on to base station flexible multiplexing module 910-a, and to other components of base station 105-e. The receiver 905-a may illustrate aspects of a transceiver 1235 described with reference to FIG. 12. The base station flexible multiplexing module 910-a may perform the operations described above with reference to FIG. 9. The base station flexible multiplexing module 910-a may be an aspect of a processor, such as the processor 1205 described with reference to FIG. 12. The transmitter 915-a may transmit signals received from other components of base station 105-e. The transmitter 915-a may illustrate aspects of a transceiver 1235 described with reference to FIG. 12.

The BS TDD module 1005 may configure a TDD carrier as described above with reference to FIGS. 2-4. The BS TDD module 1005 may further coordinate communications based at least in part on the indication of the downlink TTI and the indication of the uplink TTI.

Additionally or alternatively, the BS TDD module 1005 may, in combination with transmitter 915-a, for example, transmit a set of TBs during the downlink TTI. The downlink TTI may include a variable TTI. The BS TDD module 1005 may determine, or receive, HARQ feedback for each TB of the set of TBs. A number of TBs in the set may be based at least in part on the duration of the downlink TTI. The BS TDD module 1005 may receive the HARQ feedback for at least one TB of the set of TBs during the uplink TTI.

The BS PDFICH/PUFICH module 1020 may transmit a first multiplexing format signal on the TDD carrier, the first multiplexing format signal indicating a first multiplexing configuration of a first TTI as described above with reference to FIGS. 2-4. For example, the BS PDFICH/PUFICH module 1020 may be configured to select a TDD, TDM, or FDM multiplexing configuration based on latency and efficiency parameters. Then BS PDFICH/PUFICH module 1020 may be configured to transmit the first multiplexing format signal (e.g., PDFICH) together with a DL grant according to the selected first multiplexing configuration.

Additionally or alternatively, the BS PDFICH/PUFICH module 1020 may identify a downlink TTI of a TDD configured carrier or prepare an indicator of a downlink TTI of a TDD configured carrier. The BS PDFICH/PUFICH module 1020 may transmit or identify an indication of a duration of the downlink TTI, such as during the downlink TTI. The BS PDFICH/PUFICH module 1020 may transmit or identify an indication of a duration of an uplink TTI that follows the downlink TTI. The indication of the uplink TTI duration may be transmitted during the downlink TTI. In some cases, the indication of the duration of the uplink TTI may indicate that the duration of the uplink TTI is zero. The downlink TTI duration and a subsequent downlink TTI duration may form a downlink burst that is time division multiplexed on resources of the TDD configured carrier.

The BS PDFICH/PUFICH module 1020 may transmit a second multiplexing format signal on the TDD carrier, the second multiplexing format signal indicating a second multiplexing configuration of a second TTI, the second multiplexing configuration different from the first multiplexing configuration as described above with reference to FIGS. 2-4. In some examples, the first multiplexing configuration includes a first TTI length for the first TTI and the second multiplexing configuration comprises a second TTI length for the second TTI. The first multiplexing configuration and the second multiplexing configuration may each correspond to a multiplexing category selected from a multiplexing category group consisting of a TDD category, a TDM category, and an FDD category. In some embodiments, the BS PDFICH/PUFICH module 1020 may be configured to select a second multiplexing configuration (e.g., TDD, TDM, or FDM) different from the first multiplexing configuration based on updated latency and efficiency parameters. Then BS PDFICH/PUFICH module 1020 may be configured to transmit the second multiplexing format signal (e.g., PDFICH or PDFICH) together with a DL or UL grant according to the selected first multiplexing configuration.

In some examples, separate BS PDFICH and BS PDFICH modules may be employed, and each may perform various functions of the BS PDFICH/PUFICH module 1020 illustrated in FIG. 10. Separate BS PDFICH or BS PDFICH modules may, for instance, perform some or all of the functions described above with reference to the BS PDFICH/PUFICH module 1020. BS PDFICH/PUFICH module 1020 may thus include a BS PDFICH module to identify or transmit PDFICH as described herein, and a BS PDFICH module may identify or transmit PDFICH as described herein.

Figure 11:
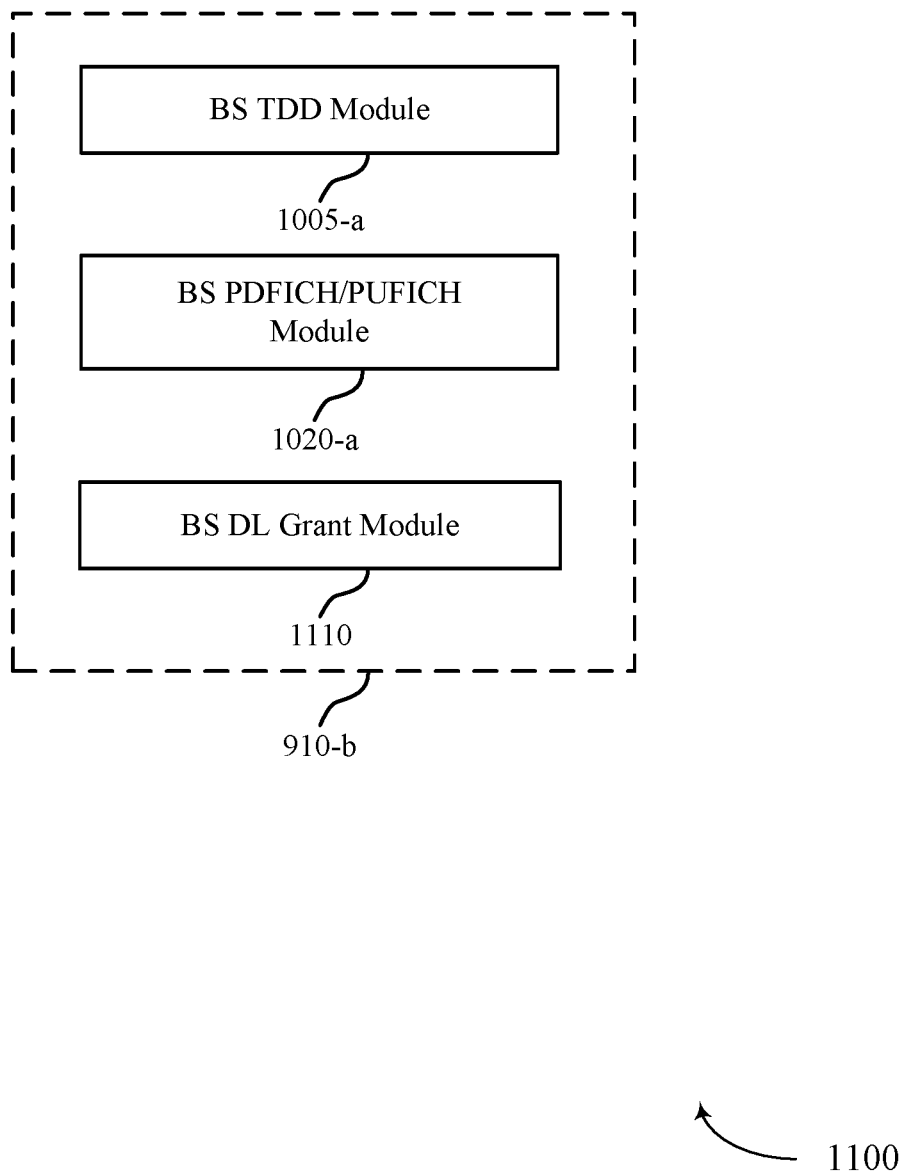
FIG. 11 shows a block diagram of a base station configured for flexible multiplexing operation for DL data in accordance with various aspects of the present disclosure.

FIG. 11 shows a block diagram 1100 of a base station flexible multiplexing module 910-b for flexible multiplexing operation for DL data in accordance with various aspects of the present disclosure. The base station flexible multiplexing module 910-b may be an example of aspects of a base station flexible multiplexing module 910 described with reference to FIGS. 9-10. The base station flexible multiplexing module 910-b may include a BS TDD module 1005-a and a BS PDFICH/PUFICH module 1020-a. In some examples, the base station flexible multiplexing module 910-b includes a BS PDFICH/PUFICH module 1020-a. Each of these modules may perform the functions described above with reference to FIG. 10. The base station flexible multiplexing module 910-b may also include a BS DL grant module 1110.

The BS PDFICH/PUFICH module 1020-a may, in conjunction with other modules, transmit a third multiplexing format signal indicating a third TTI length of a third TTI, wherein the first TTI and the second TTI are DL TTIs and the third TTI is an UL TTI between the first TTI and the second TTI as described above with reference to FIGS. 2-4. In some examples, the third multiplexing format signal indicates an absence of the UL TTI such that the second TTI may be contiguous to the first TTI. The BS PDFICH/PUFICH module 1020-a may also transmit a fourth multiplexing format signal indicating a fourth TTI length of a fourth TTI, wherein the fourth TTI is an UL TTI following the second TTI. In some examples, the BS PDFICH/PUFICH module 1020-a is a submodule of BS PDFICH/PUFICH module 1020-a. Alternatively, BS PDFICH/PUFICH module 1020-a may perform all of the functions described with reference to the BS PDFICH/PUFICH module 1020-a.

The BS DL grant module 1110 may transmit a second DL grant to a second UE during the second TTI as described above with reference to FIGS. 2-4. The BS DL grant module 1110 may also transmit a first DL grant to the first UE during the first TTI. The BS DL grant module 1110 may also transmit a second DL grant to a second UE during the first TTI, wherein the first DL grant indicates a first set of frequency tones and the second DL grant indicates a second set of frequency tones.

Additionally or alternatively, the BS DL grant module 1110 may transmit a downlink grant during the downlink TTI, the downlink grant may assign a first set of resources during the downlink TTI. The BS DL grant module 1110 may transmit an additional downlink grant which may assign a second set of resources during the downlink TTI. In some cases, the first set of resources and the second set of resources may be frequency division multiplexed during the downlink TTI. The BS DL grant module 1110 may transmit a subsequent downlink grant during a subsequent downlink TTI which follows the downlink TTI. The BS DL grant module 1110 may transmit an indication of a duration of the subsequent downlink TTI during the subsequent downlink TTI. The BS DL grant module 1110 may transmit an indication of a duration of a subsequent uplink TTI that follows the subsequent downlink TTI. The indication of the subsequent uplink TTI duration may be transmitted during the subsequent downlink TTI. The BS DL grant module 1110 may facilitate communications based at least in part on the subsequent downlink grant, the indication of the subsequent downlink TTI duration, or the indication of the subsequent uplink TTI duration.

The components of base station 105-d, base station 105-e, or base station flexible multiplexing module 910-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors. While much of the discussion of the base stations 105-d and 105-e is in the context of a TDD system, those skilled in the art will recognize the applicability of the described techniques to other systems, including FDD systems.

Figure 12:
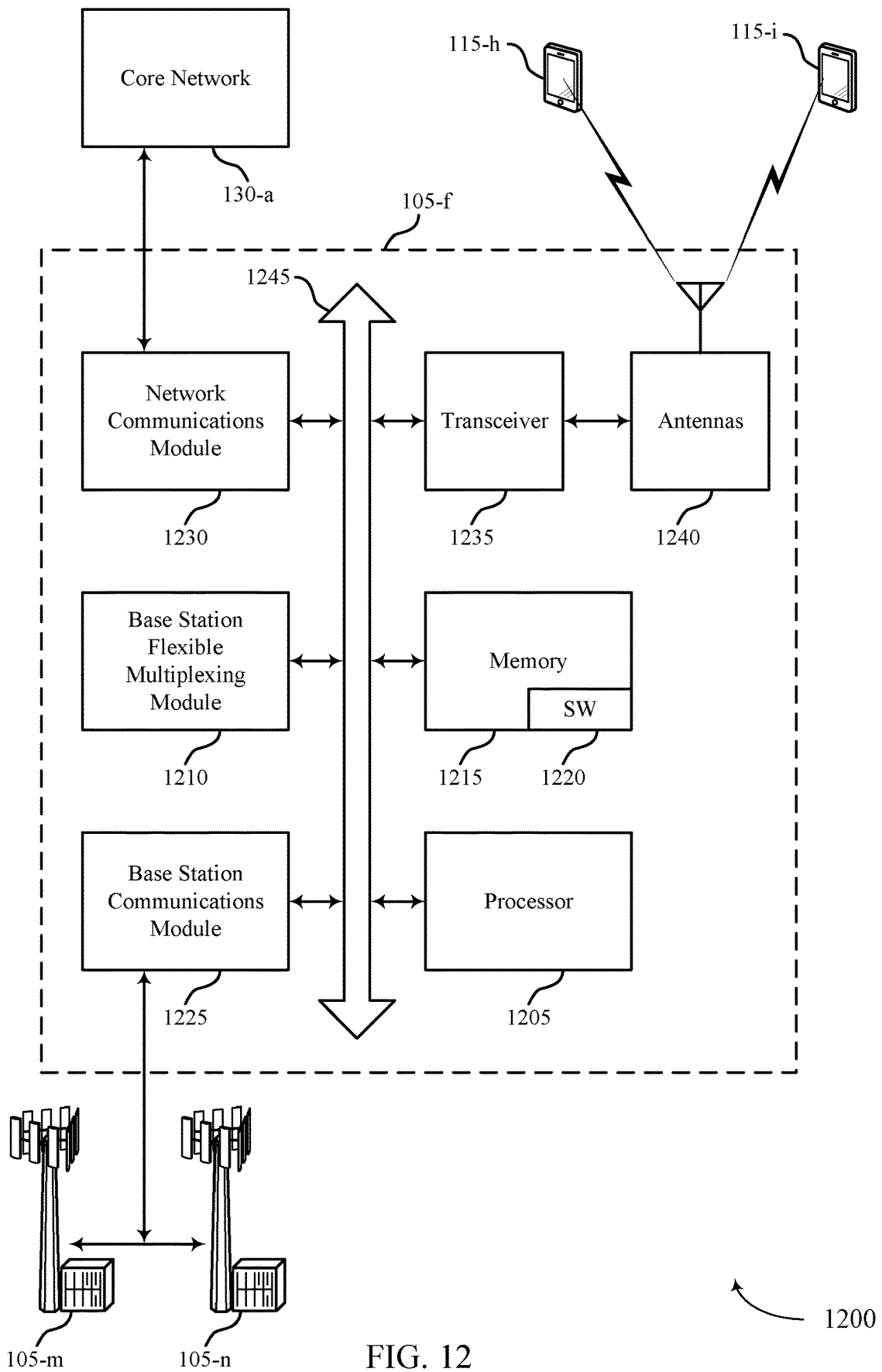
FIG. 12 illustrates a block diagram of a system including a base station configured for flexible multiplexing operation for DL data in accordance with various aspects of the present disclosure.

FIG. 12 shows a diagram of a system 1200 including a base station 105 configured for flexible multiplexing operation for DL data in accordance with various aspects of the present disclosure. System 1200 may include base station 105-f, which may be an example of a base station 105 described above with reference to FIGS. 1-11. Base Station 105-f may include a base station flexible multiplexing module 1210, which may be an example of a base station flexible multiplexing module 910 described with reference to FIGS. 9-11. Base Station 105-f may also include components for bi-directional voice and data communications including components for transmitting communications and components for receiving communications. For example, base station 105-f may communicate bi-directionally with UE 115-h or UE 115-i.

In some cases, base station 105-f may have one or more wired backhaul links. Base station 105-f may have a wired backhaul link (e.g., S1 interface, etc.) to the core network 130. Base station 105-f may also communicate with other base stations 105, such as base station 105-m and base station 105-n via inter-base station backhaul links (e.g., an X2 interface). Each of the base stations 105 may communicate with UEs 115 using the same or different wireless communications technologies. In some cases, base station 105-*f* may communicate with other base stations such as 105-*m* or 105-*n* utilizing base station communications module 1225. Additionally or alternatively, base station communications module 1225 may provide an X2 interface within an LTE/LTE-A wireless communication network technology to provide communication between some of the base stations 105. In some embodiments, base station 105-*f* may communicate with other base stations through core network 130. In some cases, base station 105-*f* may communicate with the core network 130 through network communications module 1230.

The base station 105-*f* may include a processor 1205, memory 1215 (including software (SW) 1220), transceiver 1235, and antenna(s) 1240, which each may be in communication, directly or indirectly, with one another (e.g., over bus system 1245). The transceiver 1235 may be configured to communicate bi-directionally, via the antenna(s) 1240, with the UEs 115, which may be multi-mode devices. The transceiver 1235 (or other components of base station 105-*f*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*f* may include multiple transceivers 1235, each with one or more associated antennas 1240. The transceiver module may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1210 to perform various functions described herein (e.g., flexible multiplexing operation for DL data in TDD systems, selecting coverage enhancement techniques, call processing, database management, message routing, etc.). Alternatively, the software code 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
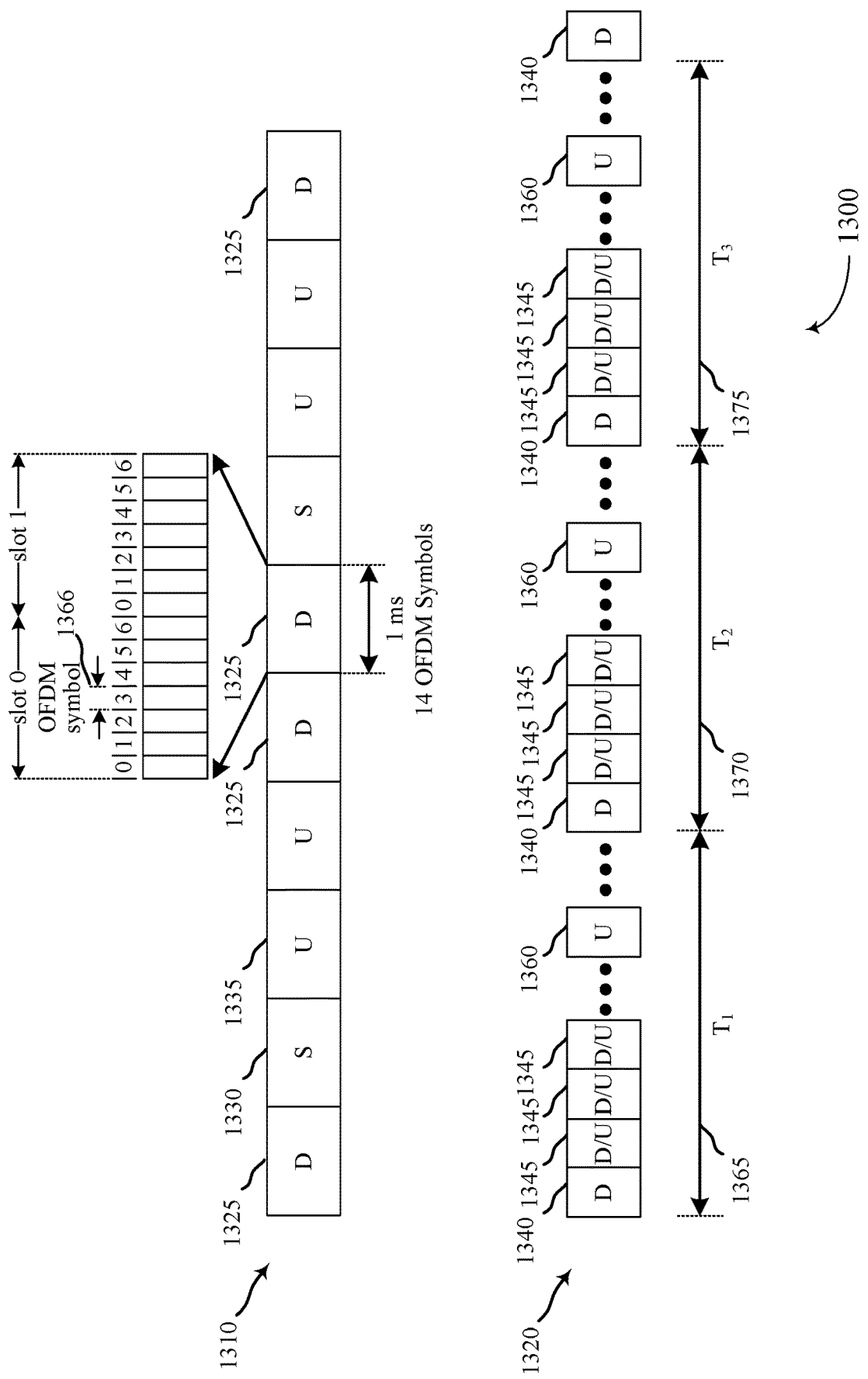
FIG. 13 illustrates an example of radio frames and different subframes that may be transmitted using different cells of a wireless communication system in accordance with aspects of the present disclosure.

As discussed above, various examples provide communications in a wireless communications system, such as wireless communications system 100 of FIG. 1, that utilize variable TTIs. FIG. 13 is a block diagram 1300 conceptually illustrating an example of radio frames and different subframes that may be transmitted using different cells of a wireless communication system, such as wireless communications system 100 of FIG. 1, in accordance with aspects of the present disclosure. The radio frames of FIG. 13 may be transmitted using portions of the wireless communications system 100 described with reference to FIG. 1 between one or more base stations 105 and one or more UEs 115, for example. In this example, a legacy PCell transmission 1310 may include a TDD frame that include ten 1 ms subframes, including downlink subframes 1325, special subframes 1330, and uplink subframes 1335. The downlink subframes 1325, special subframes 1330, and uplink subframes 1335 may include a subframe structure defined according to established LTE standards, which may include 14 symbols 1366 within each 1 ms subframe. In some examples, downlink subframes 1325 may include downlink orthogonal frequency division multiplexing (OFDM) symbols, uplink subframes may include single carrier frequency division multiplexing (SC-FDM) symbols, and special subframes 1330 may include both uplink SC-FDM symbols and downlink OFDM symbols.

In the example of FIG. 13, SCell transmissions 1320 may include low latency or burst mode transmissions that may replace the legacy frame structure with a TDD-based frame structure that allows for dynamic switching between downlink and uplink symbols and for variable TTI lengths. While the example of FIG. 13 shows the low latency or burst mode transmissions on a SCell, it will be understood that such transmission structures, as well as various of the techniques and principles described herein, may be implemented in other transmissions, such as within one or more burst mode subframes of a legacy LTE frame, in other PCell transmissions, in licensed or unlicensed spectrum or the like. In the example of FIG. 13, the SCell may be an eCC, and the SCell transmissions 1320, which may be referred to as eCC transmissions, may include designated downlink symbols 1340 and designated uplink symbols 1360, and flexible symbols 1345 that may be allocated as uplink or downlink symbols based on particular traffic needs.

The designated downlink symbols 1340 and designated uplink symbols 1360 may be provided to enable various radio resource management (RRM) measurements, synchronization, CSI feedback, random access channel (RACH) and scheduling request (SR) communications, for example. The designated downlink symbols 1340 and designated uplink symbols 1360 may be configured by a base station, such as base stations 105 of FIG. 1, and may be communicated to one or more UEs, such as UEs 115 of FIG. 1, via RRC signaling, a system information block (SIB), or physical downlink control channel (PDCCH) signaling. As mentioned, flexible symbols 1345 may be switched to be uplink or downlink symbols, and the indication of such configurations may be provided by a base station in an allocation of uplink or downlink resources that is provided to a UE 115. Based on such an allocation, the UE may determine that a certain number of symbols 1340, 1345, 1360 may be allocated for communications between the UE and the base station.

With such dynamic switching of symbols, a base station and UE are not required to look ahead in terms of a number of uplink or downlink subframes for an entire radio frame, but may determine particular resource allocations in a dynamic and flexible manner. The number of resources allocated for a particular UE may be determined, for example, on an amount of data to be transmitted between the UE and the base station, and a latency requirement or quality of service (QoS) requirement associated with the data. In some examples, each of the symbols 1340, 1345, and 1360 may have a reduced symbol duration relative to the legacy OFDM or SC-FDM symbols (e.g., symbols 1366), and in some examples have a symbol duration of 11.36 μs per symbol, including a useful symbol duration of 8.33 μs and a cyclic prefix duration of 2.03 μs. Symbols 1340, 1345, and 1360 may have increased tone spacing for subcarriers relative to legacy symbols, and in some examples have a tone spacing of 120 kHz, and utilize a relatively wide bandwidth (e.g., 80 MHz).

Such shortened symbol duration and dynamic switching between downlink and uplink communications may allow for reduced ACK/NACK turn-around time, and may thus provide relatively low latency transmissions of data. In some examples, delay sensitive data may be transmitted using SCell transmissions 1320, while other data that is not as delay sensitive may be transmitted using PCell transmissions 1310. In some examples, a number of symbols 1340, 1345, and 1360 may be allocated to a first UE for a first time period ($T_1$) 1365, and may be allocated to the first UE or one or more other UEs during a second time period ($T_2$) 1370 and third time period ($T_3$) 1375. The length of such time periods 1365, 1370, 1375 may be determined according to a variety of factors including, for example, an amount of data to be transmitted, a QoS associated with the data, a delay requirement of the data, a number of other UEs present, or channel conditions, to name but a few.

Figure 14:
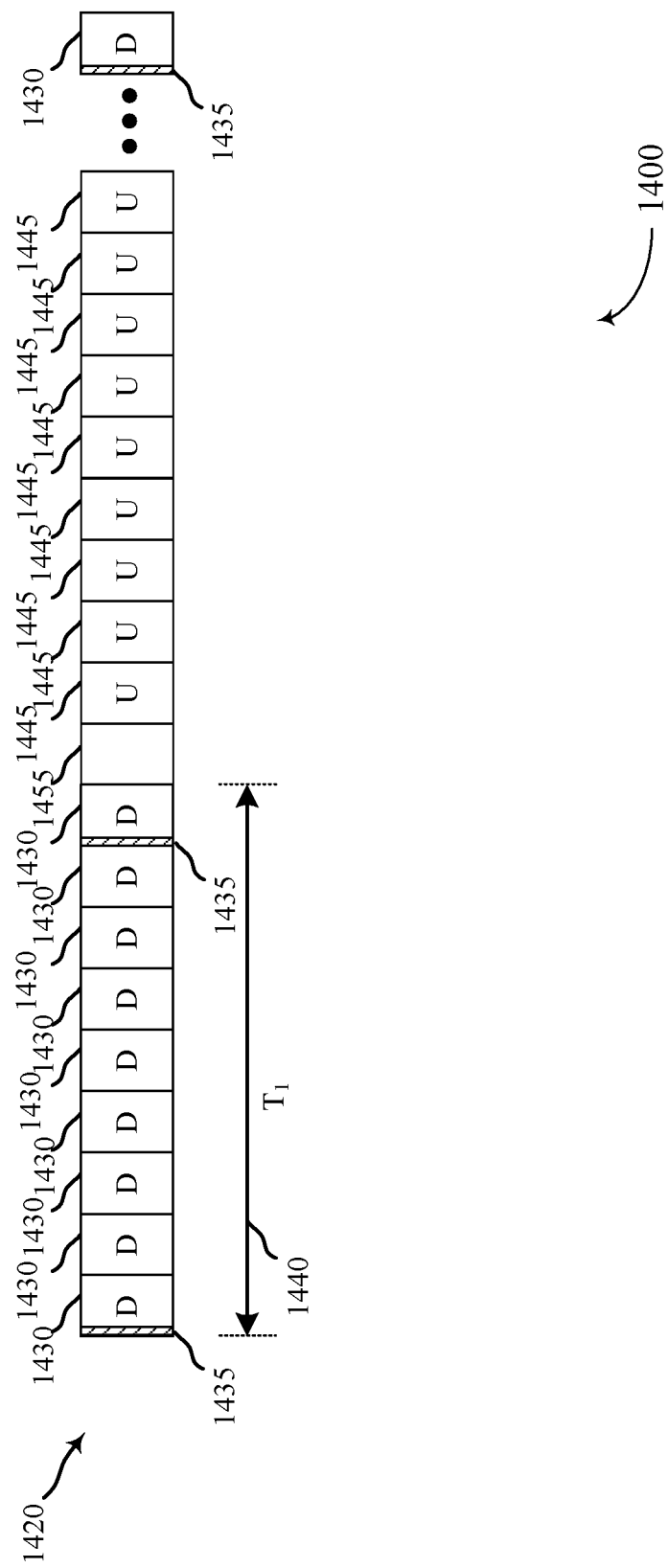
FIG. 14 illustrates an example of enhanced component carrier (eCC) transmissions in accordance with various aspects of the present disclosure.

With reference now to FIG. 14 a block diagram 1400 conceptually illustrating an example of eCC transmissions is discussed. In the example of FIG. 14, eCC transmissions 1420 may include a number of symbols allocated as uplink or downlink symbols. Such eCC transmissions 1420 may be transmitted using different cells of a wireless communication system, such as wireless communications system 100 of FIG. 1, in accordance with aspects of the present disclosure. In some examples, eCC transmissions 1420 are transmitted on a SCell such as discussed above with respect to FIG. 13. In the example of FIG. 14, a first time period ($T_1$) 1440 may include a downlink grant of nine symbols 1430. In this example, an initial downlink symbol 1430 may include control information 1435 that may indicate resource allocations for an upcoming time period (e.g., $T_1$ 1440).

In some examples, the control information 1435 may include a downlink grant of resources to a UE that include the subsequent symbols 1430. In this example, a subsequent transmission of control information 1435 may include an uplink grant of eight uplink symbols 1445. A blank symbol 1455 may be included between a downlink symbol 1430 and an uplink symbol 1445, to allow time for switching at a UE. In some examples, bundles of symbols 1430, 1445 may be allocated to a UE by a base station, with a length of such bundles controlled by control information (e.g., dynamic grants) 1435. A relatively large number of symbols may be allocated to provide enhanced efficiency in some examples that are somewhat less delay sensitive.

Figure 15:
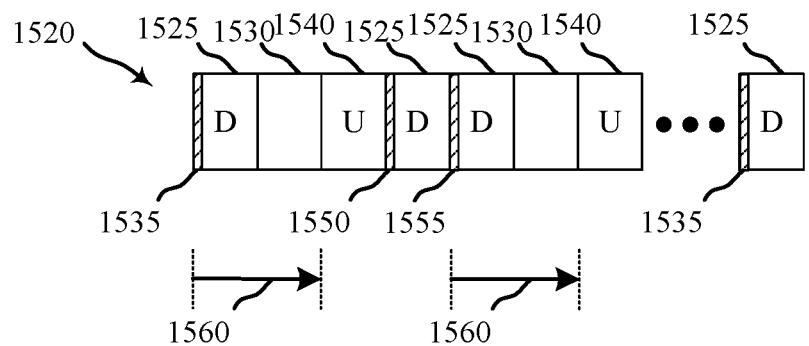
FIG. 15 illustrates an example of eCC transmissions in accordance with various aspects of the present disclosure.

In other examples, if data transmissions are relatively delay sensitive, dynamic grants to a particular UE may be relatively short in order to provide for reduced ACK/NACK turn-around times. FIG. 15 illustrates an example 1500 of relatively short grants. In this example, eCC transmissions 1520 may include resource allocations of only one or two symbols. The eCC transmissions 1520 of FIG. 15 may be transmitted using a wireless communication system, such as wireless communications system 100 of FIG. 1, in accordance with aspects of the present disclosure.

In some examples, eCC transmissions 1520 are transmitted on a SCell, such as discussed above with respect to FIGS. 13 and 14. In this example, control information 1535 in the initial downlink symbol 1525 may include a downlink grant of one symbol (e.g., TTI=1 symbol) and an uplink grant of one symbol (e.g., TTI=1 symbol). The uplink grant, in various examples, may take effect at a two symbol minimum from the receipt of the control information 1535, in order to accommodate blank symbol 1530 and allow for switching at the UE to transmit uplink symbol 1540. In this example, eCC transmissions 1520 include a transmission of second control information 1550 which, in this example, is a downlink grant for two symbols (e.g., TTI=2 symbols), with third control information 1555 providing a subsequent uplink grant which may have a TTI of one or more uplink symbols 1540. The time periods or TTIs 1560 are 2 symbols.

Figure 16:
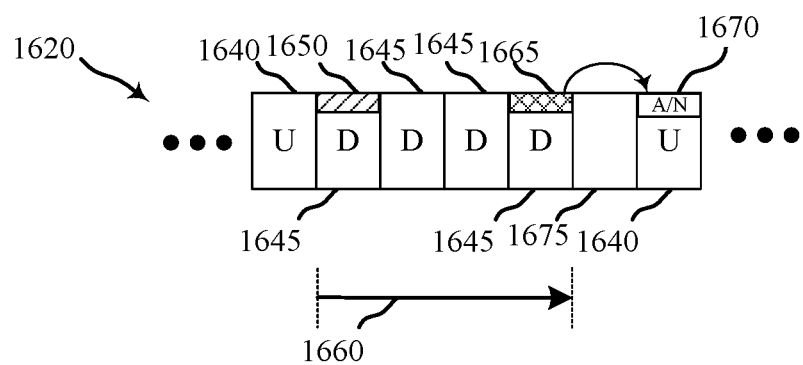
FIG. 16 illustrates an example of feedback for a carrier employing variable transmission time intervals (TTI) in accordance with various aspects of the present disclosure.

As mentioned above, various examples provide that feedback for several downlink TTIs, or several UEs, may be transmitted during a single uplink TTI. FIG. 16 illustrates an example 1600 of feedback for a carrier employing variable TTI in accordance with various aspects of the present disclosure. In this example, feedback for downlink eCC transmissions 1620 may be transmitted at the first uplink symbol opportunity. The eCC transmissions 1620 of FIG. 16 may be transmitted using a wireless communication system, such as wireless communications system 100 of FIG. 1, in accordance with aspects of the present disclosure. In some examples, eCC transmissions 1620 are transmitted on a SCell, such as discussed above with respect to FIGS. 13-15. The eCC transmission 1620 may include uplink symbols 1640 and downlink symbols 1645. In this example, a downlink grant 1650 may be for four (4) downlink symbols 1645, such that a downlink TTI 1660 is equal to four (4) symbols. A downlink grant 1650 may, however, be for any number of symbols, such that the downlink TTI 1660 is variable. Or, in some cases, a downlink grant 1650 may assign a pre-determined number of downlink symbols 1645. For example, a system may be configured such that each downlink grant 1650 assigns one of several pre-determined number of downlink symbols (e.g., one (1), five (5), ten (10), etc.).

An uplink grant 1665 received during the downlink TTI 1660 may grant resources for feedback, such as ACK/NACK 1670 block during the first uplink symbol 1640 following the downlink TTI 1660. A UE may thus transmit feedback (ACK/NACK 1670) as a block for all TBs of the preceding downlink symbol burst—e.g., the downlink TTI 1660. In some cases, several different UEs will be scheduled downlink resources, and will receive downlink symbols 1645, before an uplink symbol 1640 is available. Accordingly, each UE may transmit feedback a the first uplink symbol opportunity. An uplink TTI may include a single symbol period, or it may include several symbol periods. In either case, feedback (e.g., ACK/NACK 1670) for one or several TBs may be transmitted over the duration of the uplink TTI, such that the feedback transmission spans a number of uplink symbols.

Each TB of a downlink TTI 1660 may have a corresponding HARQ process, such that, within the ACK/NACK 1670 block, an ACK or NACK may be transmitted for each TB. Thus, if a single UE receives four (4) TBs during the downlink TTI 1660, the ACK/NACK 1670 block may include four (4) ACK/NACKs, one for each TB. Likewise, if one UE receives two (2) TBs during two symbols of the downlink TTI 1660, and another UE receives two (2) TBs during two symbols of the downlink TTI 1660, the ACK/NACK 1670 block may include four (4) ACK/NACKs, one for each TB. HARQ feedback transmitted in ACK/NACK 1670 block may thus be determined, in part, according to a time duration of the variable TTI duration. Each TB may include one or several code blocks. So, in some examples, a TB may include multiple code blocks and HARQ feedback for the TB may include feedback for multiple code blocks. But in other examples, a TB may include a single code block; and HARQ feedback for a TB may include feedback for a single code block.

In some examples, a blank symbol or switching interval 1675 may be included within the eCC transmissions 1620. This switching interval 1675 may provide a UE time to switch from a receive mode to a transmit mode. A UE may thus receive an uplink grant 1665 for a first uplink symbol 1640 following a switching interval 1675. Or, in some examples, a switching interval may itself convey to a UE that an uplink symbol 1640 is eminent, and the UE may transmit feedback on the next uplink symbol 1640 without the necessity of an uplink grant.

A maximum number of HARQ processes may be determined by the maximum number of ACK/NACK 1670 bits that can be reported in a single uplink symbol. That is, in some cases, uplink resources available for feedback may be limited. In such cases, feedback (e.g., ACKs/NACKs) for several TBs may be bundled. For instance, a single ACK/NACK may provide feedback for a number of TBs.

While not shown here, in some examples, an ACK/NACK 1670 block may span several uplink symbols. An uplink TTI may, for instance, be composed of several uplink symbols 1640, and an ACK/NACK 1670 block may be transmitted in more than one uplink symbol 1640 of the uplink TTI.

Additionally or alternatively, a base station may convey to a UE whether an uplink transmission was correctly received using an implicit ACK/NACK in an uplink grant. For example, depending on whether an uplink grant is for a new uplink transmission or for a retransmission, a UE may infer whether a prior uplink transmission was received correctly. So, in the example of FIG. 16, if the uplink grant 1665 includes a grant for a new transmission (e.g., a new TB) in an uplink symbol 1640, then a UE may infer than a prior uplink transmission was successful. Thus, the grant may imply an ACK. But if the uplink grant 1665 includes a grant for a retransmission of a prior uplink transmission, then the grant may imply a NACK, and the UE may retransmit. This implicit ACK/NACK may allow the system to avoid physical hybrid indicator channel (PHICH) transmissions, thus conserving both time and frequency resources.

Figure 17:
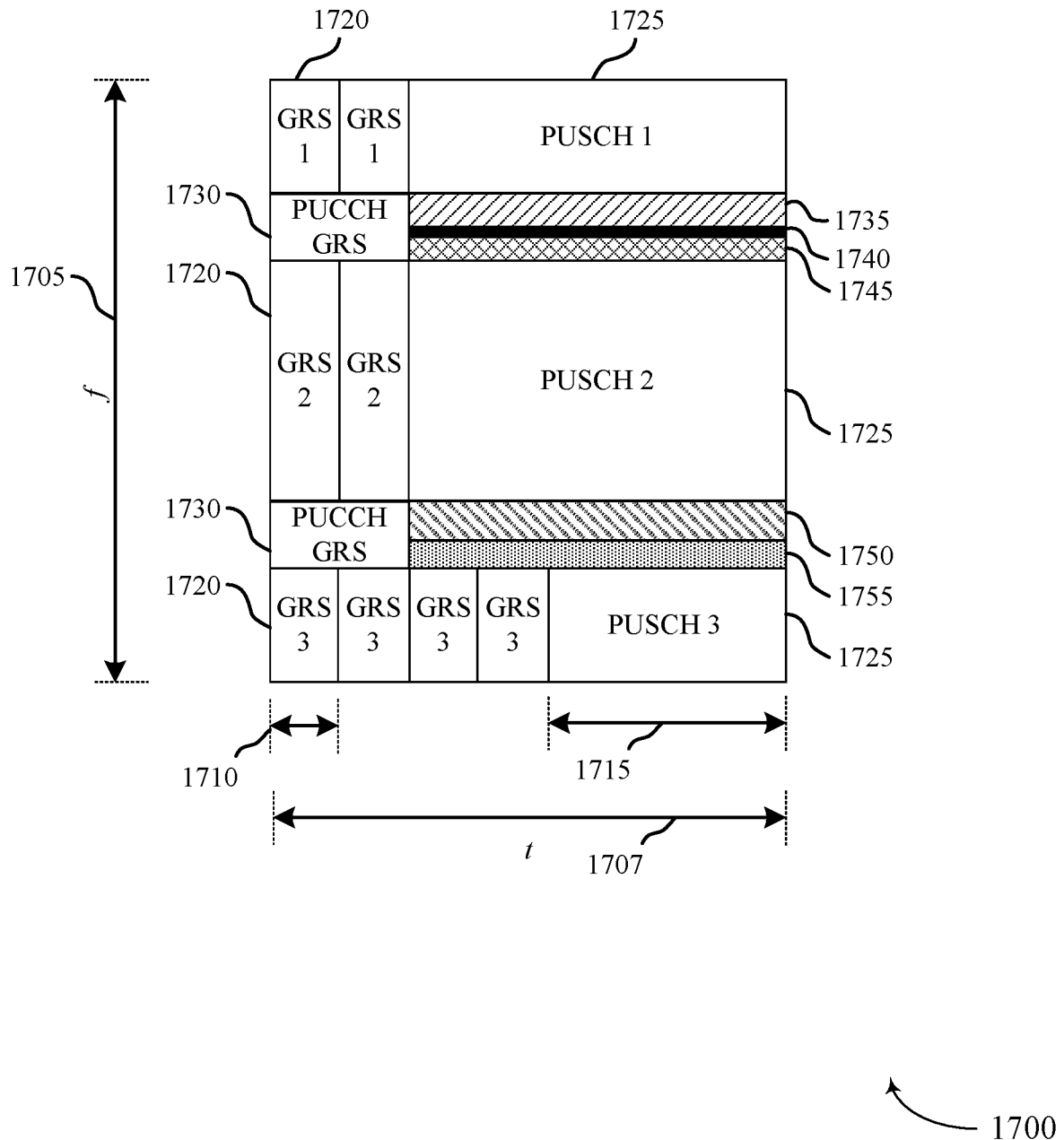
FIG. 17 illustrates a portion of a carrier with uplink channel multiplexing for providing feedback for a variable TTI in accordance with various aspects of the present disclosure.

Next, FIG. 17 illustrates a portion of a carrier 1700 with uplink channel multiplexing for providing feedback for a variable TTI, in accordance with various aspects of the present disclosure. The carrier 1700 may be transmitted using a wireless communication system, such as wireless communications system 100 of FIG. 1. In some examples, the carrier 1700 is an SCell, such as discussed above with respect to FIGS. 13-16. The carrier 1700 has a bandwidth 1705 (e.g., 80 MHz), and the portion illustrated is of a variable TTI 1707. The variable TTI 1707 may include signals or channels having one symbol width 1710 or that are several symbols wide 1715. The carrier 1700 may include group reference signals (GRS) 1720 for several UEs, such as the UEs 115 of FIG. 1. It may also include physical uplink control channel (PUCCH) GRS 1730 and physical uplink shared channel (PUCCH) 1725 (e.g., data channels) for several UEs. Additionally or alternatively, the carrier 1700 may include a number of PUCCHs 1735, 1740, 1745, 1750, or 1755 from different UEs. Each of these various signals and channels may be time division multiplexed (TDM), frequency division multiplexed (FDM), or code division multiplexed (CDM) with one another.

For example, PUCCHs 1735, 1740, and 1745, each transmitted from a different UE on a different interlace, may be FDM with PUSCHs 1725 of various UEs. The frequency allocation for each PUCCH may, for example, be tied to an uplink burst length (e.g., uplink TTI). Likewise, PUSCHs 1725 from various UEs may be FDM with one another. An uplink grant, such as the uplink grant described with reference to FIG. 15, may carry a resource block (RB) allocation for a particular PUSCH 1725 region for a given UE. The PUCCHs 1735, 1740, and 1745 may be CDM within the same resource. GRS 1720 and PUCCH GRS 1730 may be transmitted upfront (e.g., TDM earlier in time) within each FDM frequency region. For PUSCHs 1725, the presence (e.g., the location) of a GRS 1720 is indicated in an uplink grant, like the uplink grant described with reference to FIG. 15.

While the carrier 1700 is shown and described generally in terms of FDM, at least with respect to PUCCH and PUSCH, a TDM scheme may also be employed. In some cases, FDM may provide for increased reference signal (RS) efficiency; but in other examples, TDM may be preferable. Accordingly, one or several PUCCH may be TDM with PUSCH.

Figure 18:
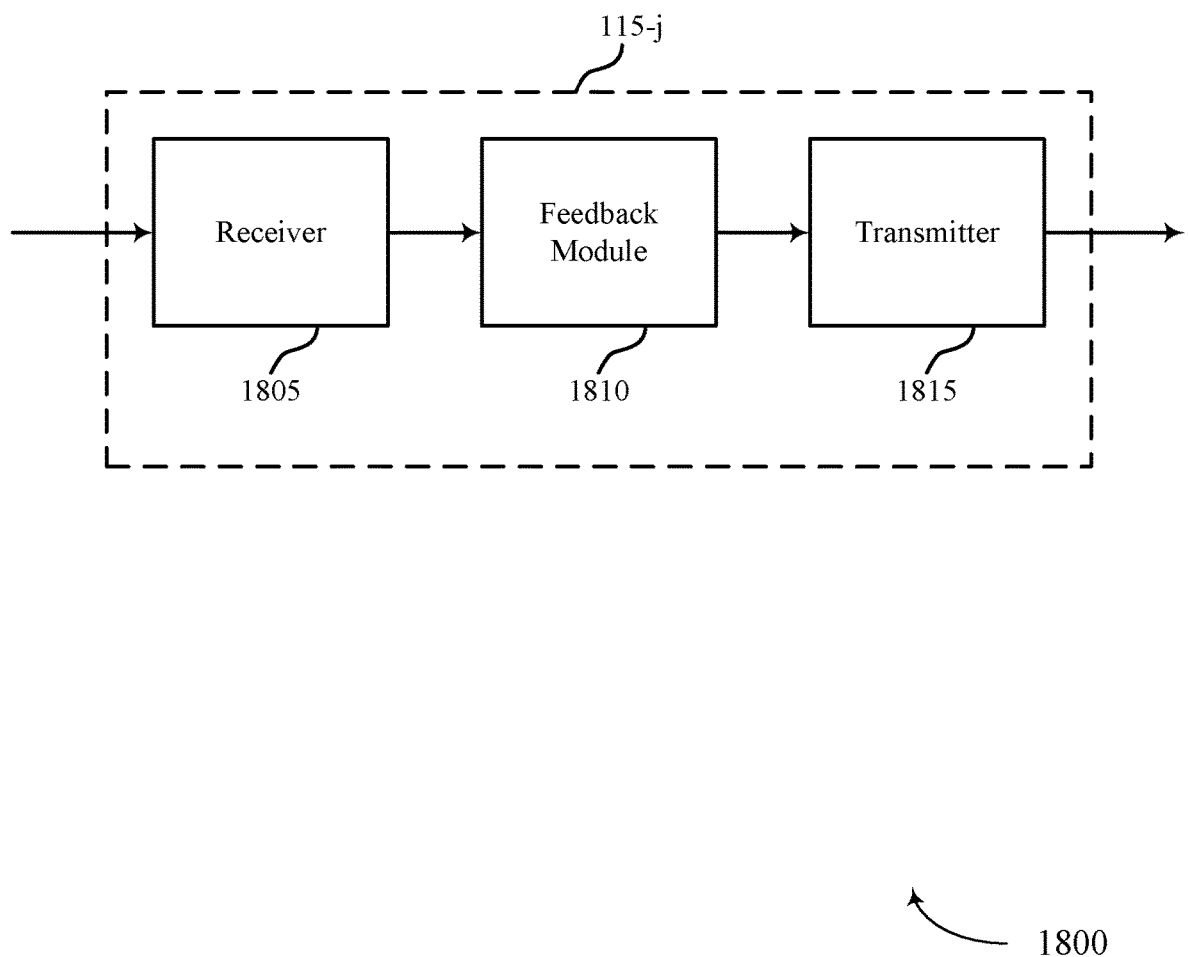
FIG. 18 shows a block diagram of a user equipment (UE) configured for feedback for variable TTI in accordance with various aspects of the present disclosure.

Turning next to FIG. 18, shown is a block diagram 1800 of a UE 115-*j* configured for feedback for variable TTI, in accordance with various aspects of the present disclosure. UE 115-*j* may be an example of aspects of a UE 115, and may employ techniques, described with reference to FIGS. 1-17. UE 115-*j* may include a receiver 1805, a feedback module 1810, or a transmitter 1815. UE 115-*j* may also include a processor. Each of these components may be in communication with one another.

The receiver 1805 may receive information such as packets, user data, or control information associated with various information channels (e.g., control channels, data channels, and information related to HARQ for variable TTI, etc.). Information may be passed on to the feedback module 1810, and to other components of UE 115-*j*. In some examples, the receiver 1805 may receive a plurality of TBs in a variable downlink transmission TTI. The receiver 1805 may also receive a grant for a second uplink TB or for a retransmission of the first uplink TB. The receiver 1805 may represent examples of aspects of a transceiver 2135 described with reference to FIG. 21.

The feedback module 1810 may receive, in combination with the receiver 1805, a plurality of TBs in a variable downlink transmission TTI, determine HARQ feedback for each TB of the plurality of TBs, where a number of TBs in the plurality is based on a time duration of the variable downlink TTI, and cause to be transmitted, in combination with the transmitter in an uplink TTI following the downlink TTI, the HARQ feedback for each TB. The feedback module 1810 may be an aspect of a processor, such as the processor 2105 described with reference to FIG. 21.

The transmitter 1815 may transmit signals received from other components of UE 115-*j*. In some examples, the transmitter 1815 may be collocated with the receiver 1805 in a transceiver module. The transmitter 1815 may include a single antenna, or it may include a plurality of antennas. In some examples, the transmitter 1815 may transmit a first uplink TB on resources or an uplink TTI. The transmitter 1815 may represent examples of aspects of a transceiver 2135 described with reference to FIG. 21.

Figure 19:
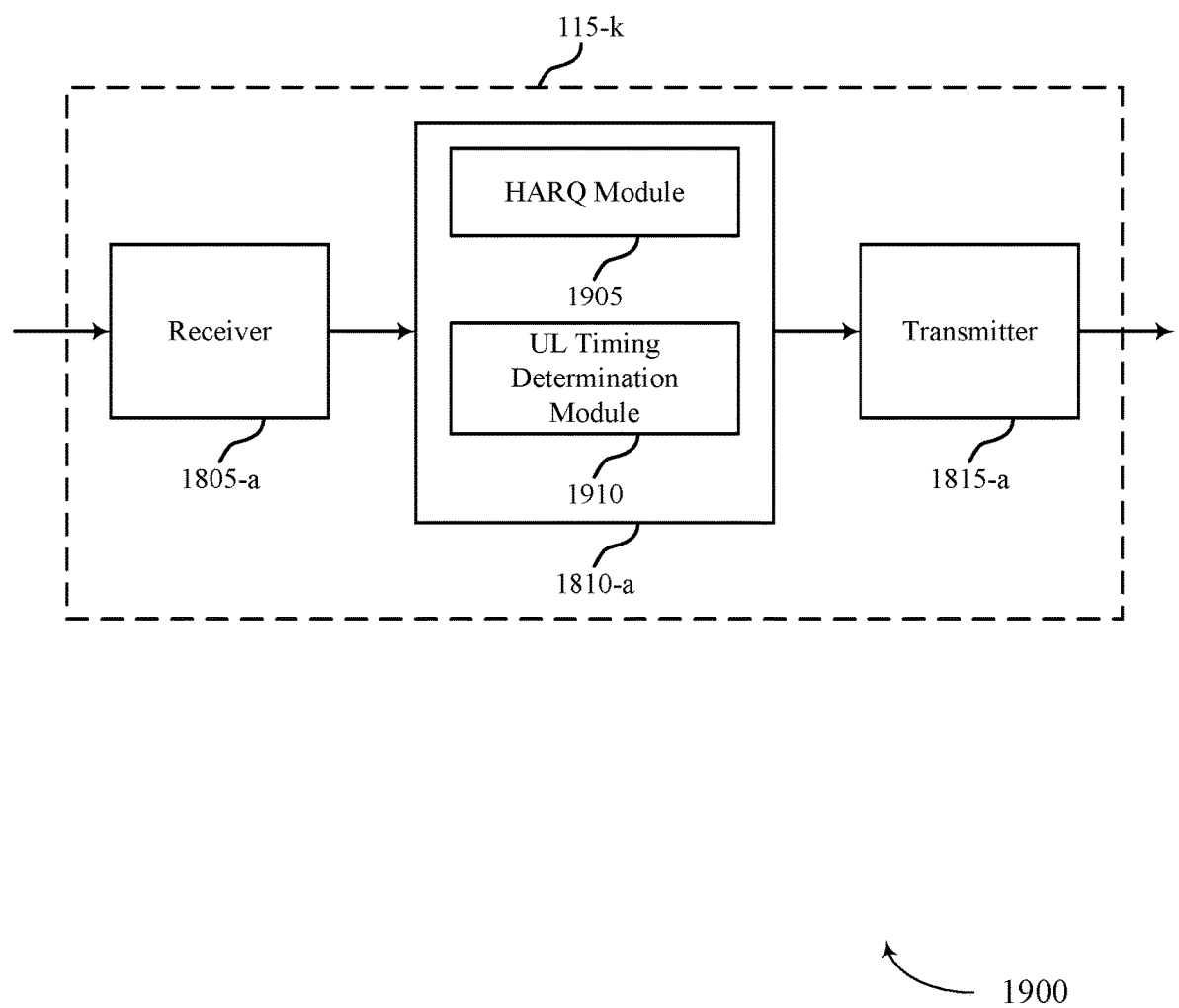
FIG. 19 shows a block diagram of a UE configured for feedback for variable TTI in accordance with various aspects of the present disclosure.

FIG. 19 shows a block diagram 1900 of a UE 115-*k* for feedback for variable TTI in accordance with various aspects of the present disclosure. UE 115-*k* may be an example of aspects of a UE 115, and may employ techniques, described with reference to FIGS. 1-18. UE 115-*k* may include a receiver 1805-*a*, a feedback module 1810-*a*, or a transmitter 1815-*a*. UE 115-*k* may also include a processor. Each of these components may be in communication with one another. The feedback module 1810-*a* may also include a HARQ module 1905 and a UL timing determination module 1910. Each of these components may illustrate aspects of a processor, such as the processor 2105 described with reference to FIG. 21.

The receiver 1805-*a* may receive information which may be passed on to feedback module 1810-*a*, and to other components of UE 115-*k*. The receiver 1805-*a* may represent examples of aspects of a transceiver 2135 described with reference to FIG. 21. The feedback module 1810-*a* may perform the operations described above with reference to FIG. 18. The feedback module 1810-*a* may be an aspect of a processor, such as the processor 2105 described with reference to FIG. 21. The transmitter 1815-*a* may transmit signals received from other components of UE 115-*k*. The transmitter 1815-*a* may represent examples of aspects of a transceiver 2135 described with reference to FIG. 21.

The HARQ module 1905 may determine HARQ feedback for each TB of the plurality of TBs, as described above with reference to FIGS. 13-17. In some examples, the HARQ feedback for each TB includes an ACK or NACK for each TB of the plurality of TBs. In some examples, the HARQ feedback for each TB includes HARQ feedback from a first UE, and the uplink TTI may be common to a second UE.

The UL timing determination module 1910 may transmit, in an uplink TTI following the downlink TTI, the HARQ feedback for each TB, as described above with reference to FIGS. 13-17. In some examples, an uplink grant may be received in a portion of the variable downlink TTI, and the HARQ feedback for each TB may be transmitted at a time based on the received uplink grant. In some examples, the HARQ feedback for each TB may be transmitted at a time based on an identified switching interval, which may precede the uplink TTI. In some examples, the HARQ feedback for each TB may be transmitted at least during an initial symbol period of the uplink TTI, and the HARQ feedback may occupy additional symbol periods.

Figure 20:
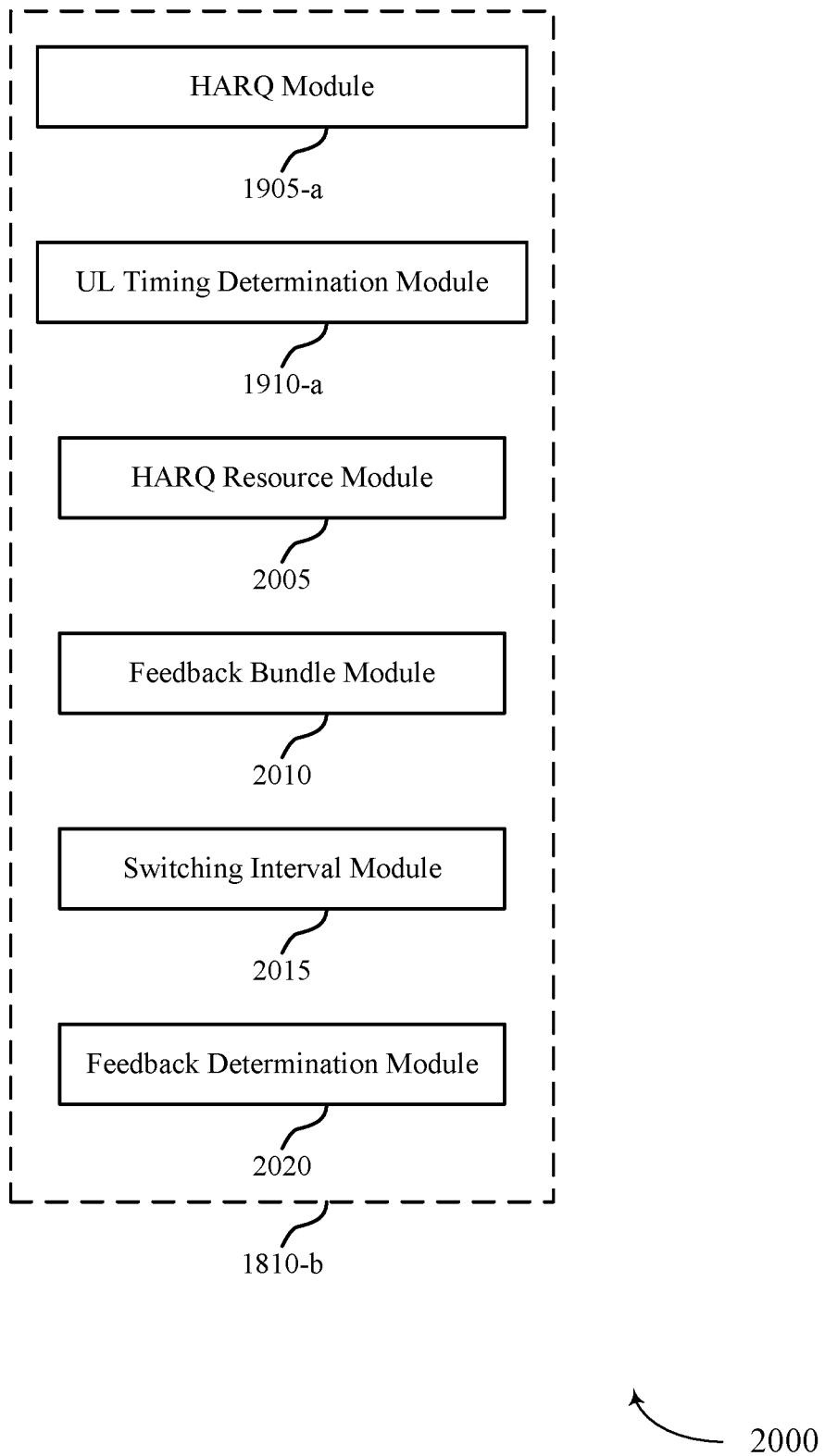
FIG. 20 shows a block diagram of a feedback module configured for feedback for variable TTI in accordance with various aspects of the present disclosure.

FIG. 20 shows a block diagram 2000 of a feedback module 1810-*b* for feedback for variable TTI in accordance with various aspects of the present disclosure. The feedback module 1810-*b* may be an example of aspects of a feedback module 1810 described with reference to FIGS. 18-19. The feedback module 1810-*b* may include a HARQ module 1905-*a* and a UL timing determination module 1910-*a*. Each of these modules may perform the functions described above with reference to FIG. 19. The feedback module 1810-*b* may also include a HARQ resource module 2005, a feedback bundle module 2010, a switching interval module 2015, and a feedback determination module 2020.

The HARQ resource module 2005 may determine that a maximum number of HARQ resources for the uplink TTI is met or exceeded as described above with reference to FIGS. 13-17. An a UE 115 may prepare feedback accordingly. For instance, the feedback bundle module 2010 may bundle HARQ feedback for two or more TBs of the plurality of TBs according to the maximum number of HARQ resources as described above with reference to FIGS. 13-17.

In some examples, the switching interval module 2015 may identify a switching interval following the downlink TTI as described above with reference to FIGS. 13-17.

The feedback determination module 2020 may be employed for uplink feedback. For example, the feedback determination module 2020 may determine that a grant represents an ACK when the grant is for a second uplink TB as described above with reference to FIGS. 13-17. The feedback determination module 2020 may also determine that the grant represents a NACK when the grant is for a retransmission of the first uplink TB.

The components of UE 115-*j*, UE 115-*k*, or feedback module 1810-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 21:
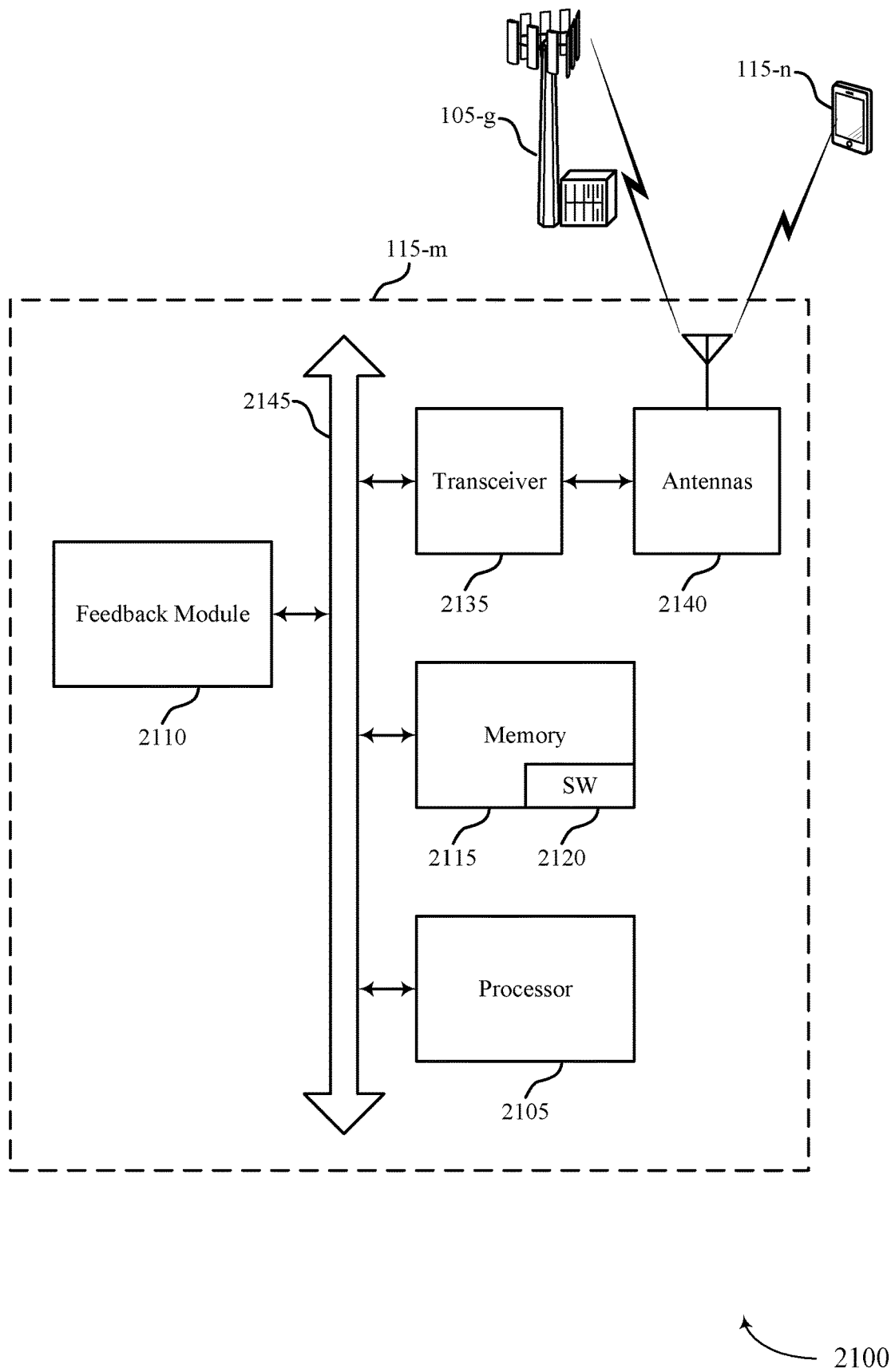
FIG. 21 illustrates a block diagram of a system including a UE configured for feedback for variable TTI in accordance with various aspects of the present disclosure.

FIG. 21 shows a diagram of a system 2100 including a UE 115 configured for feedback for variable TTI in accordance with various aspects of the present disclosure. System 2100 may include UE 115-*m*, which may be an example of a UE 115 described above with reference to FIGS. 1-20. UE 115-*m* may include a feedback module 2110, which may be an example of a feedback module 1810 described with reference to FIGS. 18-20. UE 115-*m* may also include components for bi-directional voice and data communications including components for transmitting communications and components for receiving communications. For example, UE 115-*m* may communicate bi-directionally with UE 115-*n* or base station 105-*g*.

UE 115-*m* may also include a processor 2105, and memory 2115 (including software (SW)) 2120, a transceiver 2135, and one or more antenna(s) 2140, each of which may communicate, directly or indirectly, with each other (e.g., via buses 2145). The transceiver 2135 may communicate bi-directionally, via the antenna(s) 2140 or wired or wireless links, with one or more networks, as described above. For example, the transceiver 2135 may communicate bi-directionally with a base station 105 or another UE 115. The transceiver 2135 may include a modem to modulate the packets and provide the modulated packets to the antenna(s) 2140 for transmission, and to demodulate packets received from the antenna(s) 2140. While UE 115-*m* may include a single antenna 2140, UE 115-*m* may also have multiple antennas 2140 capable of concurrently transmitting or receiving multiple wireless transmissions.

The memory 2115 may include random access memory (RAM) and read only memory (ROM). The memory 2115 may store computer-readable, computer-executable software/firmware code 2120 including instructions that, when executed, cause the processor 2105 to perform various functions described herein (e.g., HARQ for variable TTI, and the like). Alternatively, the software/firmware code 2120 may not be directly executable by the processor 2105 but cause a computer (e.g., when compiled and executed) to perform functions described herein. The processor 2105 may include an intelligent hardware device, (e.g., a central processing unit (CPU), a microcontroller, an ASIC, etc.).

Figure 22:
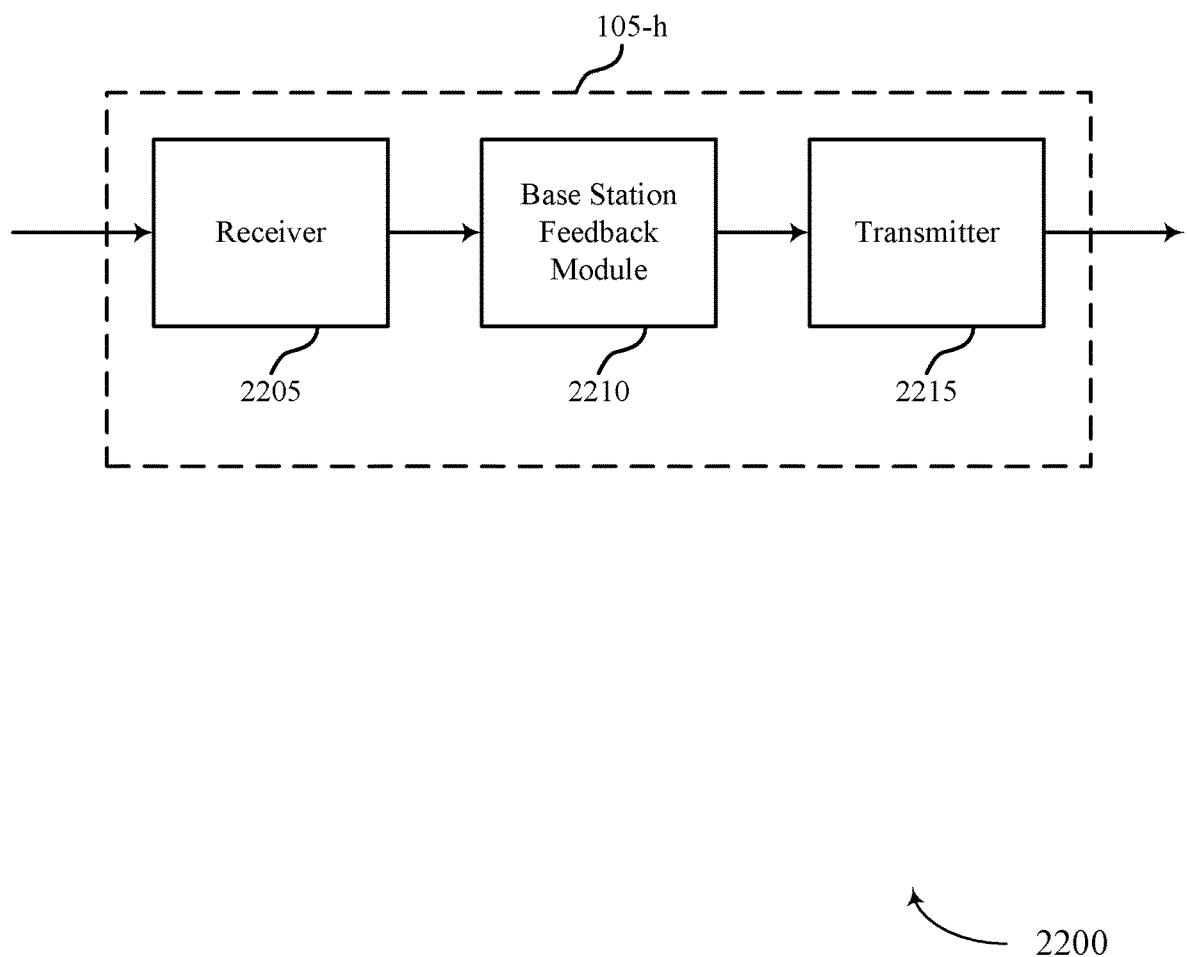
FIG. 22 shows a block diagram of a base station configured for feedback for variable TTI in accordance with various aspects of the present disclosure.

FIG. 22 shows a block diagram 2200 of a base station 105-*h* configured for feedback for variable TTI in accordance with various aspects of the present disclosure. Base station 105-*h* may be an example of aspects of a base station 105, and may employ techniques, described with reference to FIGS. 1-17. Base station 105-*h* may include a receiver 2205, a base station feedback module 2210, or a transmitter 2215. Base station 105-*h* may also include a processor. Each of these components may be in communication with one another.

The receiver 2205 may receive information such as packets, user data, or control information associated with various information channels (e.g., control channels, data channels, and information related to HARQ for variable TTI, etc.).

Information may be passed on to the base station feedback module 2210, and to other components of base station 105-*h*. The receiver 2205 may represent examples of aspects of a transceiver 2535 described with reference to FIG. 25.

The base station feedback module 2210 may receive, in combination with the receiver, a first set of HARQ feedback for each TB of a first plurality of TBs from a first UE during a first uplink TTI, and receive a second set of HARQ feedback for each TB of a second plurality of TBs during the first uplink TTI. The base station feedback module 2210 may be an aspect of a processor, such as the processor 2505 described with reference to FIG. 25.

The transmitter 2215 may transmit signals received from other components of base station 105-*h*. In some examples, the transmitter 2215 may be collocated with the receiver 2205 in a transceiver module. The transmitter 2215 may include a single antenna, or it may include a plurality of antennas. In some examples, the transmitter 2215 may transmit an uplink grant to a UE. The transmitter 2215 may represent examples of aspects of a transceiver 2535 described with reference to FIG. 25.

Figure 23:
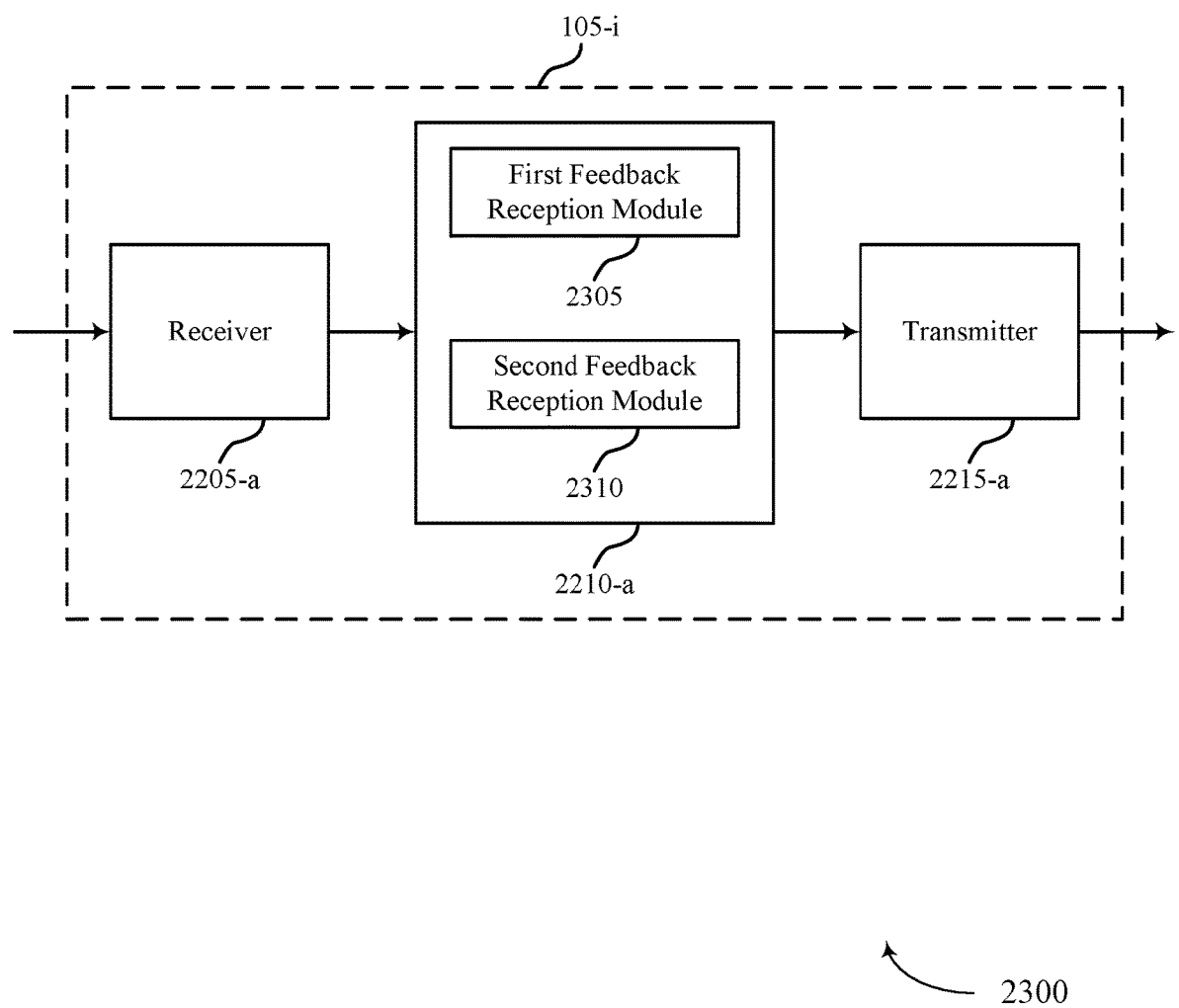
FIG. 23 shows a block diagram of a base station configured for feedback for variable TTI in accordance with various aspects of the present disclosure.

FIG. 23 shows a block diagram 2300 of a base station 105-*i* for HARQ for variable TTI in accordance with various aspects of the present disclosure. Base station 105-*i* may be an example of aspects of a base station 105, and may employ techniques, described with reference to FIGS. 1-17 and 22. Base station 105-*i* may include a receiver 2205-*a*, a base station feedback module 2210-*a*, or a transmitter 2215-*a*. Base station 105-*h* may also include a processor. Each of these components may be in communication with one another. The base station feedback module 2210-*a* may also include a first feedback reception module 2305, and a second feedback reception module 2310. Each of these components may illustrate aspects of a processor, such as the processor 2505 described with reference to FIG. 25.

The receiver 2205-*a* may receive information which may be passed on to base station feedback module 2210-*a*, and to other components of base station 105-*h*. The receiver 2205-*a* may represent examples of aspects of a transceiver 2535 described with reference to FIG. 25. The base station feedback module 2210-*a* may perform the operations described above with reference to FIG. 22. The base station feedback module 2210 may be an aspect of a processor, such as the processor 2505 described with reference to FIG. 25. The transmitter 2215-*a* may transmit signals received from other components of base station 105-*h*. The transmitter 2215-*a* may represent examples of aspects of a transceiver 2535 described with reference to FIG. 25.

The first feedback reception module 2305 may, in conjunction with the receiver 2205-*a*, receive a first set of HARQ feedback for each TB of a first plurality of TBs, which may have been transmitted using a variable downlink TTI, from a first UE during a first uplink TTI as described above with reference to FIGS. 13-17.

The second feedback reception module 2310 may, in conjunction with the receiver 2205-*a*, receive a second set of HARQ feedback for each TB of a second plurality of TBs from a second UE during the first uplink TTI as described above with reference to FIGS. 13-17. In some examples, the first and second sets of HARQ feedback are CDM on a common frequency resource, as described with reference to FIG. 17.

Figure 24:
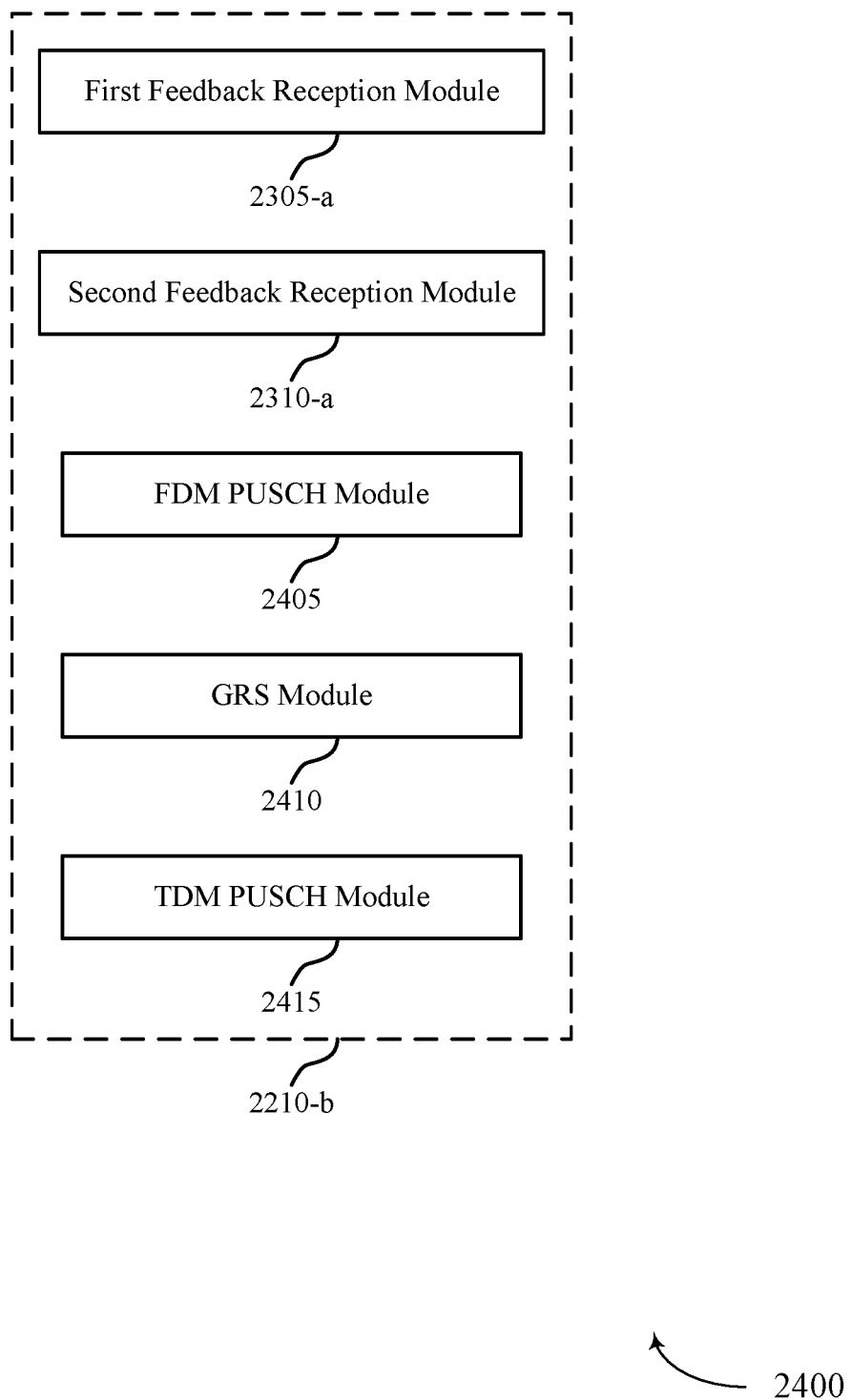
FIG. 24 shows a block diagram of a base station feedback module configured for feedback for variable TTI in accordance with various aspects of the present disclosure.

FIG. 24 shows a block diagram 2400 of a base station feedback module 2210-*b* for feedback for variable TTI in accordance with various aspects of the present disclosure. The base station feedback module 2210-*b* may be an example of aspects of a base station feedback module 2210, and may employ techniques, described with reference to FIGS. 22-12. The base station feedback module 2210-*b* may include a first feedback reception module 2305-*a* and a second feedback reception module 2310-*a*. These modules may perform the functions described above with reference to FIG. 23. The base station feedback module 2210-*b* may also include a FDM PUSCH module 2405, a GRS module 2410, or a TDM PUSCH module 2415.

The FDM PUSCH module 2405 may receive a first PUSCH from a first UE during the first uplink TTI, the first PUSCH may be FDM with several sets of HARQ feedback, as described above with reference to FIGS. 13-17. The FDM PUSCH module 2405 may receive a second PUSCH from a second UE during the first uplink TTI, and the second PUSCH be FDM with several sets of HARQ feedback, as described above with reference to FIGS. 13-17. The GRS module 2410 may receive group reference signals (GRS) for each of the PUSCH, and for each sets of HARQ feedback in TTI preceding the first uplink TTI, as described above with reference to FIGS. 13-17.

The TDM PUSCH module 2415 may receive a PUSCH on the same frequency resources as the first and second sets of HARQ feedback, the PUSCH and several sets of HARQ feedback may be TDM, as described above with reference to FIGS. 13-17.

The components of base station 105-*h*, base station 105-*i*, or base station feedback module 2210-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 25:
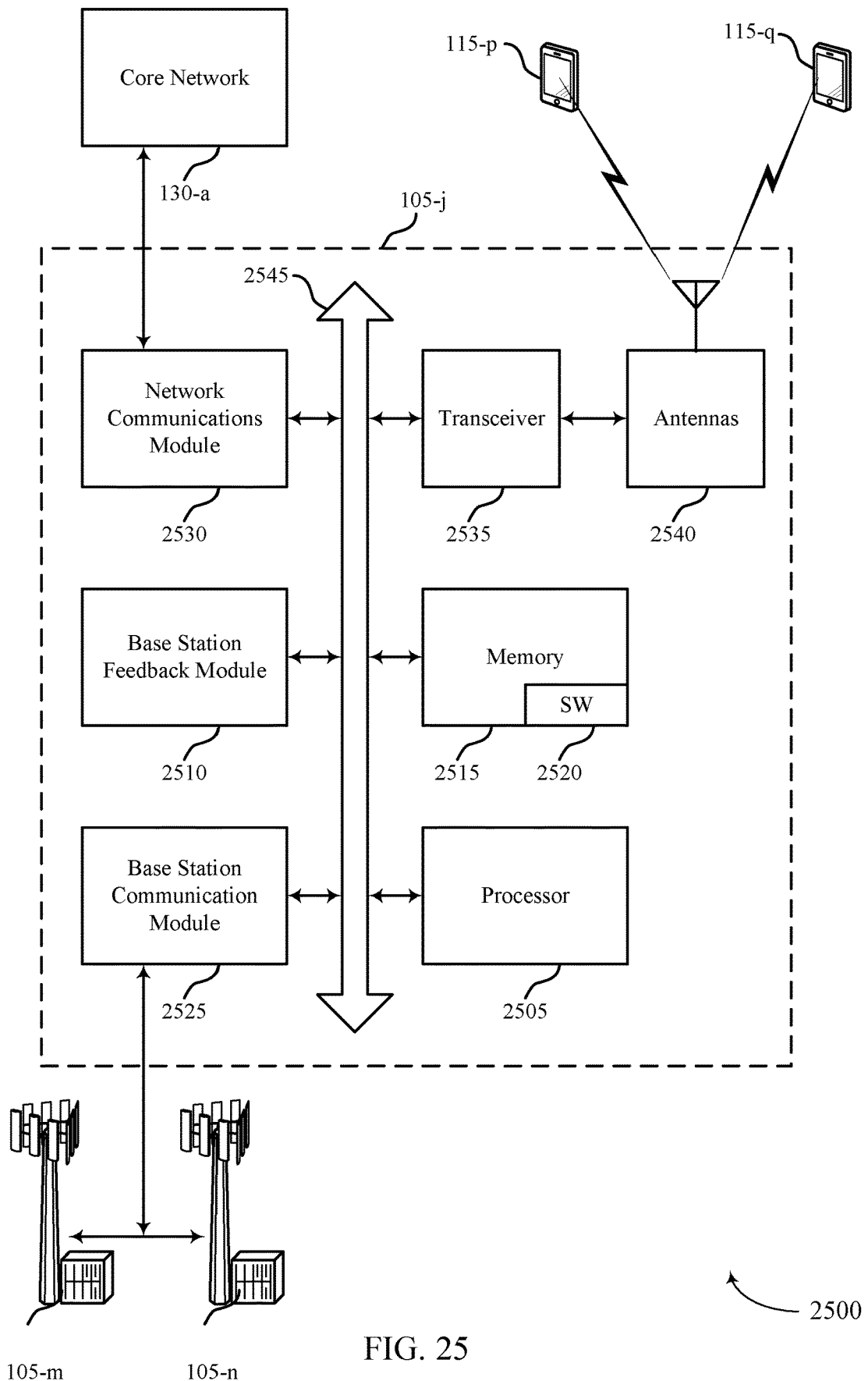
FIG. 25 illustrates a block diagram of a system including a base station configured for feedback for variable TTI in accordance with various aspects of the present disclosure.

FIG. 25 shows a diagram of a system 2500 including a base station 105 configured for feedback for variable TTI in accordance with various aspects of the present disclosure. System 2500 may include base station 105-*j*, which may be an example of a base station 105, and may employ techniques, described above with reference to FIGS. 1-24. Base station 105-*j* may include a base station feedback module 2510, which may be an example of a base station feedback module 2210 described with reference to FIGS. 22-24. Base station 105-*j* may also include components for bi-directional voice and data communications including components for transmitting communications and components for receiving communications. For example, base station 105-*j* may communicate bi-directionally with base station 105-*m* or base station 105-*n*.

In some cases, base station 105-*j* may have one or more wired backhaul links. Base station 105-*j* may have a wired backhaul link (e.g., S1 interface, etc.) to the core network 130-*a*. Base station 105-*j* may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-*j* may communicate with other base stations such as 105-*m* or 105-*n* utilizing base station communication module 2525. In some examples, base station communication module 2525 may provide an X2 interface within an LTE/LTE-A wireless communication network technology to provide communication between some of the base stations 105. Additionally or alternatively, base station 105-*j* may communicate with other base stations through core network 130-*a*. In some cases, base station 105-*j* may communicate with the core network 130-*a* through network communications module 2530.

The base station 105-*j* may include a processor 2505, memory 2515 (including software (SW) 2520), transceiver 2535, and antenna(s) 2540, which each may be in communication, directly or indirectly, with one another (e.g., over bus system 2545). The transceiver 2535 may be configured to communicate bi-directionally, via the antenna(s) 2540, with the UEs 115, which may be multi-mode devices. The transceiver 2535 (or other components of the base station 105-*j*) may also be configured to communicate bi-directionally, via the antennas 2540, with one or more other base stations (not shown). The transceiver 2535 may include a modem configured to modulate the packets and provide the modulated packets to the antennas 2540 for transmission, and to demodulate packets received from the antennas 2540. The base station 105-*j* may include multiple transceivers 2535, each with one or more associated antennas 2540. The transceiver module may be an example of a combined receiver 2205 and transmitter 2215 of FIG. 22.

The memory 2515 may include RAM and ROM. The memory 2515 may also store computer-readable, computer-executable software code 2520 containing instructions that are configured to, when executed, cause the processor 2505 to perform various functions described herein (e.g., receive or transmit feedback for variable TTI, selecting coverage enhancement techniques, call processing, database management, message routing, etc.). Alternatively, the software code 2520 may not be directly executable by the processor 2505 but be configured to cause the computer, e.g., when compiled and executed, to perform functions described herein. The processor 2505 may include an intelligent hardware device, e.g., a CPU, a microcontroller, an ASIC, etc. The processor 2505 may include various special purpose processors such as encoders, queue processing modules, base band processors, radio head controllers, digital signal processor (DSPs), and the like.

The base station communication module 2525 may manage communications with other base stations 105. The base station communication module 2525 may include a controller or scheduler for controlling communications with UEs 115 in cooperation with other base stations 105. For example, the base station communication module 2525 may coordinate scheduling for transmissions to UEs 115 for various interference mitigation techniques such as beamforming or joint transmission.

Figure 26:
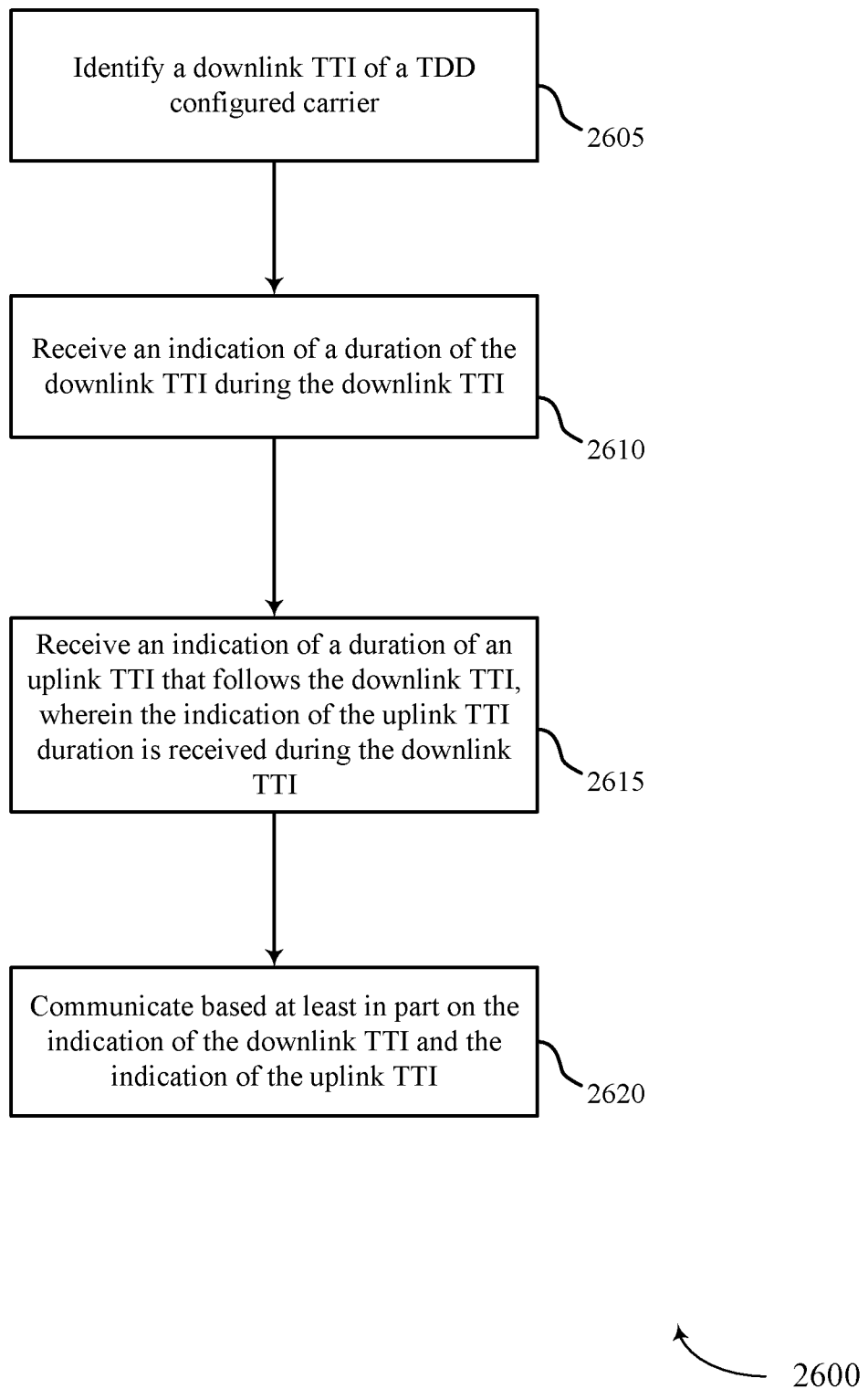
FIG. 26 shows a flowchart illustrating a method for flexible multiplexing operation for DL data in accordance with various aspects of the present disclosure.

FIG. 26 shows a flowchart illustrating a method 2600 for flexible multiplexing operation for DL data in TDD systems in accordance with various aspects of the present disclosure. The operations of method 2600 may be implemented by a UE 115 or its components as described with reference to FIGS. 1-8. For example, the operations of method 2600 may be performed by the flexible multiplexing module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 2605, the UE 115 may identify a downlink TTI of a TDD configured carrier as described above with reference to FIGS. 2-4. In certain examples, the operations of block 2605 may be performed by the TDD module 605 as described above with reference to FIG. 6.

At block 2610, the UE 115 may receive an indication of a duration of the downlink TTI during the downlink TTI as described above with reference to FIGS. 2-4. In certain examples, the operations of block 2610 may be performed by the PDFICH/PUFICH module 620 as described above with reference to FIG. 6.

At block 2615, the UE 115 may receive an indication of a duration of an uplink TTI that follows the downlink TTI as described above with reference to FIGS. 2-4. The indication of the uplink TTI duration may be received during the downlink TTI. In certain examples, the operations of block 2615 may be performed by the PDFICH/PUFICH module 620 as described above with reference to FIG. 6.

At block 2620, the UE 115 may communicate based at least in part on the indication of the downlink TTI and the indication of the uplink TTI as described above with reference to FIGS. 2-4. In certain examples, the operations of block 2620 may be performed by the TDD module 605 as described above with reference to FIG. 6.

In some cases, the method 2600 may further include receiving a downlink grant during the downlink TTI. The downlink grant may assign a first set of resources during the downlink TTI. The method 2600 may include receiving an additional downlink grant that assigns a second set of resources during the downlink TTI. The first set of resources and the second set of resources may be frequency division multiplexed during the downlink TTI. The method 2600 may include receiving an indication of a duration of a subsequent downlink TTI that follows the downlink TTI, wherein the indication of the subsequent TTI duration is received during the subsequent downlink TTI, receiving an indication of a duration of a subsequent uplink TTI that follows the subsequent downlink TTI, and communicating based at least in part on the indication of the subsequent downlink TTI duration and the indication of the subsequent uplink TTI duration. The indication of the subsequent uplink TTI duration may be received during the subsequent downlink TTI. The indication of the duration of the uplink TTI may indicate that the duration of the uplink TTI is zero. The downlink TTI duration and a subsequent downlink TTI duration may form a downlink burst that is time division multiplexed on resources of the TDD configured carrier. The method 2600 may include receiving a set of TBs during the downlink TTI, where the downlink TTI comprises a variable TTI, determining HARQ feedback for each TB of the set of TBs, and transmitting the HARQ feedback for at least one TB of the set of TBs during the uplink TTI. A number of TBs in the set may be based at least in part on the duration of the downlink TTI.

The method 2600 may include receiving the set of TBs where each TB includes at least one CB, and a number of CBs in each TB of the set of TBs may be based on a size of the TB. The method may also include determining HARQ feedback for a number of CBs of at least the TB, and transmitting the HARQ feedback for at least one CB during the uplink TTI. The method 2600 may, in some examples, include entering a low power state during the downlink TTI or the uplink TTI based at least in part on an absence of a grant of resources during the downlink TTI or the uplink TTI.

Figure 27:
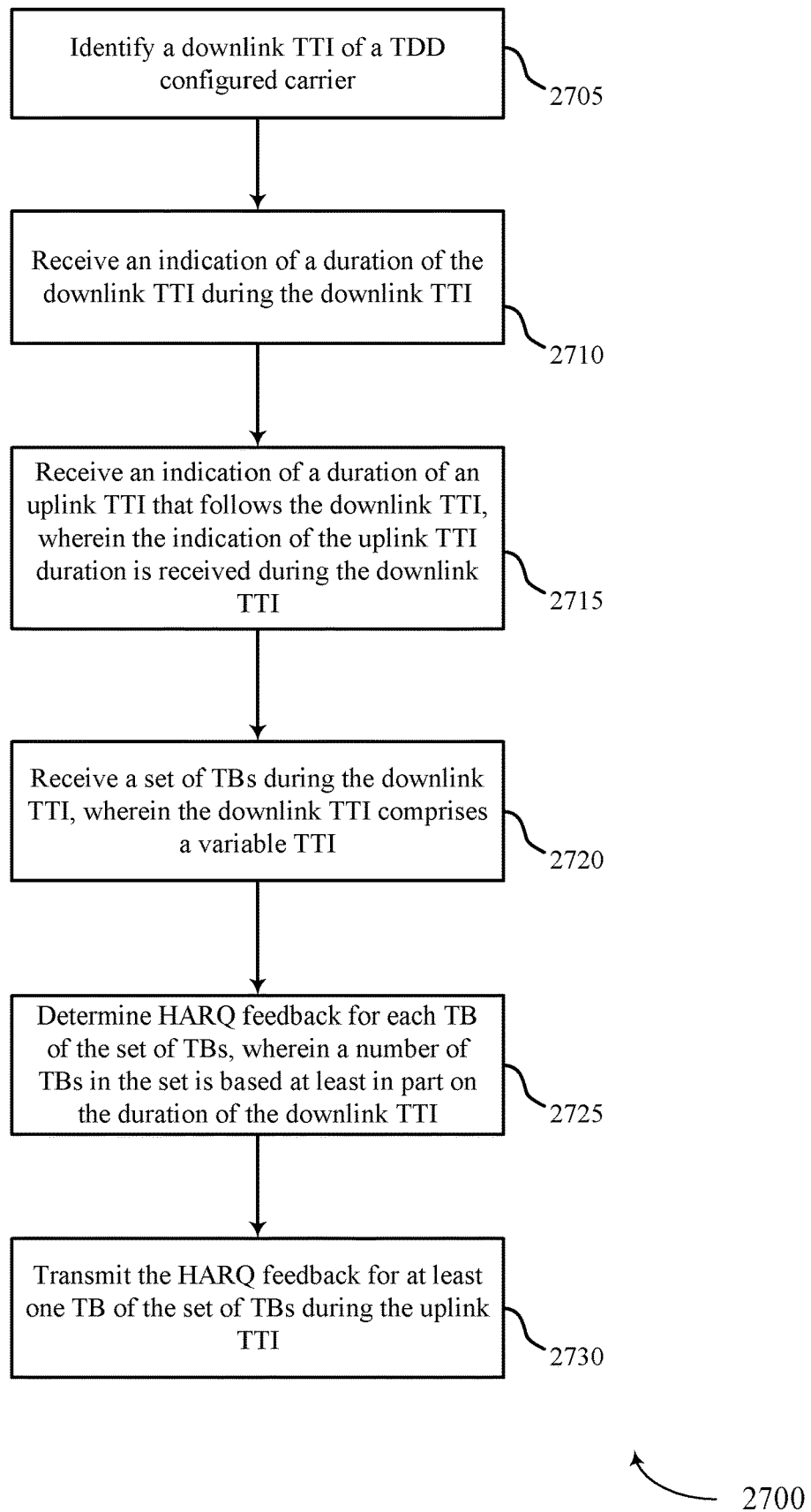
FIG. 27 shows a flowchart illustrating a method for flexible multiplexing operation for DL data in accordance with various aspects of the present disclosure.

FIG. 27 shows a flowchart illustrating a method 2700 for flexible multiplexing operation for DL data in TDD systems in accordance with various aspects of the present disclosure. The operations of method 2700 may be implemented by a UE 115 or its components as described with reference to FIGS. 1-8. For example, the operations of method 2700 may be performed by the flexible multiplexing module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 2700 may also incorporate aspects of method 2600 of FIG. 26.

At block 2705, the UE 115 may identify a downlink TTI of a TDD configured carrier as described above with reference to FIGS. 2-4. In certain examples, the operations of block 2705 may be performed by the TDD module 605 as described above with reference to FIG. 6.

At block 2710, the UE 115 may receive an indication of a duration of the downlink TTI during the downlink TTI as described above with reference to FIGS. 2-4. In certain examples, the operations of block 2710 may be performed by the PDFICH/PUFICH module 620 as described above with reference to FIG. 6.

At block 2715, the UE 115 may receive an indication of a duration of an uplink TTI that follows the downlink TTI as described above with reference to FIGS. 2-4. The indication of the uplink TTI duration may be received during the downlink TTI. In certain examples, the operations of block 2715 may be performed by the PDFICH/PUFICH module 620 as described above with reference to FIG. 6.

At block 2720, the UE 115 may receive a set of TBs during the downlink TTI as described above with reference to FIGS. 2-4. The downlink TTI may include a variable TTI. In certain examples, the operations of block 2720 may be performed by the TDD module 605 as described above with reference to FIG. 6.

At block 2725, the UE 115 may determine HARQ feedback for each TB of the set of TBs as described above with reference to FIGS. 2-4. A number of TBs in the set may be based at least in part on the duration of the downlink TTI. In certain examples, the operations of block 2725 may be performed by the TDD module 605 as described above with reference to FIG. 6.

At block 2730, the UE 115 may transmit the HARQ feedback for at least one TB of the set of TBs during the uplink TTI as described above with reference to FIGS. 2-4. In certain examples, the operations of block 2730 may be performed by the TDD module 605 as described above with reference to FIG. 6.

Thus, methods 2600 and 2700 may provide for flexible multiplexing operation for DL data in TDD systems. It should be noted that methods 2600 and 2700 describe possible implementations, and that the operations and the steps may be rearranged or otherwise modified such that other implementations are possible. In some examples, aspects from two or more of the methods 2600 and 2700 may be combined.

Figure 28:
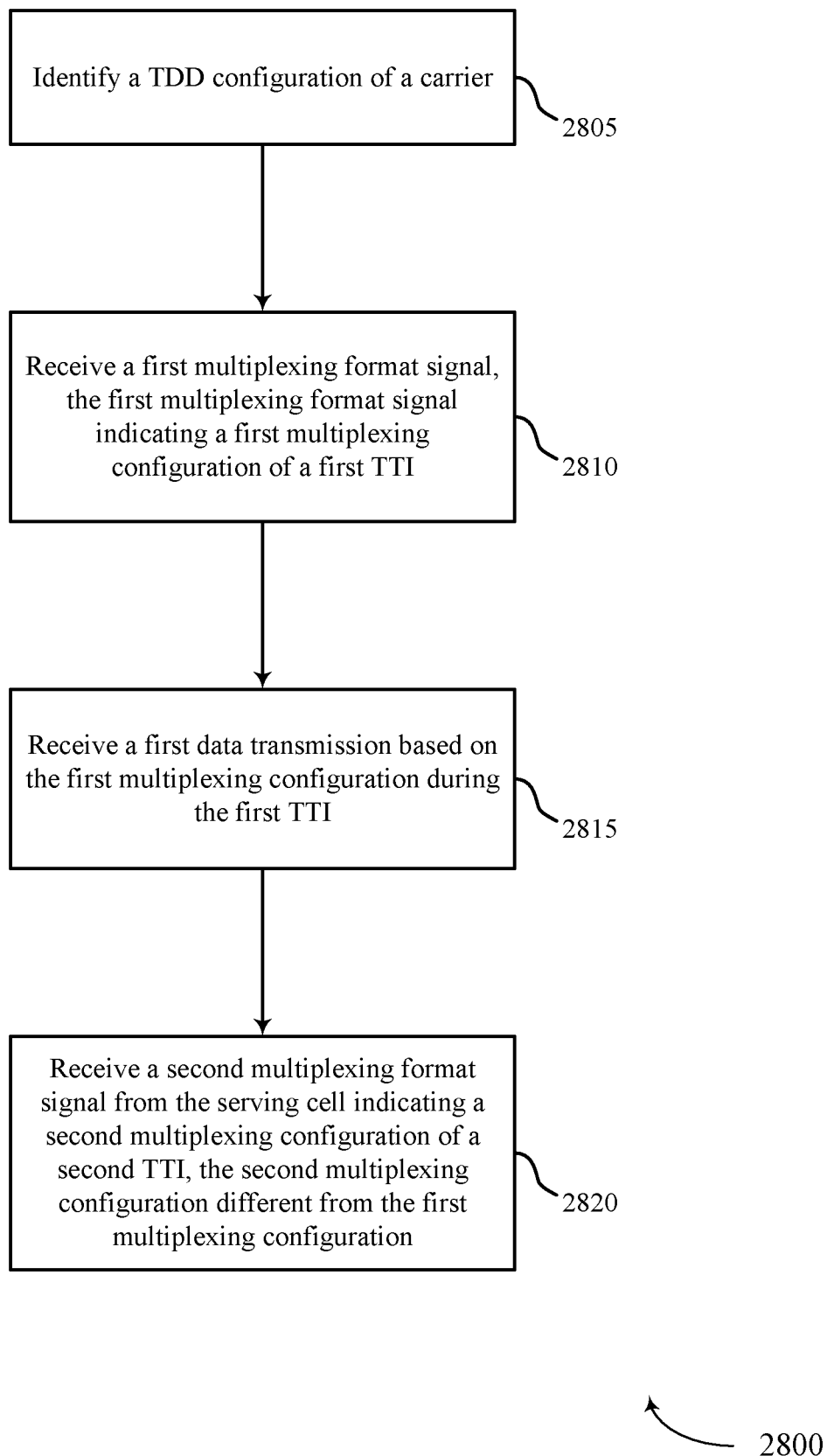
FIG. 28 shows a flowchart illustrating a method for flexible multiplexing operation for DL data in accordance with various aspects of the present disclosure.

FIG. 28 shows a flowchart illustrating a method 2800 for flexible multiplexing operation for DL data in TDD systems in accordance with various aspects of the present disclosure. The operations of method 2800 may be implemented by a UE 115 or its components as described with reference to FIGS. 1-8. For example, the operations of method 2800 may be performed by the flexible multiplexing module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 2805, the UE 115 may identify a TDD configuration of a carrier as described above with reference to FIGS. 2-4. In certain examples, the operations of block 2805 may be performed by the TDD module 605 as described above with reference to FIG. 6.

At block 2810, the UE 115 may receive a first multiplexing format signal from a serving cell of the carrier, the first multiplexing format signal indicating a first multiplexing configuration of a first TTI as described above with reference to FIGS. 2-4. In certain examples, the operations of block 2810 may be performed by the PDFICH/PUFICH module 620 as described above with reference to FIG. 6.

At block 2815, the UE 115 may receive a first data transmission from the serving cell based on the first multiplexing configuration during the first TTI as described above with reference to FIGS. 2-4. In certain examples, the operations of block 2815 may be performed by the receiver 505 as described above with reference to FIG. 5.

At block 2820, the UE 115 may receive a second multiplexing format signal from the serving cell indicating a second multiplexing configuration of a second TTI, the second multiplexing configuration different from the first multiplexing configuration as described above with reference to FIGS. 2-4. In certain examples, the operations of block 2820 may be performed by the PDFICH/PUFICH module 620 as described above with reference to FIG. 6.

Figure 29:
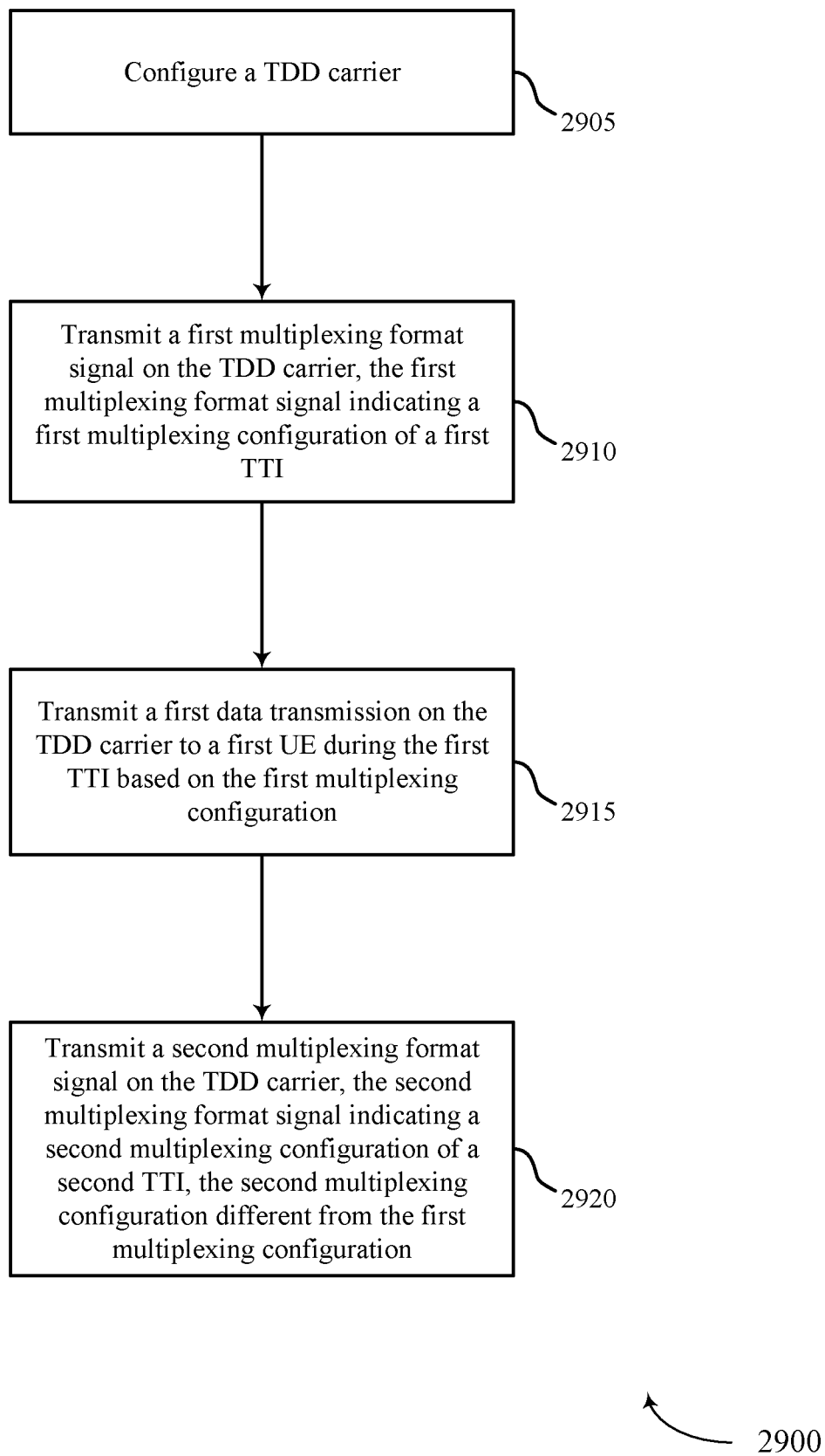
FIG. 29 shows a flowchart illustrating a method for flexible multiplexing operation for DL data in accordance with various aspects of the present disclosure.

FIG. 29 shows a flowchart illustrating a method 2900 for flexible multiplexing operation for DL data in TDD systems in accordance with various aspects of the present disclosure. The operations of method 2900 may be implemented by a base station 105 or its components as described with reference to FIGS. 1-4, and 9-12. For example, the operations of method 2900 may be performed by the base station flexible multiplexing module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 2900 may also incorporate aspects of methods 2600, 2700, and 2800 of FIGS. 26-28.

At block 2905, the base station 105 may configure a TDD carrier as described above with reference to FIGS. 2-4. In certain examples, the operations of block 2905 may be performed by the BS TDD module 1005 as described above with reference to FIG. 10.

At block 2910, the base station 105 may transmit a first multiplexing format signal on the TDD carrier, the first multiplexing format signal indicating a first multiplexing configuration of a first TTI as described above with reference to FIGS. 2-4. In certain examples, the operations of block 2910 may be performed by the BS PDFICH/PUFICH module 1020 as described above with reference to FIG. 10.

At block 2915, the base station 105 may transmit a first data transmission on the TDD carrier to a first UE during the first TTI based on the first multiplexing configuration as described above with reference to FIGS. 2-4. In certain examples, the operations of block 2915 may be performed by the transmitter 915 as described above with reference to FIG. 9.

At block 2920, the base station 105 may transmit a second multiplexing format signal on the TDD carrier, the second multiplexing format signal indicating a second multiplexing configuration of a second TTI, the second multiplexing configuration different from the first multiplexing configuration as described above with reference to FIGS. 2-4. In certain examples, the operations of block 2920 may be performed by the BS PDFICH/PUFICH module 1020 as described above with reference to FIG. 10.

Thus, methods 2600, 2700, 2800, and 2900 may provide for flexible multiplexing operation for DL data in TDD systems. It should be noted that methods 2600, 2700, 2800, and 2900 describe possible implementations, and that the operations and the steps may be rearranged or otherwise modified such that other implementations are possible. In some examples, aspects from two or more of the methods 2600, 2700, 2800, and 2900 may be combined.

Figure 30:
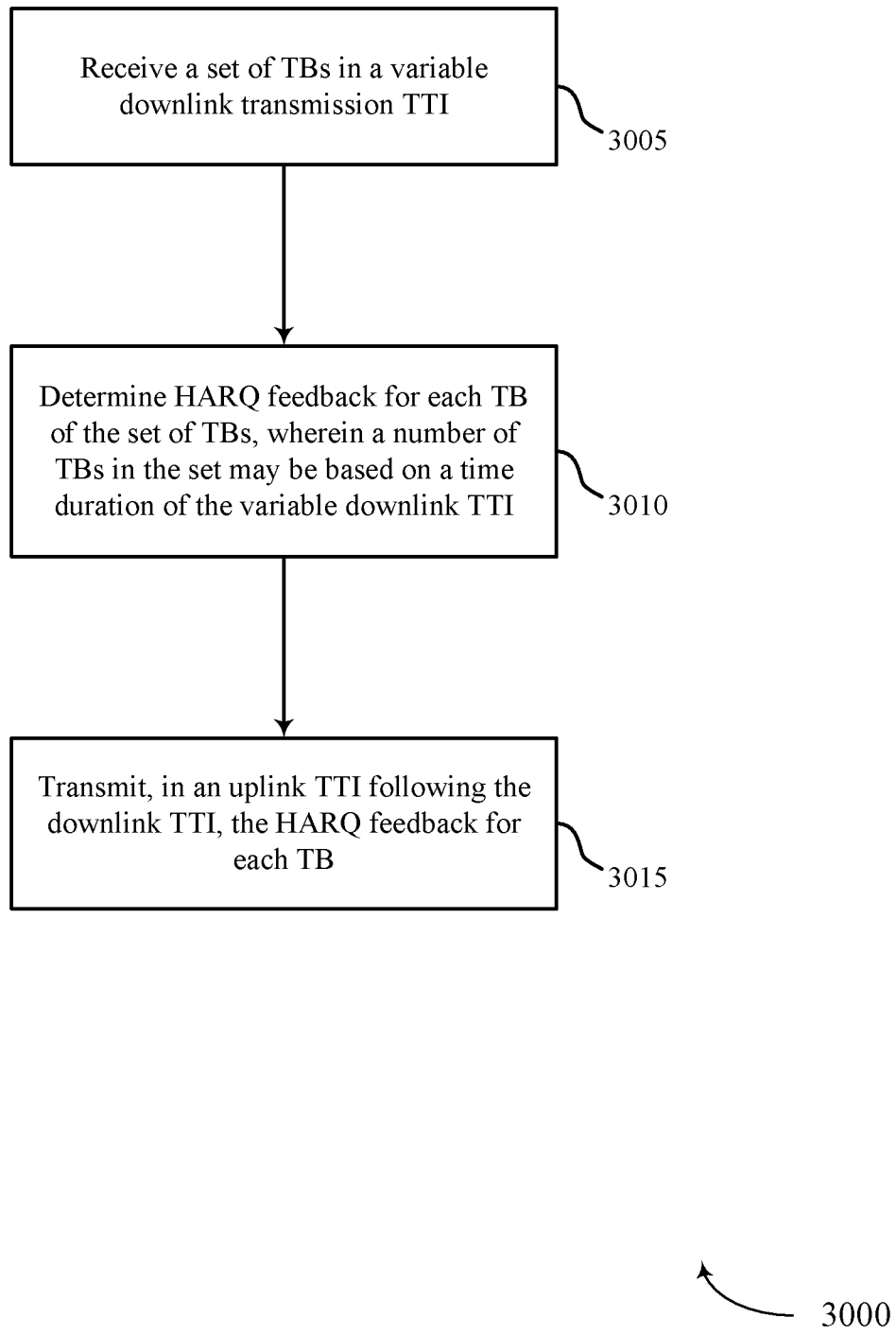
FIG. 30 shows a flowchart illustrating a method for feedback for variable TTI, in accordance with various aspects of the present disclosure.

FIG. 30 shows a flowchart illustrating a method 3000 for feedback for variable TTI in accordance with various aspects of the present disclosure. The operations of method 3000 may be implemented by a UE 115 or its components as described with reference to FIGS. 1-21. For example, the operations of method 3000 may be performed by the feedback module 1810 as described with reference to FIGS. 18-21. In some examples, a UE 115 may execute a set of codes to control the functional elements of the UE 115 to perform the functions described below. Additionally or alternatively, the UE 115 may perform aspects the functions described below using special-purpose hardware.

At block 3005, the UE 115 may receive a plurality of TBs in a variable downlink transmission TTI, as described above with reference to FIGS. 13-17. In certain examples, the operations of block 3005 may be performed by the receiver 1805 as described above with reference to FIG. 18.

At block 3010, the UE 115 may determine HARQ feedback for each TB of the plurality of TBs, where a number of TBs in the plurality is based on a time duration of the variable downlink TTI, as described above with reference to FIGS. 13-17. In certain examples, the operations of block 3010 may be performed by the HARQ module 1905, as described above with reference to FIG. 19.

At block 3015, the UE 115 may transmit, in an uplink TTI following the downlink TTI, the HARQ feedback for each TB, as described above with reference to FIGS. 13-17. In certain examples, the operations of block 3015 may be performed by the UL timing determination module 1910, as described above with reference to FIG. 19.

Figure 31:
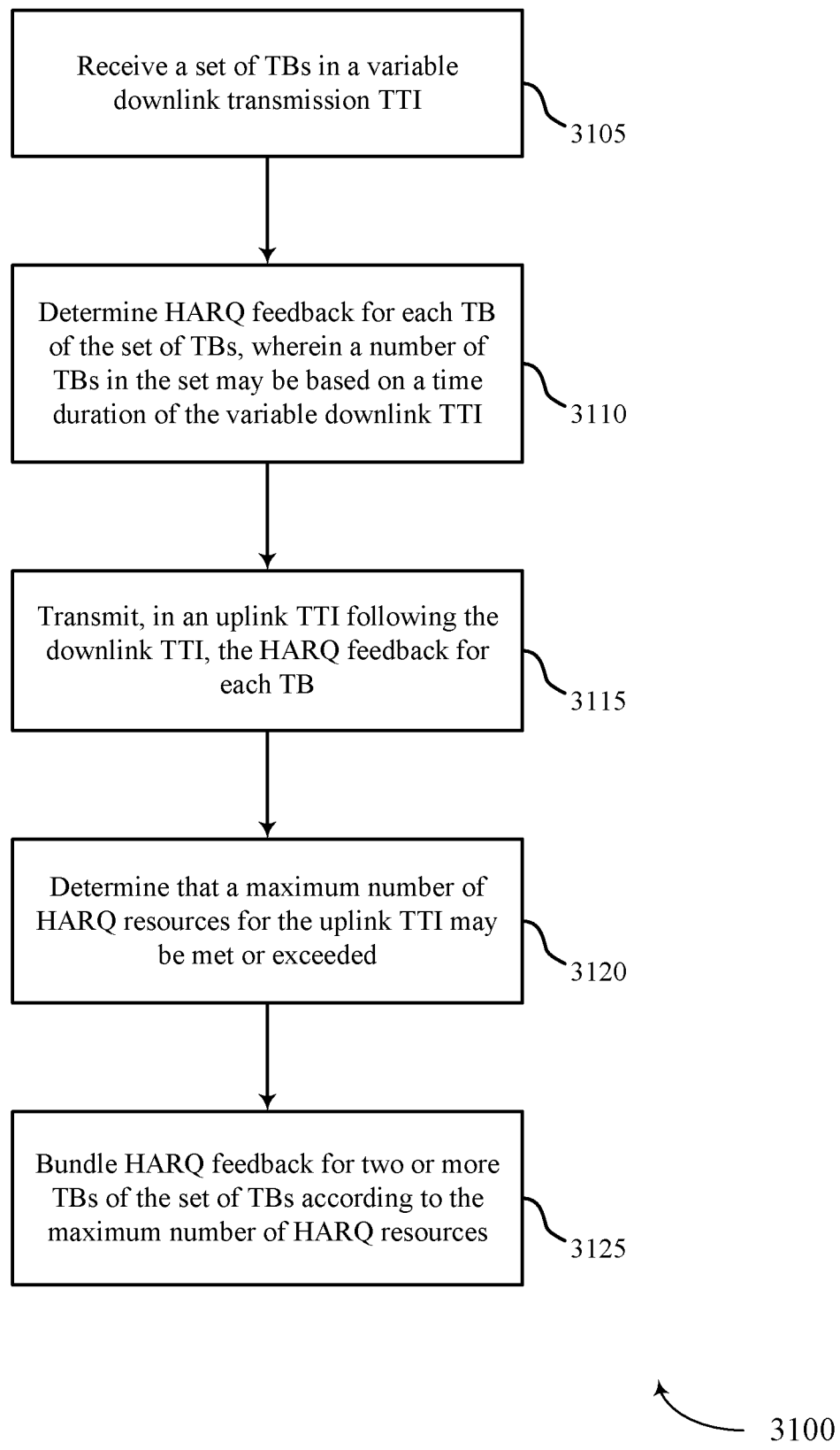
FIG. 31 shows a flowchart illustrating a method for feedback for variable TTI in accordance with various aspects of the present disclosure.

FIG. 31 shows a flowchart illustrating a method 3100 for feedback for variable TTI in accordance with various aspects of the present disclosure. The operations of method 3100 may be implemented by a UE 115 or its components, as described with reference to FIGS. 1-21. For example, the operations of method 3100 may be performed by the feedback module 1810 as described with reference to FIGS. 18-21. In some examples, a UE 115 may execute a set of codes to control the functional elements of the UE 115 to perform the functions described below. Additionally or alternatively, the UE 115 may perform aspects the functions described below using special-purpose hardware. The method 3100 may also incorporate aspects of method 3000 of FIG. 30.

At block 3105, the UE 115 may receive a plurality of TBs in a variable downlink transmission TTI, as described above with reference to FIGS. 13-17. In certain examples, the operations of block 3105 may be performed by the receiver 1805 as described above with reference to FIG. 18.

At block 3110, the UE 115 may determine HARQ feedback for each TB of the plurality of TBs, where a number of TBs in the plurality is based at least in part on a time duration of the variable downlink TTI, as described above with reference to FIGS. 13-17. In certain examples, the operations of block 3110 may be performed by the HARQ module 1905 as described above with reference to FIG. 19.

At block 3115, the UE 115 may transmit, in an uplink TTI following the downlink TTI, the HARQ feedback for each TB, as described above with reference to FIGS. 13-17. In certain examples, the operations of block 3115 may be performed by the UL timing determination module 1910, as described above with reference to FIG. 19.

At block 3120, the UE 115 may determine that a maximum number of HARQ resources for the uplink TTI is met or exceeded, as described above with reference to FIGS. 13-17. In certain examples, the operations of block 3120 may be performed by the HARQ resource module 2005, as described above with reference to FIG. 20.

At block 3125, the UE 115 may bundle HARQ feedback for two or more TBs of the plurality of TBs according to the maximum number of HARQ resources, as described above with reference to FIGS. 13-17. In certain examples, the operations of block 3125 may be performed by the feedback bundle module 2010, as described above with reference to FIG. 20.

Figure 32:
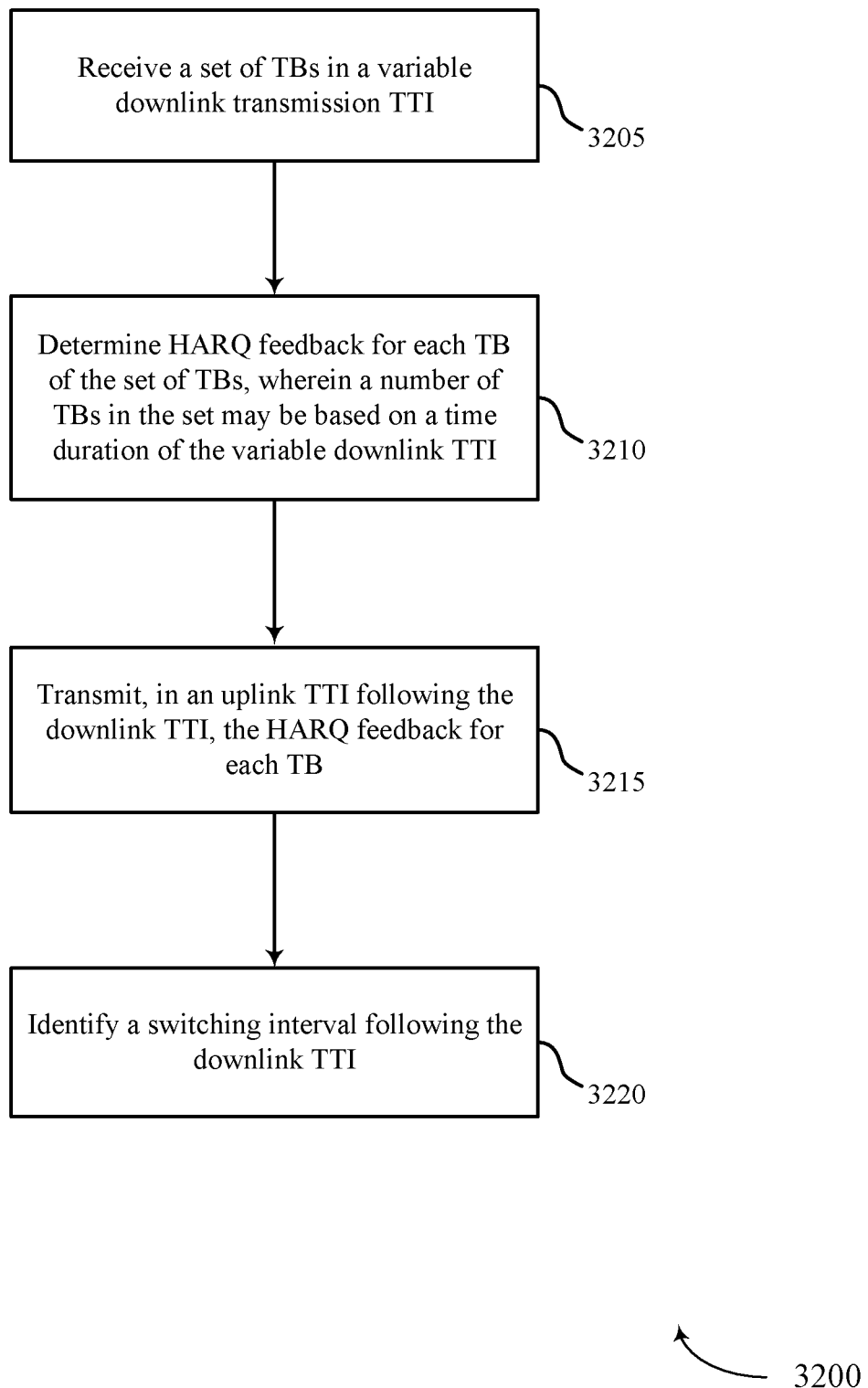
FIG. 32 shows a flowchart illustrating a method for feedback for variable TTI in accordance with various aspects of the present disclosure.

FIG. 32 shows a flowchart illustrating a method 3200 for feedback for variable TTI in accordance with various aspects of the present disclosure. The operations of method 3200 may be implemented by a UE 115 or its components, as described with reference to FIGS. 1-25. For example, the operations of method 3200 may be performed by the feedback module 1810, as described with reference to FIGS. 18-22. In some examples, a UE 115 may execute a set of codes to control the functional elements of the UE 115 to perform the functions described below. Additionally or alternatively, the UE 115 may perform aspects the functions described below using special-purpose hardware. The method 3200 may also incorporate aspects of methods 3000 and 3100 of FIGS. 30 and 31.

At block 3205, the UE 115 may receive a plurality of TBs in a variable downlink transmission TTI, as described above with reference to FIGS. 13-17. In certain examples, the operations of block 3205 may be performed by the receiver 1805, as described above with reference to FIG. 18.

At block 3210, the UE 115 may determine HARQ feedback for each TB of the plurality of TBs, where a number of TBs in the plurality is based on a time duration of the variable downlink TTI, as described above with reference to FIGS. 13-17. In certain examples, the operations of block 3210 may be performed by the HARQ module 1905, as described above with reference to FIG. 19.

At block 3215, the UE 115 may transmit, in an uplink TTI following the downlink TTI, the HARQ feedback for each TB, as described above with reference to FIGS. 13-17. In certain examples, the operations of block 3215 may be performed by the UL timing determination module 1910, as described above with reference to FIG. 19.

At block 3220, the UE 115 may identify a switching interval following the downlink TTI as described above with reference to FIGS. 13-17. The switching interval may precede the uplink TTI. HARQ feedback for each TB may thus be transmitted at a time based on the identified switching interval as described above with reference to FIGS. 13-17. In certain examples, the operations of block 3220 may be performed by the switching interval module 2015 as described above with reference to FIG. 20.

Figure 33:
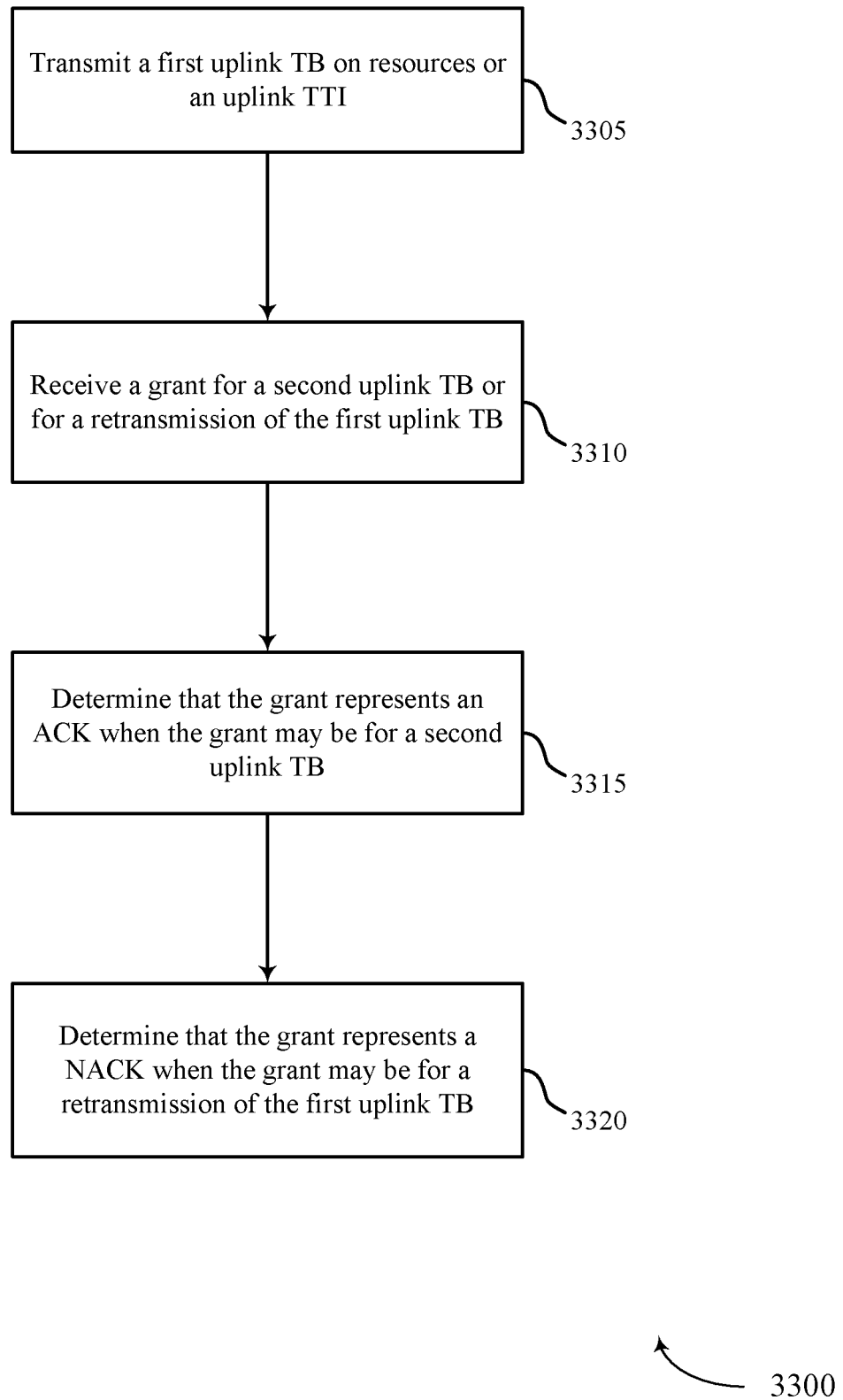
FIG. 33 shows a flowchart illustrating a method for feedback for variable TTI in accordance with various aspects of the present disclosure.

FIG. 33 shows a flowchart illustrating a method 3300 for feedback for variable TTI in accordance with various aspects of the present disclosure. The operations of method 3300 may be implemented by a UE 115 or its components as described with reference to FIGS. 1-25. For example, the operations of method 3300 may be performed by the feedback module 1810 as described with reference to FIGS.

18-21. In some examples, a UE 115 may execute a set of codes to control the functional elements of the UE 115 to perform the functions described below. Additionally or alternatively, the UE 115 may perform aspects the functions described below using special-purpose hardware.

At block 3305, the UE 115 may transmit a first uplink TB on resources of an uplink TTI, as described above with reference to FIGS. 13-17. In certain examples, the operations of block 3305 may be performed by the transmitter 1815, as described above with reference to FIG. 18.

At block 3310, the UE 115 may receive a grant for a second uplink TB or for a retransmission of the first uplink TB, as described above with reference to FIGS. 13-17. In certain examples, the operations of block 3310 may be performed by the receiver 1805, as described above with reference to FIG. 18.

At block 3315, the UE 115 may determine that the grant represents an ACK when the grant is for a second uplink TB as described above with reference to FIGS. 13-17. In certain examples, the operations of block 3315 may be performed by the feedback determination module 2020, as described above with reference to FIG. 20.

At block 3320, the UE 115 may determine that the grant represents a NACK when the grant is for a retransmission of the first uplink TB, as described above with reference to FIGS. 13-17. In certain examples, the operations of block 3320 may be performed by the feedback determination module 2020, as described above with reference to FIG. 20.

Figure 34:
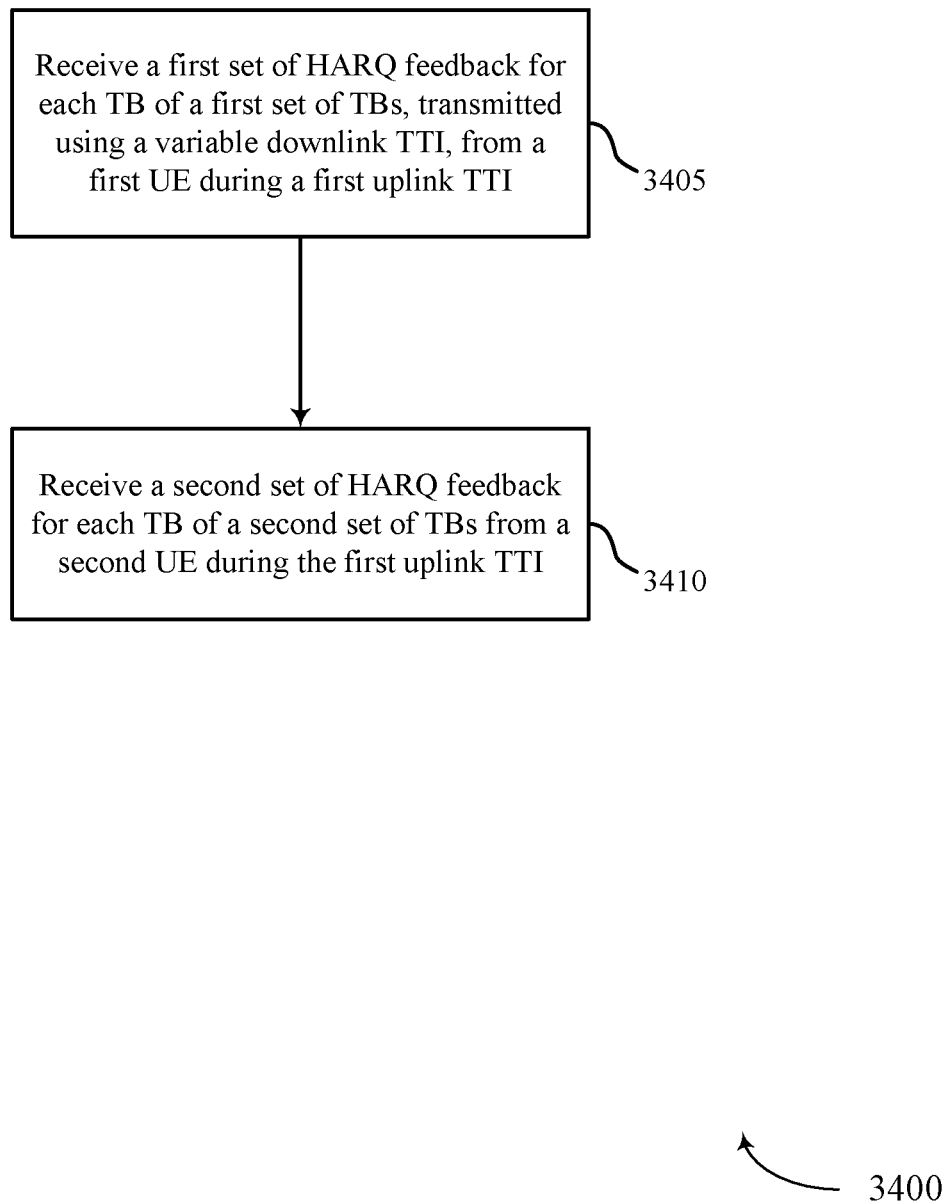
FIG. 34 shows a flowchart illustrating a method for feedback for variable TTI in accordance with various aspects of the present disclosure.

FIG. 34 shows a flowchart illustrating a method 3400 for feedback for variable TTI in accordance with various aspects of the present disclosure. The operations of method 3400 may be implemented by a base station 105 or its components as described with reference to FIGS. 1 and 22-25. For example, the operations of method 3400 may be performed by the base station feedback module 2210 as described with reference to FIGS. 22-26. In some examples, a base station 105 may execute a set of codes to control the functional elements of the base station 105 to perform the functions described below. Additionally or alternatively, the base station 105 may perform aspects the functions described below using special-purpose hardware.

At block 3405, the base station 105 may receive a first set of HARQ feedback for each TB of a first plurality of TBs, transmitted using a variable downlink TTI, from a first UE during a first uplink TTI, as described above with reference to FIGS. 13-17. In certain examples, the operations of block 3405 may be performed by the first feedback reception module 2305, as described above with reference to FIG. 23.

At block 3410, the base station 105 may receive a second set of HARQ feedback for each TB of a second plurality of TBs from a second UE during the first uplink TTI, as described above with reference to FIGS. 13-17. In certain examples, the operations of block 3410 may be performed by the second feedback reception module 2310, as described above with reference to FIG. 23.

Figure 35:
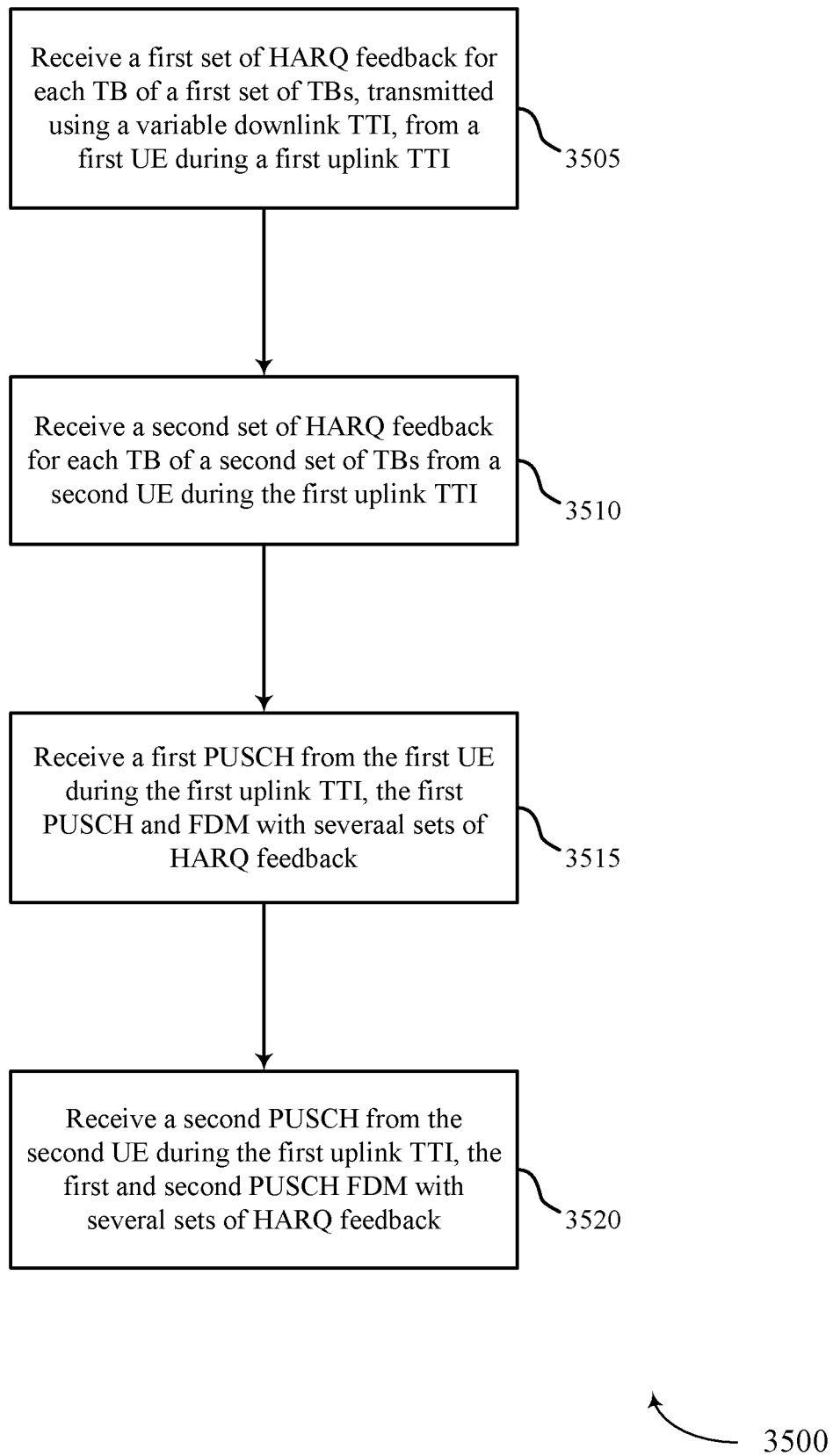
FIG. 35 shows a flowchart illustrating a method for feedback for variable TTI in accordance with various aspects of the present disclosure.

FIG. 35 shows a flowchart illustrating a method 3500 for HARQ for variable TTI and eCC in accordance with various aspects of the present disclosure. The operations of method 3500 may be implemented by a base station 105 or its components as described with reference to FIGS. 1 and 22-25. For example, the operations of method 3500 may be performed by the base station feedback module 2210 as described with reference to FIGS. 22-25. In some examples, a base station 105 may execute a set of codes to control the functional elements of the base station 105 to perform the functions described below. Additionally or alternatively, the base station 105 may perform aspects the functions described below using special-purpose hardware. The method 3500 may also incorporate aspects of method 3400 of FIG. 34.

At block 3505, the base station 105 may receive a first set of HARQ feedback for each TB of a first plurality of TBs from a first UE during a first uplink TTI, as described above with reference to FIGS. 13-17. In certain examples, the operations of block 3505 may be performed by the first feedback reception module 2305, as described above with reference to FIG. 23.

At block 3510, the base station 105 may receive a second set of HARQ feedback for each TB of a second plurality of TBs from a second UE during the first uplink TTI, as described above with reference to FIGS. 13-17. The first and second sets of HARQ feedback may be CDM on a common resource. In certain examples, the operations of block 3510 may be performed by the second feedback reception module 2310, as described above with reference to FIG. 23.

At block 3515, the base station 105 may receive a first PUSCH from the first UE during the first uplink TTI, the first PUSCH and the first and second sets of HARQ feedback may be FDM, as described above with reference to FIGS. 13-17. In certain examples, the operations of block 3515 may be performed by the FDM PUSCH module 2405, as described above with reference to FIG. 24.

At block 3520, the base station 105 may receive a second PUSCH from the second UE during the first uplink TTI, the first and second PUSCH and the first and second sets of HARQ feedback may be FDM, as described above with reference to FIGS. 13-17. In some cases, the base station 105 may receive GRS for each of the PUSCH and each set of HARQ feedback in a TTI preceding the first TTI. In certain examples, the operations of block 3520 may be performed by the FDM PUSCH module 2405, as described above with reference to FIG. 24.

In some examples, the base station may receive PUSCH on the same frequency resources as several sets of HARQ feedback, where the PUSCH and the sets of HARQ feedback are TDM. Such operations may be performed by the TDM PUSCH module 2415, as described above with reference to FIG. 24.

Thus, methods 3000, 3100, 3200, 3300, 3400, and 3500 may provide for feedback for variable TTI. It should be noted that methods 3000, 3100, 3200, 3300, 3400, and 3500 describe possible implementation, and that the operations and the steps may be rearranged or otherwise modified such that other implementations are possible. In some examples, aspects from two or more of the methods 3000, 3100, 3200, 3300, 3400, and 3500 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method performed by a user equipment (UE) in a wireless communication system, the method comprising:

receiving, from a base station, a slot format configuration comprising a first set of designated downlink symbols, a second set of flexible symbols that may be allocated as uplink symbols or downlink symbols, and a third set of designated uplink symbols, wherein the first set, the second set, and the third set are time division duplexed such that the second set follows the first set and precedes the third set within a slot;

receiving, from the base station, a first indication to allocate at least one of the flexible symbols of the second set to a downlink symbol or to an uplink symbol for communication between the UE and the base station in a first slot; and communicating with the base station in the first slot based at least in part on the slot format configuration and the first indication.

2. The method of claim 1, further comprising:
receiving, from the base station, a second indication allocating a first subset of the flexible symbols of the second set as downlink symbols and a second subset of the flexible symbols of the second set as uplink symbols; and
communicating with the base station in a second slot based at least in part on the second indication.

3. The method of claim 2, wherein the second indication is received in a control channel.

4. The method of claim 3, wherein the second indication is received in a downlink control information (DCI).

5. The method of claim 1, further comprising:
receiving downlink transmissions in the first slot during the first set of designated downlink symbols; and
transmitting uplink transmissions in the first slot during the third set of designated uplink symbols.

6. The method of claim 1, wherein the first indication is received via radio resource control (RRC) signaling.

7. The method of claim 1, wherein the first indication is received via physical downlink control channel signaling.

8. An apparatus for wireless communication, comprising:
a processor;
memory coupled with the processor; and
instructions stored in the memory and operable, when executed by the processor, to cause the apparatus to:
receive, from a base station, a slot format configuration comprising a first set of designated downlink symbols, a second set of flexible symbols that may be allocated as uplink symbols or downlink symbols, and a third set of designated uplink symbols, wherein the first set, the second set, and the third set are time division duplexed such that the second set follows the first set and precedes the third set within a slot;
receive, from the base station, a first indication to allocate at least one of the flexible symbols of the second set to a downlink symbol or to an uplink symbol for communication between the apparatus and the base station in a first slot; and
communicate with the base station in the first slot based at least in part on the slot format configuration and the first indication.

9. The apparatus of claim 8, wherein the instructions are further executable to:
receive, from the base station, a second indication allocating a first subset of the flexible symbols of the second set as downlink symbols and a second subset of the flexible symbols of the second set as uplink symbols; and
communicate with the base station in a second slot based at least in part on the second indication.

10. The apparatus of claim 9, wherein the second indication is received in a control channel.

11. The apparatus of claim 10, wherein the second indication is received in a downlink control information (DCI).

12. The apparatus of claim 8, wherein the instructions are further executable to:
receive downlink transmissions in the first slot during the first set of designated downlink symbols; and
transmit uplink transmissions in the first slot during the third set of designated uplink symbols.

13. The apparatus of claim 8, wherein the first indication is received via radio resource control (RRC) signaling.

14. The apparatus of claim 8, wherein the first indication is received via physical downlink control channel signaling.

15. An apparatus for wireless communication comprising:
means for receiving, from a base station, a slot format configuration comprising a first set of designated downlink symbols, a second set of flexible symbols that may be allocated as uplink symbols or downlink symbols, and a third set of designated uplink symbols, wherein the first set, the second set, and the third set are time division duplexed such that the second set follows the first set and precedes the third set within a slot;
means for receiving, from the base station, a first indication to allocate at least one of the flexible symbols of the second set to a downlink symbol or to an uplink symbol for communication between the apparatus and the base station in a first slot; and
means for communicating with the base station in the first slot based at least in part on the slot format configuration and the first indication.

16. The apparatus of claim 15, further comprising:
means for receiving, from the base station, a second indication allocating a first subset of the flexible symbols of the second set as downlink symbols and a second subset of the flexible symbols of the second set as uplink symbols; and
means for communicating with the base station in a second slot based at least in part on the second indication.

17. The apparatus of claim 16, wherein the second indication is received in a control channel.

18. The apparatus of claim 17, wherein the second indication is received in a downlink control information (DCI).

19. The apparatus of claim 15, further comprising:
means for receiving downlink transmissions in the first slot during the first set of designated downlink symbols; and
means for transmitting uplink transmissions in the first slot during the third set of designated uplink symbols.

20. The apparatus of claim 15, wherein the first indication is received via radio resource control (RRC) signaling.

21. The apparatus of claim 15, wherein the first indication is received via physical downlink control channel signaling.

22. A non-transitory computer-readable medium storing code or wireless communication, the code comprising instructions executable to:
receive, by a UE from a base station, a slot format configuration comprising a first set of designated downlink symbols, a second set of flexible symbols that may be allocated as uplink symbols or downlink symbols, and a third set of designated uplink symbols, wherein the first set, the second set, and the third set are time division duplexed such that the second set follows the first set and precedes the third set within a slot;
receive, from the base station, a first indication to allocate at least one of the flexible symbols of the second set to a downlink symbol or to an uplink symbol for communication with the base station in a first slot; and
communicate with the base station in the first slot based at least in part on the slot format configuration and the first indication.

23. The non-transitory computer-readable medium of claim 22, wherein the instructions are further executable to:
receive, from the base station, a second indication allocating a first subset of the flexible symbols of the second set as downlink symbols and a second subset of the flexible symbols of the second set as uplink symbols; and
communicate with the base station in a second slot based at least in part on the second indication.

24. The method of claim 1, wherein the first indication comprises an allocation of uplink resources in the first slot or an allocation of downlink resources in the first slot to the UE by the base station, and wherein a number of symbols allocated to the UE in the first slot, including the at least one of the flexible symbols of the second set, defines a variable transmission time interval (TTI) of the UE.

25. The method of claim 1, further comprising:
transmitting an ACK/NACK message to the base station on uplink resources of a second slot.

26. The method of claim 2, wherein the first slot and the second slot comprise variable length transmission time intervals (TTIs) for respective communications with the base station.

27. The apparatus of claim 8, wherein the first indication comprises an allocation of uplink or downlink resources to the apparatus by the base station.

28. The apparatus of claim 9, wherein the first slot and the second slot comprise variable length transmission time intervals (TTIs) for respective communications with the base station.

29. The apparatus of claim 15, wherein the first indication comprises an allocation of uplink or downlink resources to the apparatus by the base station.

30. The apparatus of claim 16, wherein the first slot and the second slot comprise variable length transmission time intervals (TTIs) for respective communications with the base station.

31. The non-transitory computer-readable medium of claim 22, wherein the first indication comprises an allocation of uplink or downlink resources to the UE by the base station.

32. The non-transitory computer-readable medium of claim 23, wherein the first slot and the second slot comprise variable length transmission time intervals (TTIs) for respective communications with the base station.

33. The apparatus of claim 8, wherein the first indication comprises an allocation of uplink resources in the first slot or an allocation of downlink resources in the first slot to the apparatus by the base station, and wherein a number of symbols allocated to the apparatus in the first slot, including the at least one of the flexible symbols of the second set, defines a variable transmission time interval (TTI) of the apparatus.

34. The apparatus of claim 15, wherein the first indication comprises an allocation of uplink resources in the first slot or an allocation of downlink resources in the first slot to the apparatus by the base station, and wherein a number of symbols allocated to the apparatus in the first slot, including the at least one of the flexible symbols of the second set, defines a variable transmission time interval (TTI) of the apparatus.

* * * * *